US010419801B2

(12) United States Patent
Hirabayashi et al.

(10) Patent No.: US 10,419,801 B2
(45) Date of Patent: *Sep. 17, 2019

(54) INFORMATION PROCESSING APPARATUS AND METHOD

(71) Applicant: SONY CORPORATION, Tokyo (JP)

(72) Inventors: Mitsuhiro Hirabayashi, Tokyo (JP); Shinobu Hattori, Tokyo (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 14/905,067

(22) PCT Filed: Jul. 18, 2014

(86) PCT No.: PCT/JP2014/069214

§ 371 (c)(1),
(2) Date: Jan. 14, 2016

(87) PCT Pub. No.: WO2015/012225

PCT Pub. Date: Jan. 29, 2015

(65) Prior Publication Data

US 2016/0150241 A1 May 26, 2016

(30) Foreign Application Priority Data

Jul. 22, 2013 (JP) ................................ 2013-152124
Jul. 24, 2013 (JP) ................................ 2013-154023
Mar. 20, 2014 (JP) ................................ 2014-058763

(51) Int. Cl.
*H04N 21/2662* (2011.01)
*H04N 5/91* (2006.01)
(Continued)

(52) U.S. Cl.
CPC ......... *H04N 21/2662* (2013.01); *G11B 27/32* (2013.01); *H04N 5/91* (2013.01);
(Continued)

(58) Field of Classification Search
CPC ............. H04N 21/2662; H04N 21/845; H04N 21/2358; H04N 21/234345; H04N 19/59;
(Continued)

(56) References Cited

U.S. PATENT DOCUMENTS 9,161,039 B2 * 10/2015 Wang ..................... H04N 19/70
9,554,133 B2 * 1/2017 Ye ....................... H04N 19/105
(Continued)

FOREIGN PATENT DOCUMENTS

CN 102217313 A 10/2011
GB 2509956 A * 7/2014 ..... H04N 21/234327
(Continued)

OTHER PUBLICATIONS

Le Feuvre J. et al. "Support for eficient tile access in the HEVC File Format", International Organisation for Standarization ISO/IEC JTC1/SC29/WG11 MPEG2012/M29231 Apr. 2013, Incheon (KR).*
(Continued)

*Primary Examiner* — Richard A Hansell, Jr.
(74) *Attorney, Agent, or Firm* — Paratus Law Group, PLLC

(57) ABSTRACT

The present disclosure relates to an information processing apparatus and an information processing method that enable recognition of performance required for decoding more accurately. A file of an MP4 file format, in which information indicating a location of a partial image in a whole image is stored in moov, the partial image being able to be independently decoded in the whole image, and the encoded partial image is stored in mdat, is generated, and the generated file is stored. The present disclosure can be applied to,
(Continued)

for example, an information processing apparatus such as an image encoding apparatus or an image decoding apparatus.

19 Claims, 49 Drawing Sheets

(51) Int. Cl.

| | |
|---|---|
| ***H04N 9/804*** | (2006.01) |
| ***H04N 9/82*** | (2006.01) |
| ***H04N 21/2343*** | (2011.01) |
| ***H04N 21/845*** | (2011.01) |
| ***H04N 21/854*** | (2011.01) |
| ***H04N 19/70*** | (2014.01) |
| ***H04N 19/119*** | (2014.01) |
| ***H04N 19/156*** | (2014.01) |
| ***H04N 19/174*** | (2014.01) |
| ***H04N 19/46*** | (2014.01) |
| ***H04N 19/115*** | (2014.01) |
| ***H04N 19/44*** | (2014.01) |
| ***H04N 19/59*** | (2014.01) |
| ***G11B 27/32*** | (2006.01) |
| ***H04N 21/235*** | (2011.01) |

(52) U.S. Cl.

CPC ......... *H04N 9/8042* (2013.01); *H04N 9/8205* (2013.01); *H04N 19/115* (2014.11); *H04N 19/119* (2014.11); *H04N 19/156* (2014.11); *H04N 19/174* (2014.11); *H04N 19/44* (2014.11); *H04N 19/46* (2014.11); *H04N 19/59* (2014.11); *H04N 19/70* (2014.11); *H04N 21/2358* (2013.01); *H04N 21/23439* (2013.01); *H04N 21/234345* (2013.01); *H04N 21/845* (2013.01); *H04N 21/8456* (2013.01); *H04N 21/85406* (2013.01)

(58) Field of Classification Search

CPC ...... H04N 19/44; H04N 19/115; H04N 19/46; H04N 19/119; H04N 19/174; H04N 19/156; H04N 21/23439; H04N 9/8205; H04N 9/8042; H04N 5/91; H04N 19/70; H04N 21/85406; H04N 21/8456; G11B 27/32

USPC .................................................... 375/240.12

See application file for complete search history.

(56) References Cited

U.S. PATENT DOCUMENTS

| | | | | |
|---|---|---|---|---|
| 2002/0009151 A1 | 1/2002 | Gentric | | |
| 2003/0163781 A1 | 8/2003 | Visharam et al. | | |
| 2011/0116772 A1 | 5/2011 | Kwon et al. | | |
| 2012/0189049 A1 | 7/2012 | Coban et al. | | |
| 2013/0101035 A1* | 4/2013 | Wang | H04N 19/70 | 375/240.12 |
| 2013/0114694 A1 | 5/2013 | Chen et al. | | |
| 2013/0202051 A1* | 8/2013 | Zhou | H04N 19/436 | 375/240.26 |
| 2013/0322530 A1* | 12/2013 | Rossato | H04N 19/63 | 375/240.12 |
| 2016/0014480 A1* | 1/2016 | Maze | H04N 21/4728 | 725/116 |

FOREIGN PATENT DOCUMENTS

| | | | |
|---|---|---|---|
| GB | 2509956 A * | 7/2014 | H04N 21/234327 |
| GB | 2512880 A * | 10/2014 | H04N 21/242 |
| GB | 2512880 A * | 10/2014 | H04N 21/242 |
| JP | 2013-520861 | 6/2013 | |
| JP | 2016-506196 A | 2/2016 | |
| JP | 2016-519513 A | 6/2016 | |
| WO | WO2014/006863 | 1/2014 | |
| WO | WO2014/006863 A1 | 1/2014 | |

OTHER PUBLICATIONS

J. Le Feuvre, C.Concolato, F. Denoual, F. Maze, E. Nassor, N Ouedraogo, H. Le Floch, "Support for efficient tile access in the HEVC File Format", International Organisation for Standarization ISO/IEC JTC1/SC29/WG11 (Year: 2013) (Year: 2013).*

J. Le Feuvre, C.Concolato, F. Denoual, F. Maze, E. Nassor, N Ouedraogo, H. Le Floch, "Support for efficient tile access in the HEVC File Format", International Organisation for Standarization ISO/IEC JTC1/SC29/WG11 (Year: 2013).*

Le Feuvre J. et al. "Support for eficient tile access in the HEVC File Format", International Organisation for Standarization ISO/IEC JTC1/SC29/WG11 MPEG2012/M29231 Apr. 2013, Incheon (KR) (Year: 2013).*

ISO/IEC JTC1/SC29, "Information technology—Coding of audio-visual objects—Part 12: ISO base media file format, Technical Corrigendum 5", ISO/IEC 14496-12:2008/Cor.5:2011(E) ISO/IEC JTC1/SC29/WG11, Dec. 12, 2011, pp. i-37.

Bross, et al., "High Efficiency Video Coding (HEVC) text specification draft 10 (for FDIS & Consent)", Joint Collaborative Team on Video Coding (JCT-VC) of ITU-T SG16 WP3 and ISO/IEC JTC1/SC29/WG11, Jan. 14-23, 2013, pp. i-300, 12th Meeting: Geneva, CH.

Le Feuvre, et al., "Support for efficient tile access in the HEVC File Format", International Organisation for Standardisation Organisation Internationale de Normalisation ISO/IEC JTC1/SC29/WG11 Coding of Moving Pictures and Audio, Apr. 2013, pp. 1-11, Incheon, KR.

Feb. 28, 2017, SG communication issued for related SG application No. 11201600254U.

Mar. 2, 2017, SG communication issued for related SG application No. 11201600260R.

ISO/IEC JTC 1/SC 29, "Information technology—Coding of audio-visual objects—Part 12: ISO base media file format, Technical Corrigendum 5", Dec. 12, 2011, p. i-37.

Le Feuvre, et al., "Support for efficient tile access in the HEVC File Format", International Organisation for Standardisation ISO/IEC JTC1/SC29/WG11, Apr. 2013, p. 1-11, Incheon, Korea.

Bross, et al., "High Efficiency Video Coding (HEVC) text specification draft 10 (for FDIS & Consent)", Joint Collaborative Team on Video Coding (JCT-VC) of ITU-T SG 16 WP 3 and ISO/IEC JTC 1/SC 29/WG 11, Jan. 14-23, 2013, p. i-299, Geneva, Switzerland.

Nov. 23, 2016, EP communication issued for related EP application No. 14829539.7.

Nov. 28, 2016, EP communication issued for related EP application No. 14829563.7.

Nov. 28, 2016, EP communication issued for related EP application No. 14829335.0.

Wang, et al., Tile groups, Joint Collaborative Team on Video Coding (JCT-VC) of ITU-T SG16 WP3 and ISO/IEC/ JTC1/SC29/WG11, Nov. 21-30, 2011, pp. 1-9, 7th Meeting, Geneva, CH.

Japan National Body, JNB comment on HEVC content support in MPEG-2 systems and MP4 file format, International Organisation for Standardisation, ISO/IEC JTC1/SC29/WG11, Coding of Moving Pictures and Audio, ISO/IEC JTC1/SC29/WG11 MPEG2012/M23552, Feb. 2012, pp. 1, San Jose, USA.

Singer, HEVC in MP4, International Organisation for Standardisation, ISO/IEC JTC1/SC29/WG11, Coding of Moving Pictures and Audio, ISO/IEC JTC1/SC29/WG11 MPEG2011/M23838, Feb. 2012, pp. 1-9, San Jose, USA.

Apr. 3, 2018, Chinese Office Action issued for related CN Application No. 201480040437.6.

May 2, 2018, Chinese Office Action issued for related CN Application No. 201480040438.0.

Mar. 5, 2018, Chinese Office Action issued for related CN Application No. 201480040554.2.

(56) References Cited

OTHER PUBLICATIONS

Sep. 6, 2018, Japanese Office Action issued for related JP application No. 2015-528272.

* cited by examiner

FIG. 3 flags specifies the type of sub-sample information given in this box as follows:

0:NAL-unit-based sub-samples. A sub-sample contains one or more contiguous NAL units.

1:Decoding-unit-based sub-samples. A sub-sample contains exactly one decoding unit.

2:Tile-based sub-samples. A sub-sample either contains one tile and the associated non-VCL NAL units, if any, of the VCL NAL unit(s) containing the tile, or contains one or more non-VCL NAL units.

3:CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy_coding_sync_enabled_flag is equal to 0.

4:Slice-based sub-samples. A sub-sample either contains one slice (where each slice may contain one or more slice segments, each of which is a NAL unit) and the associated non-VCL NAL units, if any, or contains one or more non-VCL NAL units.

FIG. 9

Bit(2) semantics OF independent independent specifies that this tile has decoding dependencies only to the same tile in other samples, as follows:

0: the coding dependencies between this tile and other tiles in the same frame or previous frames is unknown, 1: there are no spatial coding dependencies between this tile and other tiles in the same frame, no temporal dependencies between this tile and the other tiles with same region in any reference frames but there can be coding dependencies between this tile and the tile with the same region in the reference frames 2: there are no coding dependencies between this tile and other tiles with same region in the same frame or in previous frames, 3: reserved.

CtbAddrTsToRs[top_left_tile_index]

CtbAddrTsToRs[bottom_right_tile_index]

$S_i = (X_{right,\,i} - X_{left,\,i}) * (Y_{top,\,i} - Y_{btm,\,i})$ $S_{sum} = \Sigma\ Si - Overwrap$ $NumOfPixelToDecode = S_{sum} * CTUSize$

| | |
|---|---|
| motion_constrained_tile_sets(payloadSize) { | Descriptor |
| num_sets_in_message_minus1 | ue(v) |
| for(i=0; i<=num_sets_in_message_minus1; i++) { | |
| mcts_id[i] | ue(v) |
| num_tile_rects_in_set_minus1[i] | ue(v) |
| for(j=0; j<= num_tile_rects_in_set_minus1[i]; | |
| top_left_tile_index[i][j] | ue(v) |
| bottom_right_tile_index[i][j] | ue(v) |
| } | |
| exact_sample_value_match_flag[i] | u(1) |
| } | |
| } | |

FIG. 29

| temporal_motion_constrained_tile_sets(payloadSize) { | Descriptor |
|---|---|
| mc_all_tiles_exact_sample_value_match_flag | u(1) |
| each_tile_one_tile_set_flag | u(1) |
| limited_tile_set_display_flag | u(1) |
| if(!each_tile_one_tile_set_flag) { | |
| num_sets_in_message_minus1 | ue(v) |
| for(i=0; i <= num_sets_in_message_minus1; i++) { | |
| mcts_id[i] | ue(v) |
| if(limited_tile_set_display_flag) | |
| display_tile_set_flag[i] | u(1) |
| num_tile_rects_in_set_minus1[i] | ue(v) |
| for(j=0; j <= num_tile_rects_in_set_minus1[i]; j++) { | |
| top_left_tile_index[i][j] | ue(v) |
| bottom_right_tile_index[i][j] | ue(v) |
| } | |
| if(! mc_all_tiles_exact_sample_value_match_flag) | |
| exact_sample_value_match_flag[i] | u(1) |
| mcts_tier_level_idc_present_flag[i] | u(1) |
| if(mcts_tier_level_idc_present_flag[i]) { | |
| mcts_tier_flag[i] | u(1) |
| mcts_level_idc[i] | u(8) |
| } | |
| } | |
| } else { | |
| max_mcts_tier_level_idc_present_flag | u(1) |
| if(max_mcts_tier_level_idc_present_flag) { | |
| max_mcts_tier_flag | u(1) |
| max_mcts_level_idc | u(8) |
| } | |
| } | |
| } | |

FIG. 30

```
aligned(8)class HEVCTileDecoderConfigurationRecord {
        unsigned int(8) configurationVersion=1;
        unsigned int(2) general_profile_space;
        unsigned int(1) mcts_tier_flag;
        unsigned int(5) general_profile_idc;
        unsigned int(32) general_profile_compatibility_flags;
        unsigned int(48) general_constraint_indicator_flags;
        unsigned int(8) mcts_level_idc;
        bit(4) reserved='1111'b;
        unsigned int(12) min_spatial_segmentation_idc;
        bit(6) reserved='111111'b;
        unsigned int(2) parallelismType;
        bit(6) reserved='111111'b;
        unsigned int(2) chromaFormat;
        bit(5) reserved='11111'b;
        unsigned int(3) bitDepthLumaMinus8;
        bit(5) reserved='11111'b;
        unsigned int(3) bitDepthChromaMinus8;
        bit(16) avgFrameRate;
        bit(2) constantFrameRate;
        bit(3) numTemporalLayers;
        bit(1) temporalIdNested;
        unsigned int(2) lengthSizeMinusOne;
        unsigned int(8) numOfArrays;
        for (j=0;j<numOfArrays;j++) {
                bit(1) array_completeness;
                unsigned int(1) reserved=0;
                unsigned int(6) NAL_unit_type;
                unsigned int(16) numNalus;
                for (i=0;i<numNalus;i++) {
                        unsigned int(16) nalUnitLength.
                        bit(8*nalUnitLength)nalUnit;
                }
        }
```

version OF HEVCTileDecoderConfigurationRecord

HAVING SAME DATA STRUCTURE AS DATA STRUCTURE OF HEVC decodec configuration record AND STORED IN temporal_motion_constrained_tile_sets SEI ONLY PARAMETER REQUIRED FOR DETERMINING DECODING OF HEVC Tile IS SET, AND ZERO IS SET FOR OTHERS + temporal_motion_constrained_tile_sets SEI CORRESPONDING TO HEVC Tile IS STORED

FIG. 33 version OF HEVCTileDecoderConfigurationRecord

```
aligned(8)class HEVCTileDecoderConfigurationRecord {
        unsigned int(8) configurationVersion=1;
        unsigned int(2) lengthSizeMinusOne;
        unsigned int(6) numOfArrays;
        for(j=0;j<numOfArrays;j++){
                bit(1) array_completeness;
                unsigned int(1) reserved=0;
                unsigned int(6) NAL_unit_type;
                unsigned int(16) numNalus;
                for(i=0;i<numNalus;i++){
                        unsigned int(16) nalUnitLength;
                        bit(8*nalUnitLength)nalUnit;
                }
        }
}
```

temporal_motion_constrained_tile_sets SEI REQUIRED FOR DETERMINING DECODING OF HEVC Tile + CORRESPONDING TO HEVC Tile IS STORED

FIG. 35

```
aligned(8)class HEVCTileDecoderConfigurationRecord {
        unsigned int(8) configurationVersion=1;
        unsigned int(1) mcts_tier_flag;     }
        unsigned int(8) mcts_level_idc;     }
        unsigned int(1) max_mcts_tier_flag;
        unsigned int(8) max_mcts_level_idc;
        unsigned int(2) lengthSizeMinusOne;
        unsigned int(8) numOfArrays;
        for(j=0;j<numOfArrays;j++) {
                bit(1) array_completeness;
                unsigned int(1) reserved=0;
                unsigned int(6) NAL_unit_type;
                unsigned int(16) numNalus;
                for(i=0;i<numNalus;i++) {
                        unsigned int(16) nalUnitLength;
                        bit(8*nalUnitLength)nalUnit;
                }
        }
}
```

version OF HEVCTileDecoderConfigurationRecord

STORED IN
temporal_motion_constrained_tile_sets SEI
ONLY PARAMETER REQUIRED FOR
DETERMINING DECODING OF HEVC Tile IS STORED + temporal_motion_constrained_tile_sets SEI
CORRESPONDING TO HEVC Tile IS STORED

```
class HEVCSampleEntry() extends VisualSampleEntry('hvc1' or 'hev1) {
        HEVCConfigurationBox     config;   <- 'hvcC'
        MPEG4BitRateBox();
        // optional
        MPEG4ExtensionDescriptorsBox();      // optional
        HEVCTileExtensionBox();   <- 'hvte'
        extra_boxes                                boxes;
                          // optional
    }
```

B

```
class HEVCTileExtensionBox extends Box('hvte')
    {
        unsigned int(1) max_mcts_tier_flag;
        unsigned int(7) reserved;
        unsigned int(8) max_mcts_level_idc;
        unsigned int(24) reserved;
    }
```

INFORMATION PROCESSING APPARATUS AND METHOD

CROSS REFERENCE TO PRIOR APPLICATION

This application is a National Stage Patent Application of PCT International Patent Application No. PCT/JP2014/069214 (filed on Jul. 18, 2014) under 35 U.S.C. § 371, which claims priority to Japanese Patent Application Nos. 2014-058763 (filed on Mar. 20, 2014), 2013-154023 (filed on Jul. 24, 2013), and 2013-152124 (filed on Jul. 22, 2013), which are all hereby incorporated by reference in their entirety.

TECHNICAL FIELD

The present disclosure relates to an information processing apparatus and an information processing method, and, more particularly, to an information processing apparatus and an information processing method which can recognize performance required for decoding more accurately.

BACKGROUND ART

In recent years, with the aim of further improvement of coding efficiency compared to that of MPEG-4 Part10 (Advanced Video Coding, hereinafter, described as "AVC"), joint collaboration team—video coding (JCTVC) which is a joint standardizing body of international telecommunication union telecommunication standardization sector (ITU-T) and international organization for standardization/international electrotechnical commission (ISO/IEC) has proceeded with standardization of a coding scheme called high efficiency video coding (HEVC) (see, for example, Non-Patent Literature 1).

HEVC enables decoding of only a region required to be decoded by application by utilizing a tile (Tile) structure. To indicate that a tile region can be independently decoded, in a second version and thereafter of HEVC (including MV-HEVC, SHVC, Range Ext., or the like), this is supported by Motion-constrained tile sets SEI.

By the way, as a content distribution technique utilizing hypertext transfer protocol (HTTP), there is moving picture experts group—dynamic adaptive streaming over HTTP (MPEG-DASH) (see, for example, Non-Patent Literature 2). With MPEG-DASH, bit streams of image data encoded using a coding scheme such as HEVC described above are distributed after being formed into a predetermined file format such as, for example, an MP4 file format.

CITATION LIST

Non-Patent Literature

Non-Patent Literature 1: Benjamin Bross, Woo-Jin Han, Jens-Rainer Ohm, Gary J. Sullivan, Ye-Kui Wang, Thomas Wiegand, "High Efficiency Video Coding (HEVC) text specification draft 10 (for FDIS & Last Call)", JCTVC-L1003_v34, Joint Collaborative Team on Video Coding (JCT-VC) of ITU-T SG 16 WP 3 and ISO/IEC JTC I/SC 29/WG 11 12th Meeting: Geneva, CH, 14-23 Jan. 2013

Non-Patent Literature 2: MPEG-DASH (Dynamic Adaptive Streaming over HTTP) (URL:http://mpeg.chiariglione-.org/standards/mpeg-dash/media-presentation-description-and-segment-formas/text-isoiec-23009-12012-dam-1)

SUMMARY OF INVENTION

Technical Problem

However, both in a bit stream and in a file format, only a value in the whole stream or a value in units of a layer (Layer) are defined as a level (Level) which is used as a reference for determining whether or not a decoder can decode a stream or information relating to capacity of a buffer (Buffer).

Therefore, also in application for decoding only part of the whole image, whether or not decoding is possible is determined assuming load in the case where the whole screen is decoded, which may involve a risk that a decoder with an unnecessarily high level (Level) is required. Further, there is also a risk that application which can be distributed may be unnecessarily limited.

The present disclosure has been made in view of such circumstances, and is intended to enable recognition of performance required for decoding more accurately.

Solution to Problem

According to an aspect of the present technology, there is provided an information processing apparatus including: a file generating unit configured to generate a file of an MP4 file format, in which information indicating a location of a partial image in a whole image is stored in moov, the partial image being able to be independently decoded in the whole image, and the encoded partial image is stored in mdat; and a storage unit configured to store the file generated by the file generating unit.

The information indicating the location of the partial image in the whole image can include information indicating offset in a horizontal direction and information indicating offset in a vertical direction of the partial image.

The information indicating the location of the partial image in the whole image can be defined using VisualSampleGroupEntry in the moov.

In the file generated by the file generating unit, information indicating a size of the partial image can be further stored in the moov.

The information indicating the size of the partial image can include information indicating a height of the partial image and information indicating a width of the partial image.

The partial image can be Tile in high efficiency video coding (HEVC).

The partial image can include a plurality of NAL units.

In the file generated by the file generating unit, related information indicating the plurality of NAL units constituting the partial image can be further stored in the moov.

The related information can include group information indicating a related group for each of the NAL units.

The related information can include information indicating the number of the plurality of NAL units.

The related information can include information specifying a first NAL unit in the partial image.

The partial image can be stored in a first track in the file, and another partial image which can be independently decoded in the whole image can be stored in a track other than the first track.

A transmitting unit configured to transmit the file stored by the storage unit to another apparatus can be further included.

According to an aspect of the present technology, there is provided an information processing method including: generating a file of an MP4 file format, in which information indicating a location of a partial image in a whole image is stored in moov, the partial image being able to be independently decoded in the whole image, and the encoded partial image is stored in mdat; and storing the generated file.

According to another aspect of the present technology, there is provided an information processing apparatus including: a file reproducing unit configured to reproduce a file of an MP4 file format, in which information indicating a location of a partial image in a whole image is stored in moov, the partial image being able to be independently decoded in the whole image, and the encoded partial image is stored in mdat.

The information indicating the location of the partial image in the whole image can include information indicating offset in a horizontal direction and information indicating offset in a vertical direction of the partial image.

The information indicating the location of the partial image in the whole image can be defined using VisualSampleGroupEntry in the moov.

In the file, information indicating a size of the partial image can be further stored in the moov.

The information indicating the size of the partial image can include information indicating a height of the partial image and information indicating a width of the partial image.

The partial image can be Tile in high efficiency video coding (HEVC).

The partial image can include a plurality of NAL units.

In the file, related information indicating the plurality of NAL units constituting the partial image can be further stored in the moov.

The related information can include group information indicating a related group for each of the NAL units.

The related information can include information indicating the number of the plurality of NAL units.

The related information can include information specifying a first NAL unit in the partial image.

The partial image can be stored in a first track in the file, and another partial image which can be independently decoded in the whole image can be stored in a track other than the first track.

A receiving unit configured to receive the file can be further included. The file reproducing unit can reproduce the file received by the receiving unit.

In the file, information indicating a location of the partial image in the whole image, information indicating a size of the partial image and related information indicating the plurality of NAL units constituting the partial image can be stored in VisualSampleGroupEntry. The file reproducing unit can select a partial image which is desired to be reproduced based on the information indicating the location of the partial image in the whole image and the information indicating the size of the partial image, and acquire data of the partial image which is desired to be reproduced based on the related information and generate a bit stream.

In the file, information indicating a location of the partial image in the whole image, information indicating a size of the partial image and related information indicating the plurality of NAL units constituting the partial image can be stored in VisualSampleGroupEntry. The file reproducing unit can select a region which is desired to be reproduced based on the information indicating the location of the partial image in the whole image and the information indicating the size of the partial image, and acquire data of a partial image corresponding to the region which is desired to be reproduced based on the related information and generate a bit stream.

In the file, information indicating a location of the partial image in the whole image and information indicating a size of the partial image can be stored in TileRegionGroupEntry. The file reproducing unit can select a tile which is desired to be reproduced based on the information indicating the location of the partial image in the whole image and the information indicating the size of the partial image, acquire a track corresponding to the selected tile which is desired to be reproduced, and generate a bit stream of a partial image corresponding to the acquired track.

In the file, information indicating a location of the partial image in the whole image and information indicating a size of the partial image can be stored in TileRegionGroupEntry. The file reproducing unit can select a region which is desired to be reproduced based on the information indicating the location of the partial image in the whole image and the information indicating the size of the partial image, acquire a plurality of tracks corresponding to the selected region which is desired to be reproduced, and generate a bit stream of a partial image corresponding to the acquired plurality of tracks.

A decoding unit configured to decode a bit stream of the partial image reproduced and generated by the file reproducing unit can be further included.

According to another aspect of the present technology, there is provided an information processing method including: reproducing a file of an MP4 file format, in which information indicating a location of a partial image in a whole image is stored in moov, the partial image being able to be independently decoded in the whole image, and the encoded partial image is stored in mdat.

In an aspect of the present technology, a file of an MP4 file format, in which information indicating a location of a partial image in a whole image is stored in moov, the partial image being able to be independently decoded in the whole image, and the encoded partial image is stored in mdat, is generated, and the generated file is stored.

In another aspect of the present technology, a file of an MP4 file format, in which information indicating a location of a partial image in a whole image is stored in moov, the partial image being able to be independently decoded in the whole image, and the encoded partial image is stored in mdat, is reproduced. 0 0 0 1

Advantageous Effects of Invention

According to the present disclosure, it is possible to encode and decode an image. Particularly, it is possible to recognize performance required for decoding more accurately.

BRIEF DESCRIPTION OF DRAWINGS

FIG. 3 is a diagram for explaining an example of definition of a subsample.

FIG. 9 is a diagram illustrating an example of semantics of independent.

FIG. 22 is a diagram illustrating an example of syntax of MCTS SEI.

FIG. 29 is a diagram illustrating an example of syntax of temporal MCTS SEI.

FIG. 30 is a diagram for explaining an HEVC tile decoder configuration record.

FIG. 33 is a diagram for explaining an HEVC tile decoder configuration record.

FIG. 35 is a diagram for explaining an HEVC tile decoder configuration record.

FIG. 37 is a diagram for explaining an HEVC tile extension box.

DESCRIPTION OF EMBODIMENTS

Figure 1:
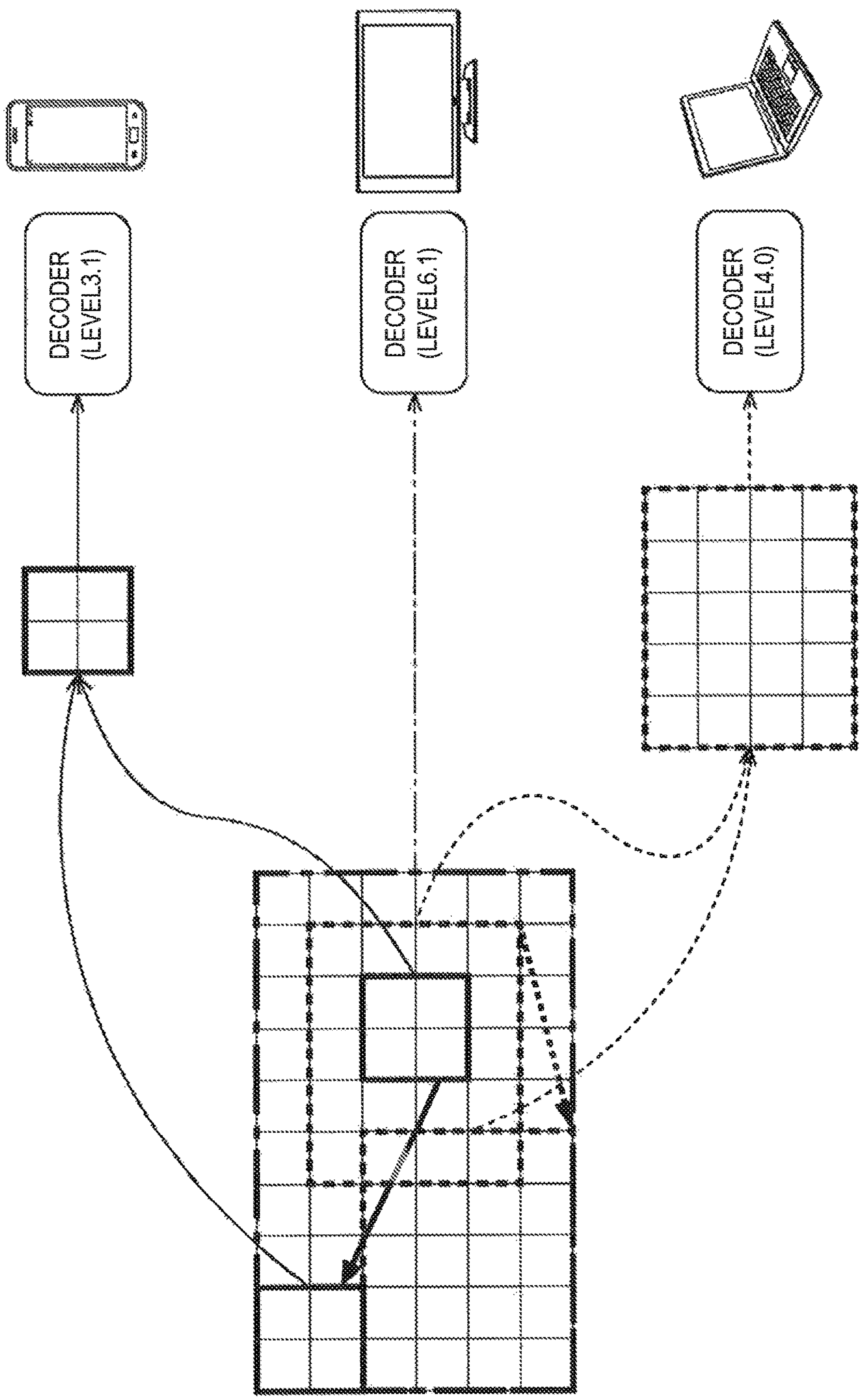
FIG. 1 is a diagram for explaining an example of application for performing partial display.

Embodiments for implementing the present disclosure (hereinafter, referred to as "embodiments") will be described below in the following order:

1. First Embodiment (hint information of subsample)
2. Second Embodiment (MP4 file)
3. Third Embodiment (image encoding apparatus)
4. Fourth Embodiment (image decoding apparatus)
5. Fifth Embodiment (computer)

1. First Embodiment

Flow of Standardization of Image Coding

In recent years, an apparatus has been spread which digitally handles image information, and, at that time, performs compression coding on an image by utilizing redundancy specific to image information and employing a coding scheme for compressing through orthogonal transform such as discrete cosine transform and motion compensation with the aim of high efficient transmission and accumulation of information. This coding scheme includes, for example, moving picture experts group (MPEG).

Particularly, MPEG2 (ISO/IEC 13818-2) which is defined as a versatile image coding scheme, is standard which supports both an interlaced scan image and a sequential scan image, and a standard resolution image and a high resolution image. For example, MPEG2 is currently widely used in a wide range of application intended for professional use and for consumer use. Use of a MPEG2 compression scheme enables assignment of a coding amount (bit rate) of 4 to 8 Mbps if, for example, an image is an interlaced scan image with standard resolution having 720×480 pixels. Further, use of the MPEG2 compression scheme enables assignment of a coding amount (bit rate) of 18 to 22 Mbps if, for example, an image is an interlaced scan image with high resolution having 1920×1088 pixels. By this means, it is possible to realize a high compression rate and favorable image quality.

While MPEG2 is intended for high image quality coding mainly adapted to broadcasting, MPEG2 does not support a coding scheme with a lower coding amount (bit rate), that is, a higher compression rate than MPEG1. It is expected that there will be a growing need for such a coding scheme in accordance with spread of a mobile terminal in the future, and a MPEG4 coding scheme is standardized to address this. As to an image coding scheme, the standard was approved as international standard of ISO/IEC 14496-2 in December, 1998.

Further, in recent years, initially, with the aim of image coding for teleconference, standardization of H.26L (international telecommunication union telecommunication standardization sector (ITU-T)) Q6/16 VCEG (Video Coding Expert Group)) has proceeded. It is known that while H.26L requires a more operation amount for encoding and decoding than coding schemes in related art such as MPEG2 and MPEG4, H.26L can realize higher coding efficiency. Further, currently, as part of activity for MPEG4, standardization for realizing higher coding efficiency based on H.26L while introducing functions which are not supported in H.26L has been performed as Joint Model of Enhanced-Compression Video Coding.

As schedule for standardization, this higher coding efficiency based on H.26L was internationally standardized in March, 2003 as H.264 and MPEG-4 Part 10 (Advanced Video Coding, hereinafter, abbreviated as "AVC").

Further, as extension of this H.264/AVC, standardization of coding tools such as RGB, 4:2:2 and 4:4:4 which are required for professional use and standardization of fidelity range extension (FRExt) including 8×8DCT and a quantization matrix which have been specified in MPEG-2 were completed in February, 2005. By this means, a coding scheme which is capable of favorably expressing also film noise included in a movie using H.264/AVC is realized, and used in a wide range of application such as Blu-RayDisc (trademark).

However, in recent years, there is a growing need for coding at a further higher compression rate such as compression of an image of approximately 4000×2000 pixels which is four times of a high vision image, and distribution of a high vision image in an environment with limited transmission capacity, such as Internet. Therefore, the above-described VCEG under ITU-T has continued to study improvement of coding efficiency.

Thus, with the aim of further improvement of coding efficiency compared to that of "AVC", joint collaboration team-video coding (JCTVC) which is a joint standardizing body of ITU-T and international organization for standardization/international electrotechnical commission (ISO/IEC) is currently proceeding with standardization of a coding scheme called high efficiency video coding (HEVC). Concerning HEVC standard, Committee draft which is a draft specification was issued in January, 2013 (see, for example, Non-Patent Literature 1).

<Definition of Tile Structure and Layer>

HEVC enables decoding of only a region required to be decoded by application by utilizing a tile (Tile) structure. To indicate that a tile region can be independently decoded, in a second version and thereafter of HEVC (including MV-HEVC, SHVC, Range Ext., or the like), this is supported by Motion-constrained tile sets SEI.

<Dash>

By the way, as a content distribution technique utilizing hypertext transfer protocol (HTTP), there is moving picture experts group-dynamic adaptive streaming over HTTP (MPEG-DASH) (see, for example, Non-Patent Literature 2). With MPEG-DASH, bit streams of image data encoded using a coding scheme such as HEVC described above are distributed after being formed into a predetermined file format such as, for example, MP4.

However, in content distribution such as DASH, only reproduction (decoding) of the whole image is assumed, and reproduction (decoding) of a partial image which is part of the whole image instead of the whole image is not assumed.

More specifically, only a value in the whole stream or a value in units of layer (Layer), that is, a value for the whole image is defined as a level (Level) which is used as a reference for determining whether a decoder can decode a stream and information relating to buffer (Buffer) capacity both in a coding scheme such as HEVC and in a file format such as MP4, and there is no information for reproducing only a partial image.

Therefore, for example, even when only a partial image (partial tile) is decoded (that is, only a partial image is reproduced) by utilizing a tile structure supported in the coding scheme such as HEVC described above, whether or not decoding is possible is determined assuming load in the case where the whole screen is decoded, which may involve a risk that a decoder with an unnecessarily higher level (Level) is required. Further, there is also a risk that application which can be distributed may be unnecessarily limited.

Application Example

Examples of application for reproducing a partial image include, for example, the following.

Application is assumed in which, in a system in which a server distributes an image to a terminal, as illustrated in, for example, FIG. 1, one screen is divided into a plurality of pieces and distributed while a display region is switched. Further, as illustrated in FIG. 2, application for selecting a partial region to be displayed (to be distributed) to select an aspect ratio and resolution of an image is assumed.

In the case of application in FIG. 1, the whole image can be divided into a plurality of pieces in units of tile (Tile), and, at the terminal, a partial image including one or a plurality of tiles is cut out from the whole image and displayed. A size of a partial image (the number of tiles) which can be displayed is determined by, for example, performance (processing capacity or a size of a display (display resolution)) of the terminal, or the like. Further, a location of a partial image to be displayed in the whole image can be designated by a user, or the like. Therefore, a partial image at a desired location in the whole image can be displayed at the terminal. That is, a user of the terminal can focus on a desired portion in the whole image.

Figure 2:
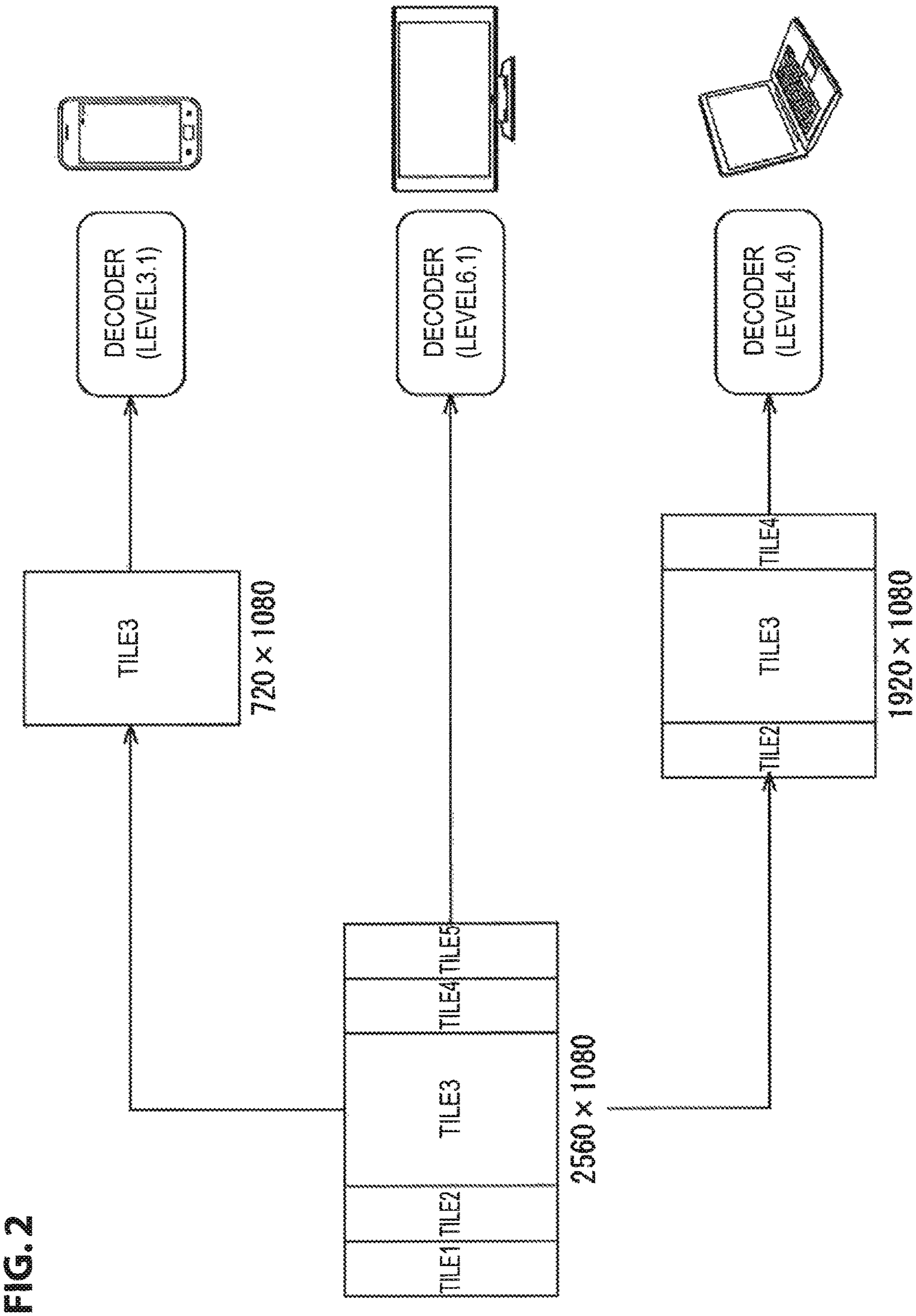
FIG. 2 is a diagram for explaining another example of the application for performing partial display.

In the case of application in FIG. 2, while the application in FIG. 2 is basically the same as the application in FIG. 1, a tile is set so that an aspect ratio or resolution of an image to be displayed can be selected, and the size of each tile is not fixed. In a similar manner to a case in FIG. 1, at the terminal, a partial image including one or a plurality of tiles is cut out from the whole image and displayed according to an instruction from the user, or the like. In this manner, only by selecting a tile to be displayed, it is possible to make resolution of the image to be displayed HD, make the size a cinema size or an extended size.

The resolution which can be displayed is determined by, for example, performance (processing capacity or a size of a display (display resolution)) of the terminal, or the like.

Because such adaptive provision (reproduction) of a partial image according to performance of the terminal, designation by a user, or the like, is not assumed in related art, even when a partial image which can be independently decoded is decoded, whether or not decoding is possible is determined assuming load in the case where the whole screen is decoded, which may involve a risk that a decoder with an unnecessary high level (Level) is required. Further, there is also a risk that application which can be distributed may be unnecessarily limited.

<Provision of Hint Information of Subsample>

Therefore, subsample information including hint information used as a reference for decoding processing of a subsample which is a partial region which can be independently decoded is generated, a file including encoded data of image data is generated, and the generated subsample information is arranged in management information of the encoded data in the file.

By this means, the terminal can recognize performance required for decoding a partial region according to the subsample information (hint information) and can determine whether or not a decoder of the terminal can perform decoding processing of the partial region (subsample) more accurately. That is, it is possible to recognize performance required for decoding more accurately. It is therefore possible to select a decoder which has performance more appropriate for the image data. By this means, it is possible to suppress occurrence of a case where a decoder with an unnecessary high level (Level) is applied to decoding load of the image data. Further, it is possible to prevent application which can be distributed from being unnecessarily limited.

Further, header information of encoded data (bit streams) of the partial region (subsample) is updated to information as to the partial region (subsample) from information of the whole image. Information for updating is included in a file and transmitted. By this means, the terminal can update the header information of the bit streams to information as to the partial region (subsample) and can pass the information to the decoder. Therefore, the decoder can determine whether or not the decoder can decode the bit streams more accurately based on the header information.

<Coding Scheme and File Format>

An example where the present technique is applied to a case where an encoding and decoding scheme is HEVC and a file format is MP4 will be described below.

<Access Unit>

In the following description, it is assumed that a sample of MP4 is an access unit (AU) of HEVC. Further, it is assumed that AU includes a plurality of tiles (Tile). In a sample table (Sample Table), management is performed in units of sample (Sample).

Further, a subsample is a constituent element of the sample, and is defined for each codec (Codec), for example, as illustrated in FIG. 3. While the present technique can be applied even if the subsample is any one of these, in the following description, the present technique will be described using an example where a tile (Tile) is a subsample (tile-based sub-sample).

<MP4 File Format>

Outline of an MP4 file format will be described next. As illustrated in a left part of FIG. 4, an MP4 file (MP4 file) which conforms to MPEG-DASH includes ftyp, moov and mdat. In moov, management information is stored in a sample table box (Sample Table Box (stbl) for each sample (for example, picture).

Figure 4:
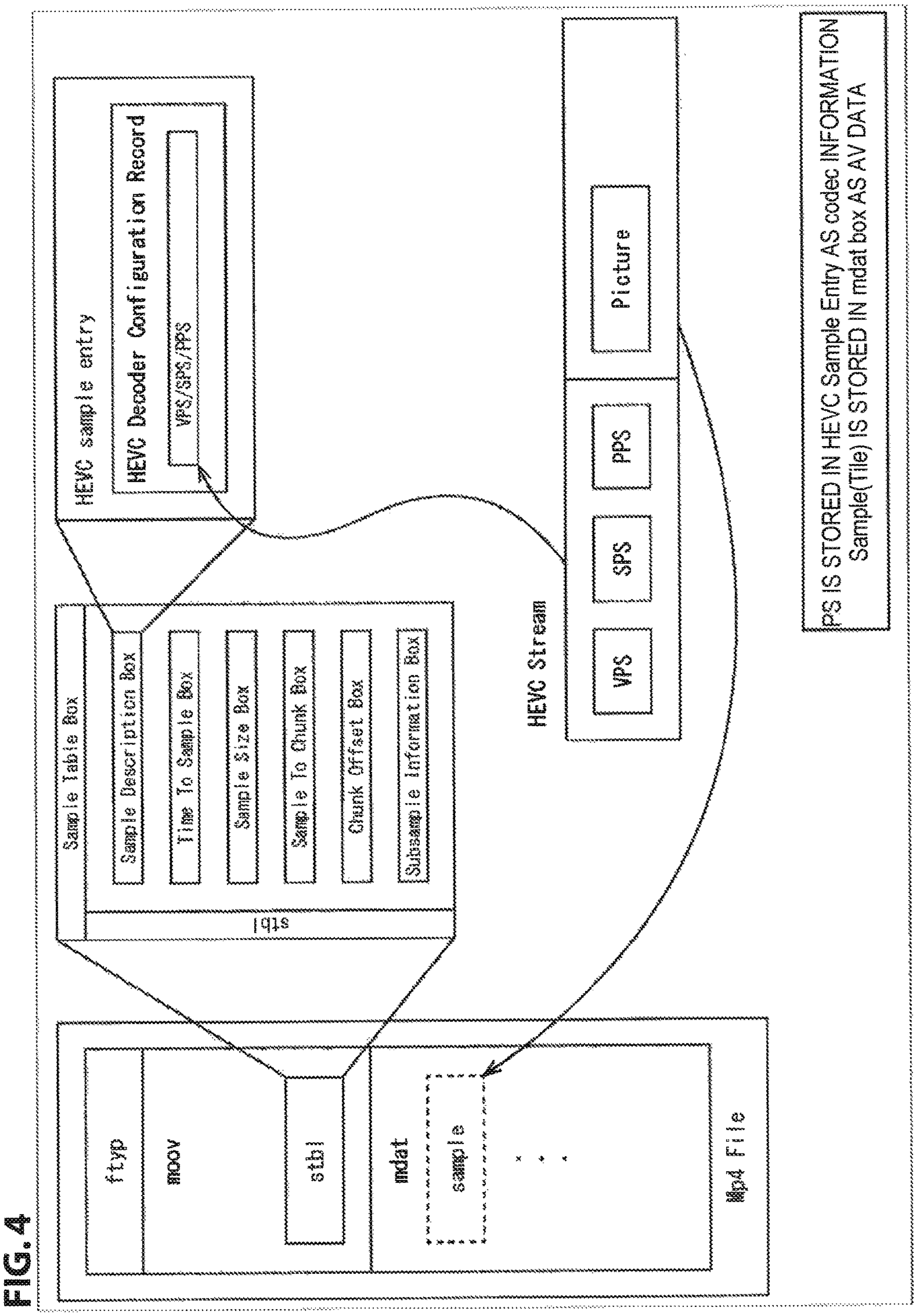
FIG. 4 is a diagram for explaining outline of an MP4 file format.

Further, as illustrated in FIG. 4, in a sample table box (Sample Table Box), a sample description box (Sample Description Box), a time to sample box (Time To Sample Box), a sample size box (Sample Size Box), a sample to chunk box (Sample to Chunk Box), a chunk offset box (Chunk Offset Box), and a subsample information box (Subsample Information Box) are provided.

In the sample description box, information relating to codec, an image size, or the like, is stored. For example, a parameter set (video parameter set (VPS (Video Parameter Set)), a sequence parameter set (SPS (Sequence Parameter Set)), a supplemental enhancement information (SEI (Supplemental Enhancement Information)), a picture parameter set (PPS (Picture Parameter Set)), or the like, of bit streams of HEVC are stored in an HEVC decoder configuration record (HEVC Decoder Configuration Record) of an HEVC sample entry (HEVC sample entry) within the sample description box as codec (Codec) information.

Further, in the time to sample box, information relating to time of the sample is stored. In the sample size box, information relating to a size of the sample is stored. In the sample to chunk box, information relating to a location of data of the sample is stored. In the chunk offset box, information relating to offset of data is stored. In the subsample information box, information relating to a subsample is stored.

Further, as illustrated in FIG. 4, data of each sample (picture) of HEVC is stored in mdat as AV data.

Figure 5:
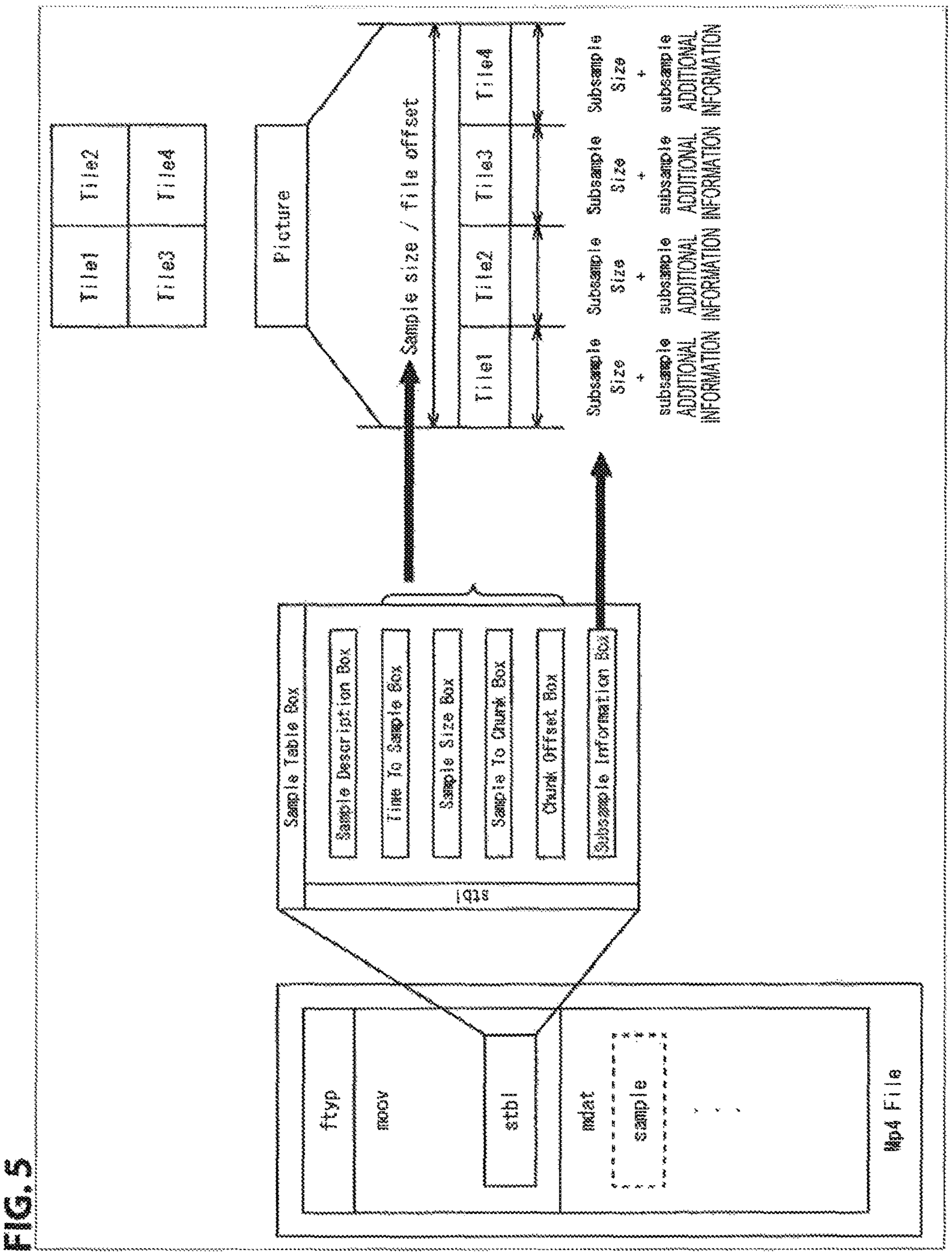
FIG. 5 is a diagram for explaining outline of an MP4 file format.

As illustrated in FIG. 5, in the time to sample box, the sample size box, the 16 sample to chunk box and the chunk offset box, access information to a sample is stored, while, in the subsample information box, access information to a subsample is stored. This access information to the subsample includes a size of each subsample (Subsample Size) and additional information (Subsample additional information).

For example, as illustrated in FIG. 5, when the sample (picture) includes four subsamples (tiles), in the subsample information box, access information to tile 1 (Tile1) to tile 4 (Tile4) is respectively stored.

Figure 6:
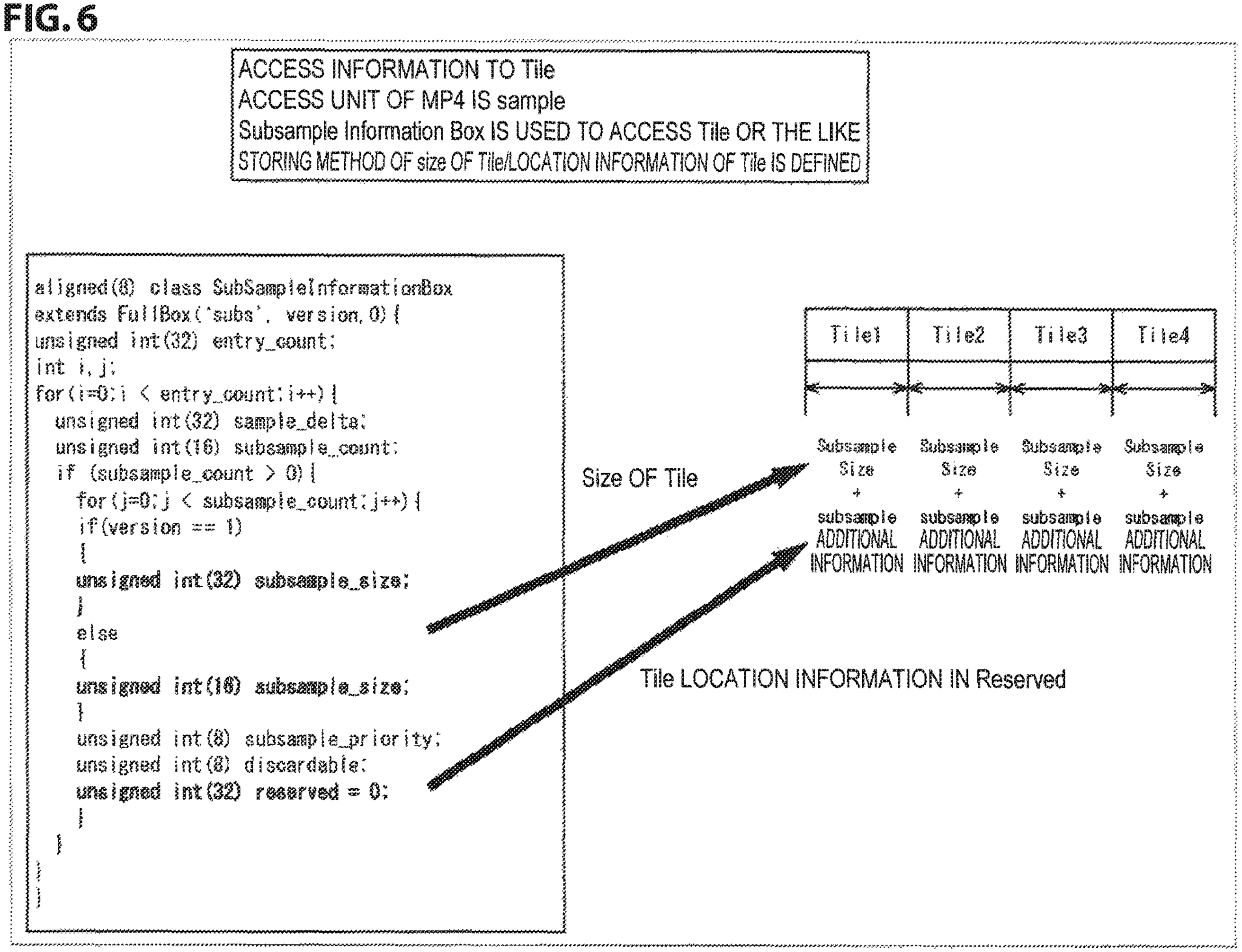
FIG. 6 is a diagram for explaining outline of an MP4 file format.

A description example of the subsample information box is illustrated in FIG. 6. As illustrated in FIG. 6, a size of each tile (subsample_size) is described, and, further, a reserved field (reserved=0) indicating location information of each tile is described.

<Tile Pattern>

In the present technique, the above-described sample table box is extended so as to be able to be applied in all cases of a case where a tile pattern is fixed for all samples (such as pictures), a case where the tile pattern is variable in all the samples, and a case where the tile pattern is fixed for a predetermined period such as, for example, an IDR interval (a case where a tile pattern is variable for each predetermined period).

<Subsample Hint Information Box>

For example, in the sample table box, subsample information including hint information used as a reference for decoding processing of a subsample which is a partial region which can be independently decoded is provided as a new box of the sample table box.

Figure 7:
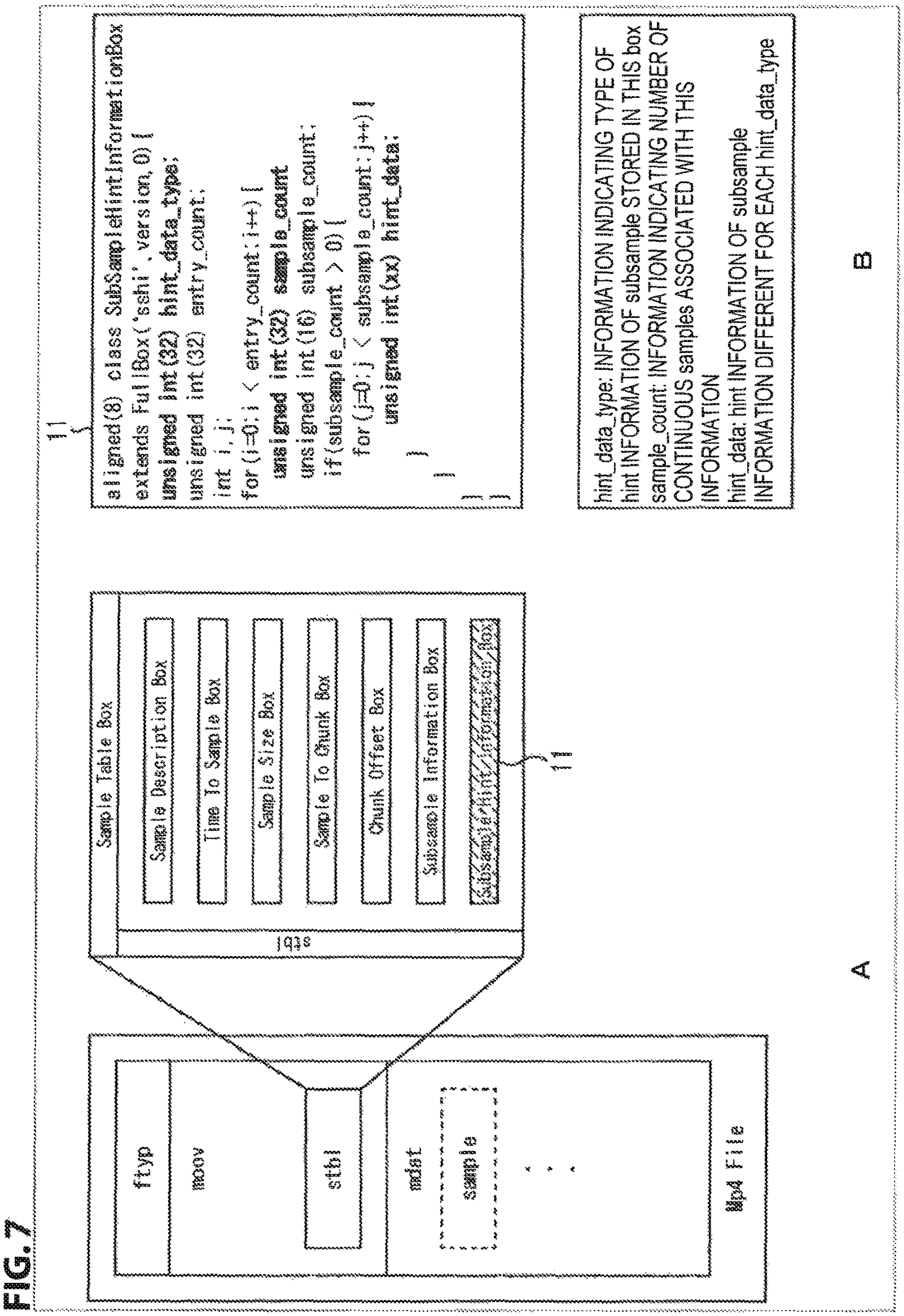
FIG. 7 is a diagram illustrating an extension example of a sample table box.

The example is illustrated in FIG. 7. As illustrated in FIG. 7, in the sample table box, a subsample hint information box (Subsample Hint Information Box) 11 is newly provided.

The subsample hint information box 11 is subsample information including hint information used as a reference for decoding processing of a subsample which is a partial region which can be independently decoded, and is a different box from the subsample information box, or the like. By separating the subsample hint information box 11 which is information for reproducing a partial image from the subsample information box which is information for reproducing the whole image in this manner, the whole box can be ignored (not referred to) in normal reproducing for displaying the whole image, so that it is possible to facilitate control.

A description example of the subsample hint information box 11 is illustrated in a right part of FIG. 7. As illustrated in this example, in the subsample hint information box 11, information such as a hint data type (hint_data type), a sample count (sample_count) and hint data (hint_data) is stored.

The hint data type is information indicating a type of hint information of a subsample stored in this box. The sample count is information indicating the number of continuous samples associated with this information. The hint data is hint information of a subsample. Information different for each type of hind data is stored.

<Extension Method>

A specific example where subsample information including hint information used as a reference for decoding processing of a subsample which is a partial region which can be independently decoded is provided will be described next.

Example 1

In Example 1, the subsample hint information box 11 in which information required for decoding (decode) is stored is used for each subsample (tile) which can be accessed by the subsample information box which is extended and defined as described above.

A subsample and hint information are associated with each other using a table index (table-index) in the subsample information box.

Figure 8:
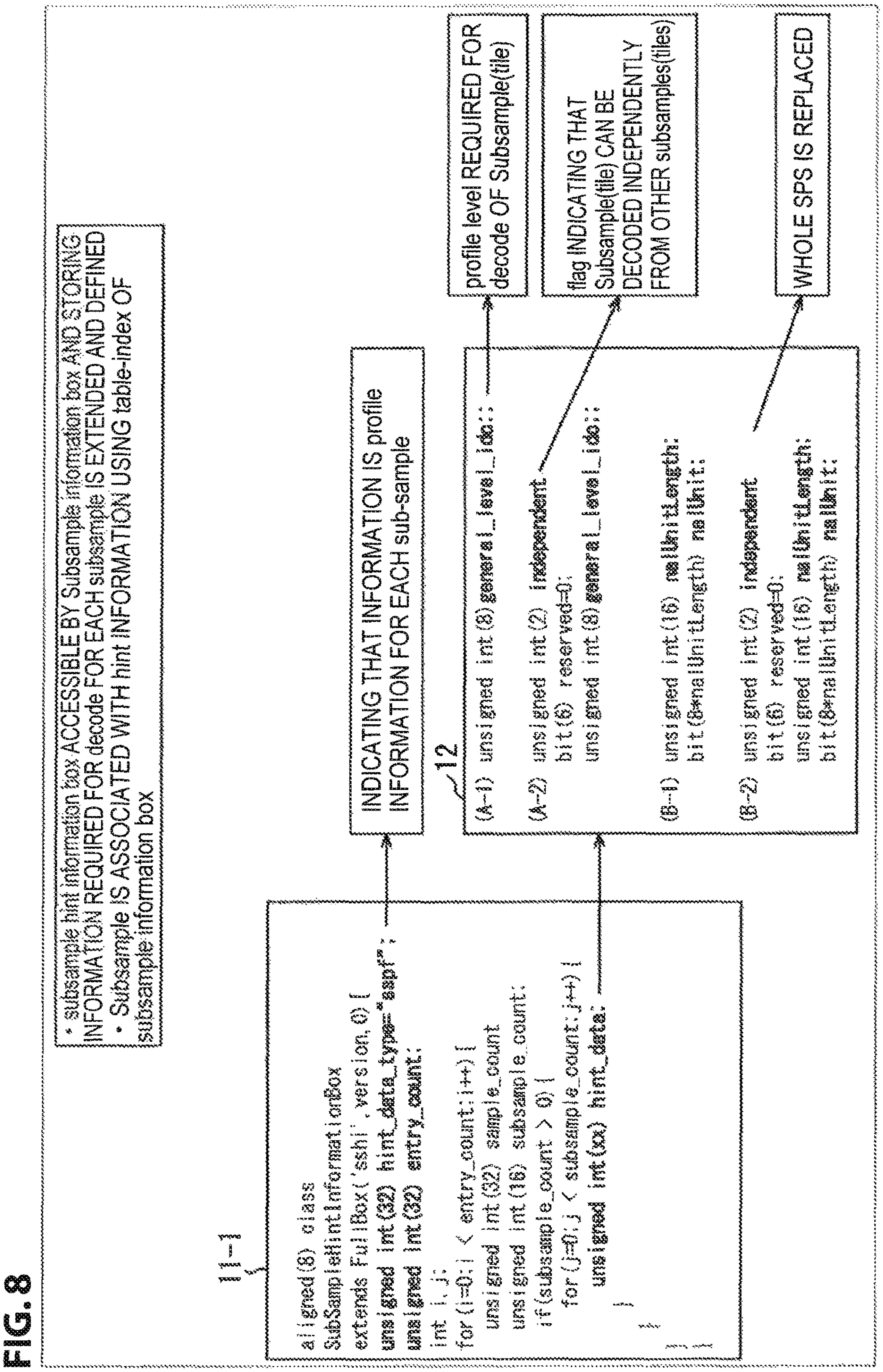
FIG. 8 is a diagram illustrating an example of a subsample hint information box.

A description example of the subsample hint information box 11 is illustrated in FIG. 8. The subsample hint information box 11-1 illustrated in FIG. 8 is a description example of Example 1.

As illustrated in FIG. 8, in the subsample hint information box 11-1, for example, "sspf" indicating that the information is profile information for each subsample is described as a hint data type (hint_data_type="sspf").

Further, in the subsample hint information box 11-1, for example, information of any example among examples illustrated in a square 12 is described as hint information (hint_data). For example, as in Example (A-1), information indicating a profile level required for decoding the subsample (tile) (that is, level indicating a degree of load of decoding processing of the subsample) (general_level_idc) may be described. Further, for example, as in Example (A-2), flag information (independent) indicating whether or not the subsample (tile) can be decoded independently from other subsamples (tiles) may be further described.

An example of semantics of this independent (independent) is illustrated in FIG. 9.

Further, for example, as in Example (B-1), information to be replaced when a sequence parameter set (SPS) of bit streams of the subsample (tile) is updated (that is, header information of encoded data of the subsample) (nalUnitLength, nalUnit) may be described. Further, for example, as in Example (B-2), flag information (independent) indicating whether or not the subsample (tile) can be decoded independently from other subsamples (tiles) may be further described.

Example 2

As reproduction (provision) of a partial image, as in examples illustrated in FIG. 1 and FIG. 2, there is a case where a plurality of samples are targeted. Therefore, while, in Example 1, hint information is stored for each subsample (tile), in Example 2, such a plurality of subsamples are arranged into a group, and information required for decoding the group is also provided.

Figure 10:
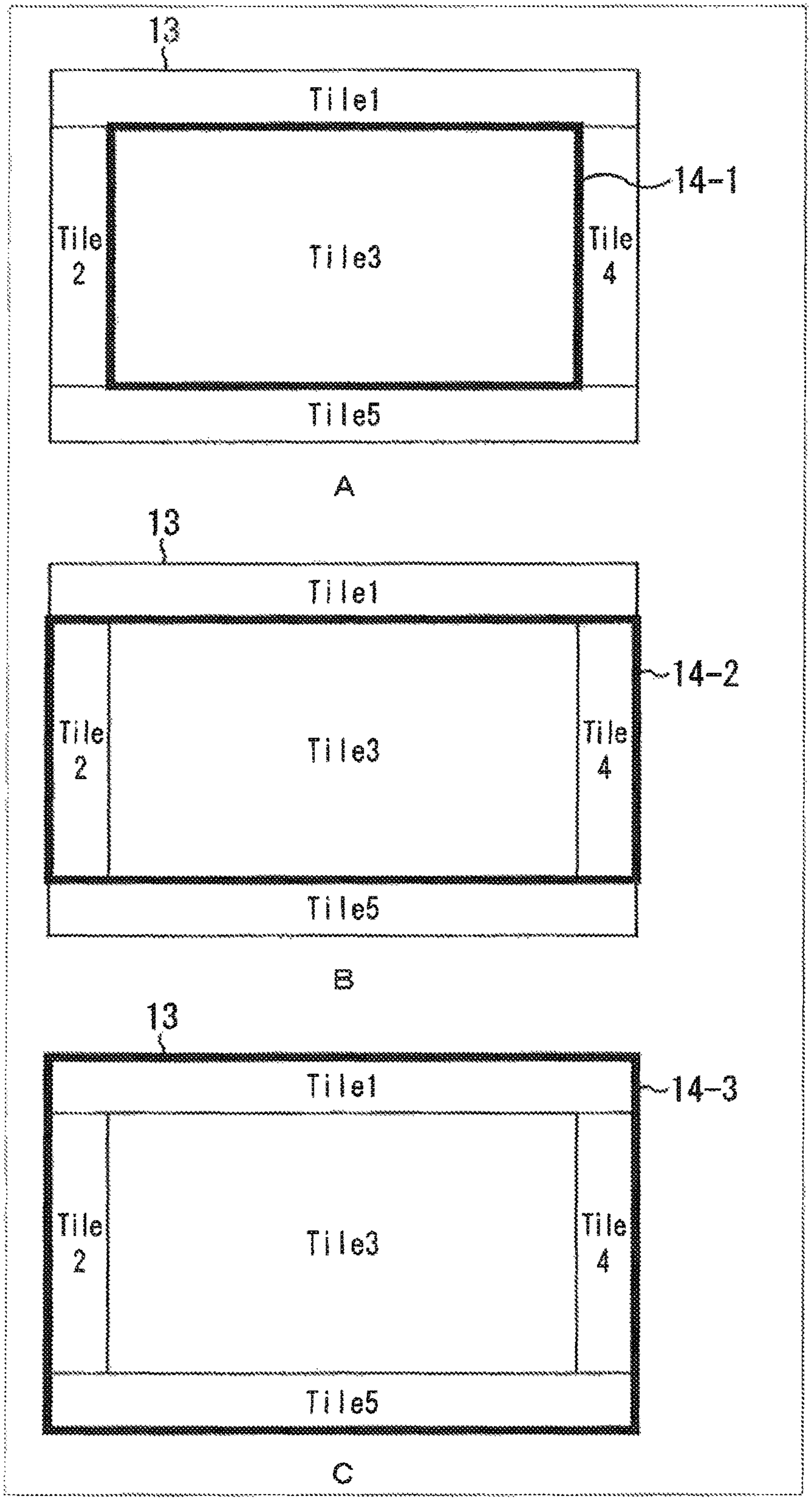
FIG. 10 is a diagram illustrating an example of a group of subsamples.

For example, in the case of A in FIG. 10, only tile 3 (Tile3) is provided as a group 14-1 among the whole image 13 including tile 1 (Tile1) to tile 5 (Tile5). Further, in the case of B in FIG. 10, tile 2 (Tile2) to tile 4 (Tile4) are provided as a group 14-2. Further, in the case of C in FIG. 10, all the tiles in the whole image 13 (that is, tile 1 (Tile1) to tile 5 (Tile5)) are provided as a group 14-3.

Also in Example 2, the subsample hint information box 11 in which information required for decoding (decode) is stored is used for each subsample (tile) which can be accessed by the subsample information box which is extended and defined as described above.

However, in the case of Example 2, information for grouping a plurality of subsamples and information required for decoding each group of tiles (information which is normally not required) are respectively provided as subsample hint information boxes 11. That is, these pieces of information are stored in boxes different from each other. By this means, it is possible to update a sequence parameter set (SPS) of encoded data of the tile group only using the box storing the information required for decoding each grouped tile group.

Figure 11:
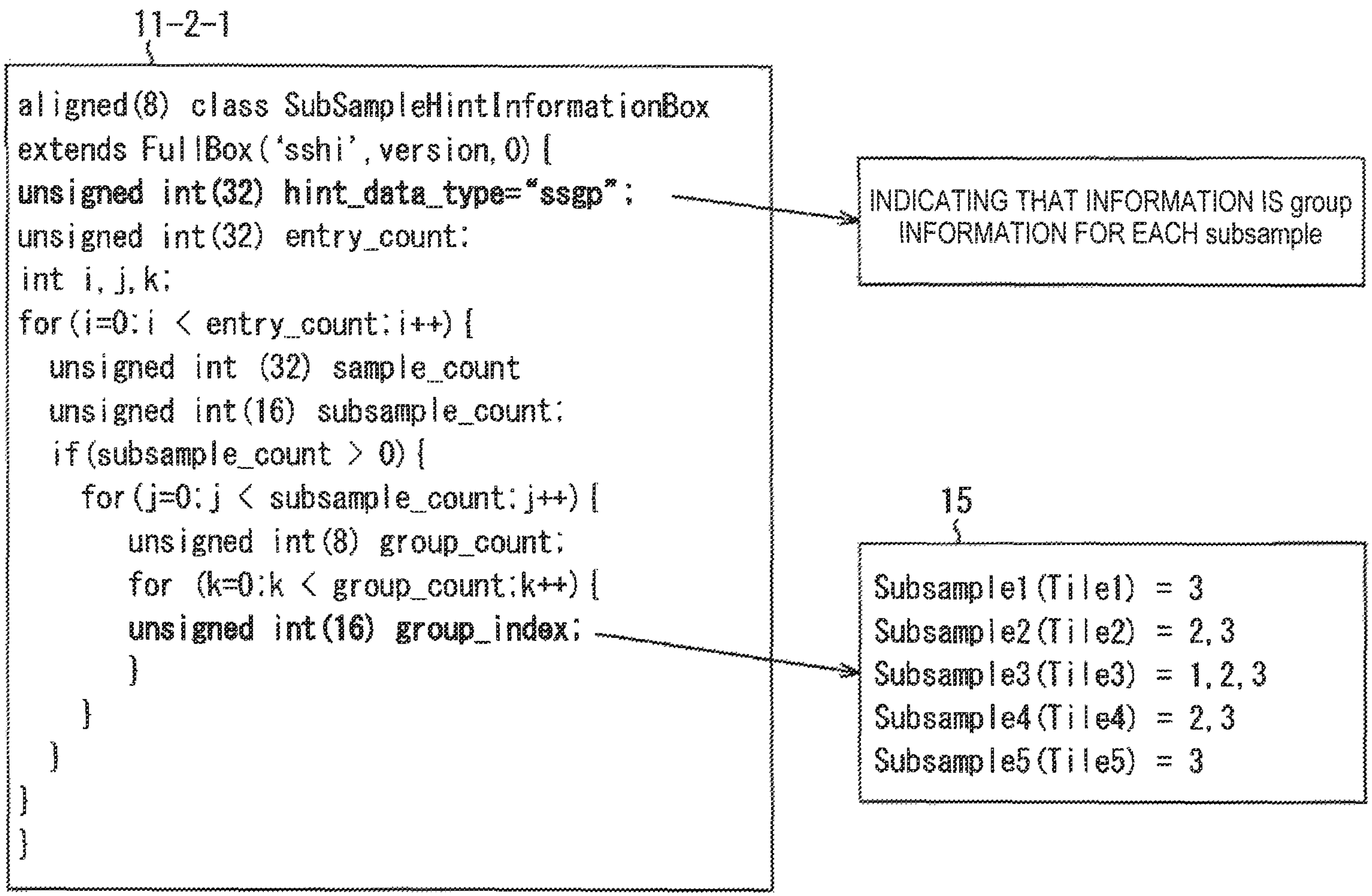
FIG. 11 is a diagram illustrating another example of the subsample hint information box.
Figure 12:
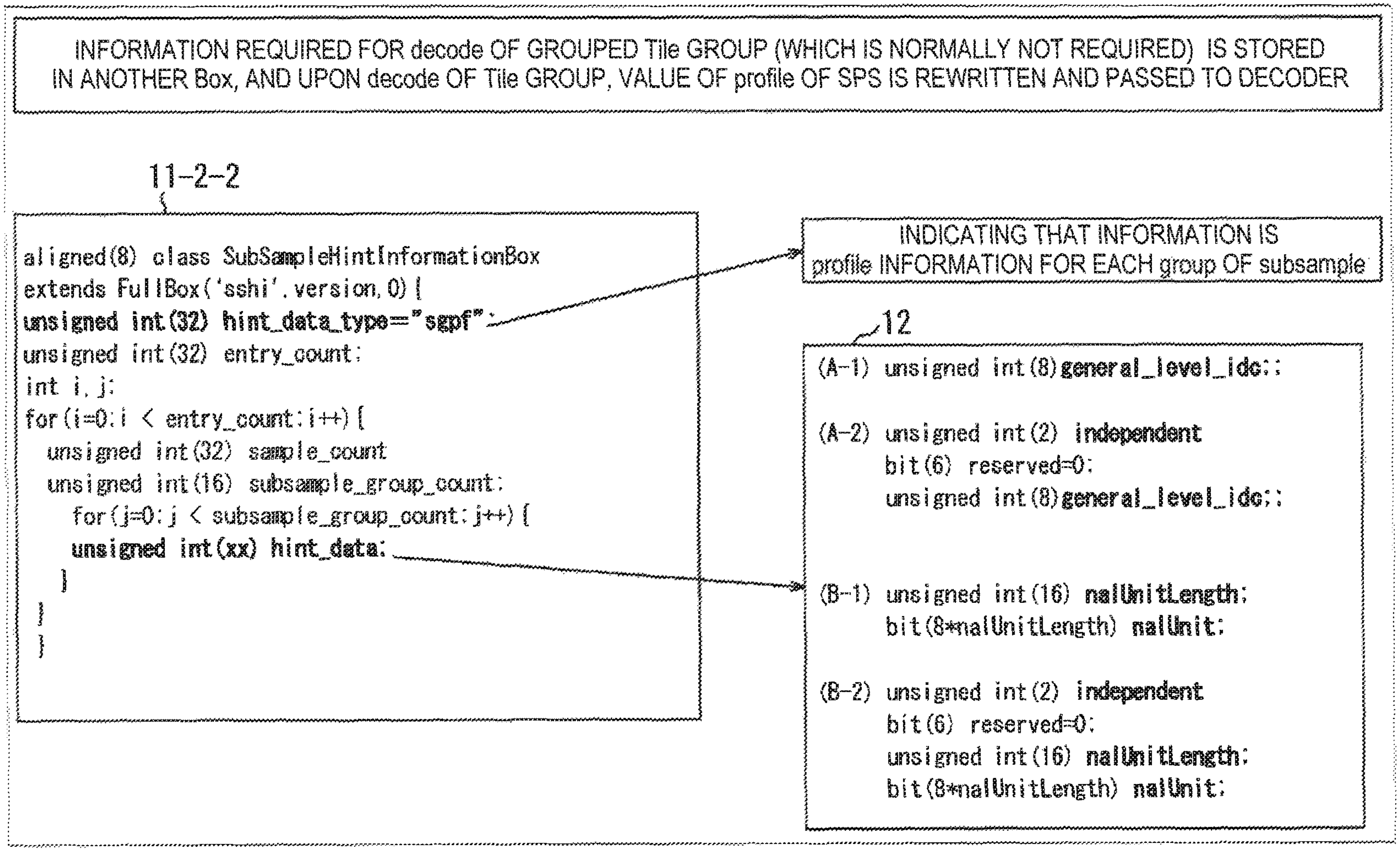
FIG. 12 is a diagram illustrating another example of the subsample hint information box.

FIG. 11 and FIG. 12 illustrate description examples of the subsample hint information boxes 11. A subsample hint information box 11-2-1 illustrated in FIG. 11 is a description example of information for grouping a plurality of subsamples in Example 2.

As illustrated in FIG. 11, in the subsample hint information box 11-2-1, for example, "ssgp" indicating that the information is group information of the subsample is described as a hint data type (hint_data_type="ssgp").

Further, in the subsample hint information box 11-2-1, a group index (group_index) which is identification information indicating a group to which the subsample belongs is described. For example, in the case of the example of FIG. 10, information as indicated in a square 15 is described as the group index.

A subsample hint information box 11-2-2 illustrated in FIG. 12 is a description example of the information required for decoding each group of tiles in Example 2.

As illustrated in FIG. 12, in the subsample hint information box 11-2-2, for example, "sgpf" indicating that the information is information required for decoding each tile group (hint_data_type="sgpf") is described as the hint data type.

Further, in the subsample hint information box 11-2-2, for example, information of any example among examples as illustrated in the square 12 is described as hint information (hint_data). That is, in this case, a level indicating a degree of load of decoding processing of the group of subsamples and header information of encoded data of the group of subsamples can be described as the subsample information.

It should be noted that in place of independent (independent), a motion constrained tile set ID (motion constrained tile set ID) can be stored.

Example 3

In the case of Example 2, while a plurality of subsample hint information boxes 11 are required, in Example 3, these boxes are put together in one box. In Example 3, subsample hint information boxes 11 are provided for each group of subsamples (tiles), and an index table of the subsamples is created in the subsample hint information boxes 11.

Figure 13:
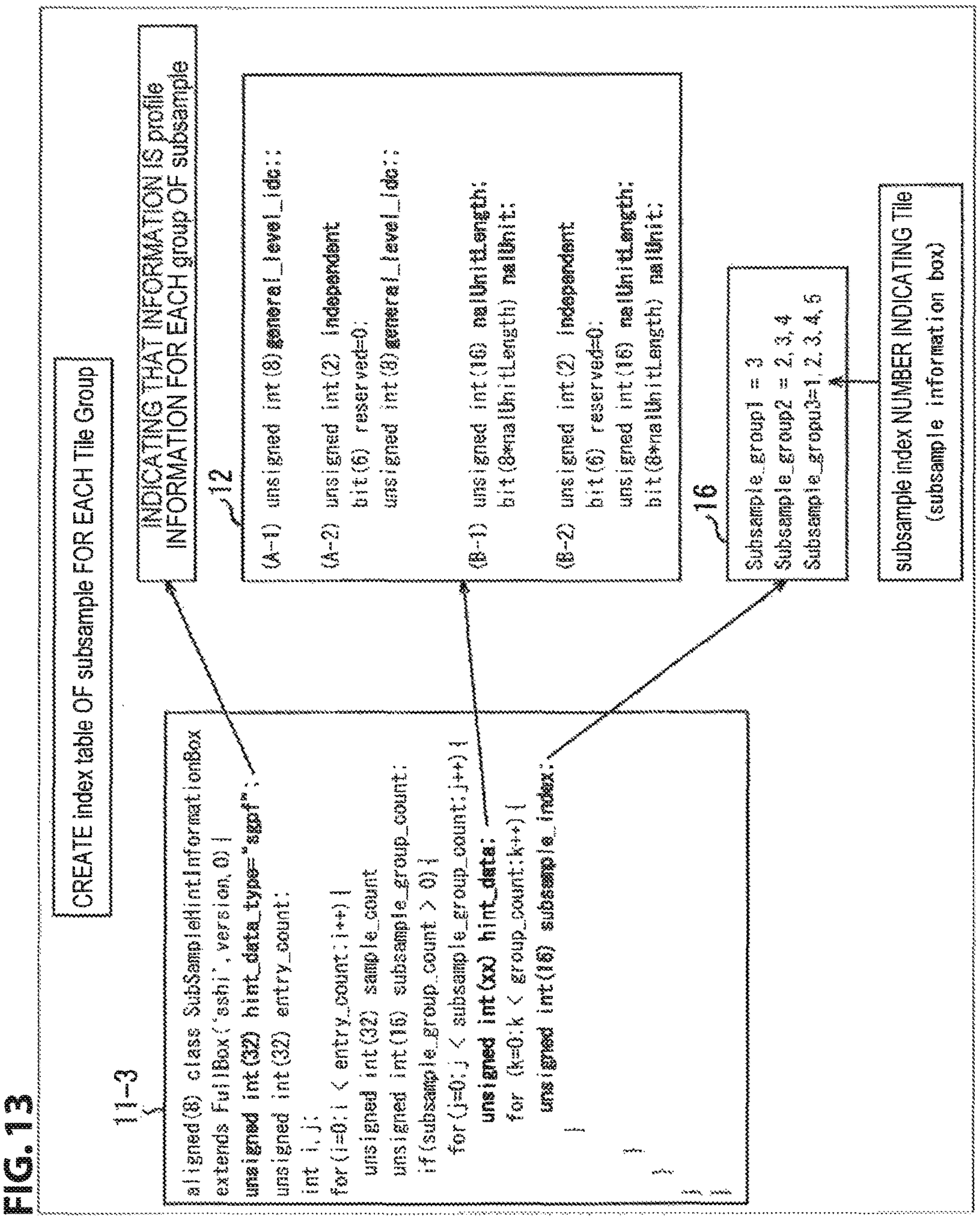
FIG. 13 is a diagram illustrating still another example of the subsample hint information box.

A description example of the subsample hint information box 11 is illustrated in FIG. 13. The subsample hint information box 11-3 illustrated in FIG. 13 is a description example of Example 3.

As illustrated in FIG. 13, in the subsample hint information box 11-3, for example, "sgpf" indicating that the information is profile information for each group of subsamples is described as a hint data type (hint_data_type="sgpf").

Further, in the subsample hint information box 11-3, for example, any example among the examples as illustrated in the square 12 is described as hint information (hint_data).

Further, in the subsample hint information box 11-3, a subsample index (subsample_index) which is identification information indicating a subsample belonging to the group is described. For example, in the case of an example of FIG. 10, information as indicated in a square 16 is described as this subsample index.

It should be noted that an entry count (entry_count) indicates how many times hint information changes within the sequence, and a sample count (sample_count) indicates during how many samples (pictures) the same hint information continues.

That is, in the subsample hint information box 11-3, identification information of a subsample belonging to the group and hint information of the group can be included as the subsample information. Further, as hint information of the group, a level indicating a degree of load of decoding processing of the group or header information of encoded data of the group can be included.

<Extension of Sample Group Description Box and Sample to Group Box>

While, in the above description, an example where the sample hint information box 11 is provided has been described, the present technique in which subsample information including hint information used as a reference for decoding processing of a subsample which is a partial region which can be independently decoded is included in a file, is not limited to this method. For example, by extending the sample group description box and the sample to group box in an MP4 file format, subsample information including hint information used as a reference for decoding processing of a subsample which is a partial region which can be independently decoded can be included in a file.

Figure 14:
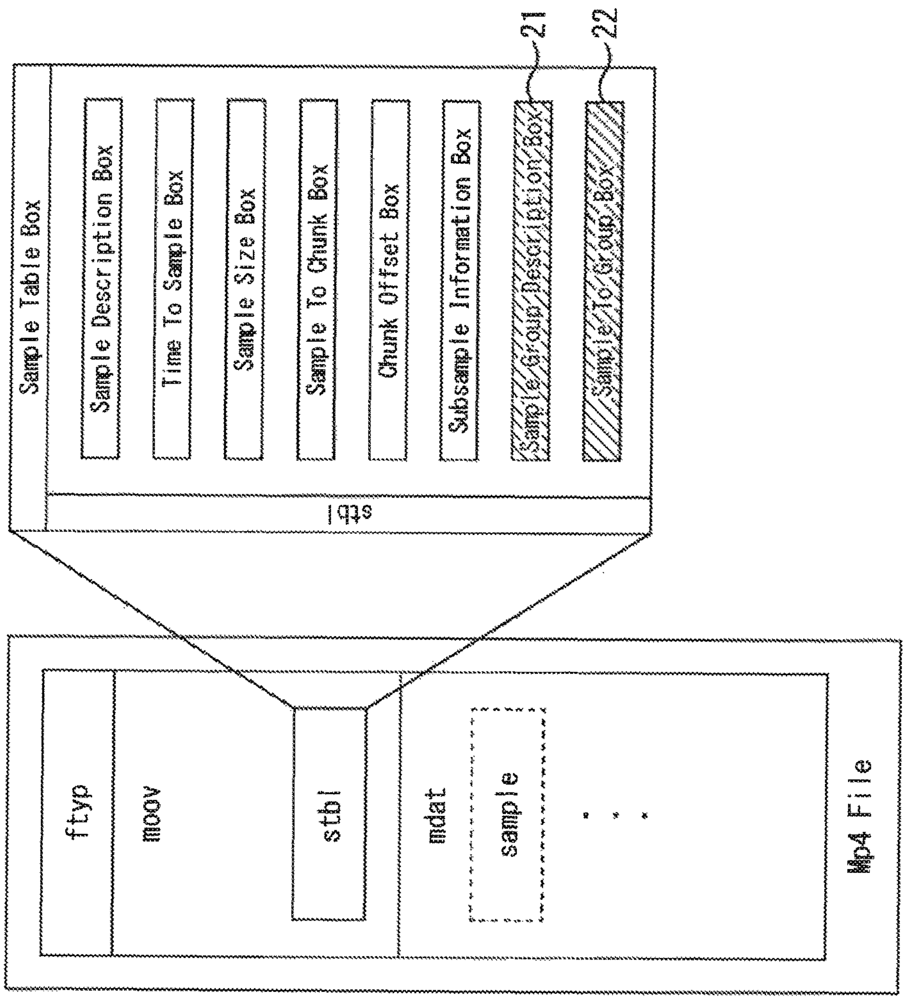
FIG. 14 is a diagram for explaining outline of an MP4 file format.

As illustrated in FIG. 14, in a sample table box of an MP4 file, the sample group description box (Sample Group Description Box) 21 and the sample to group box (Sample To Group Box) 22 can be provided.

Figure 15:
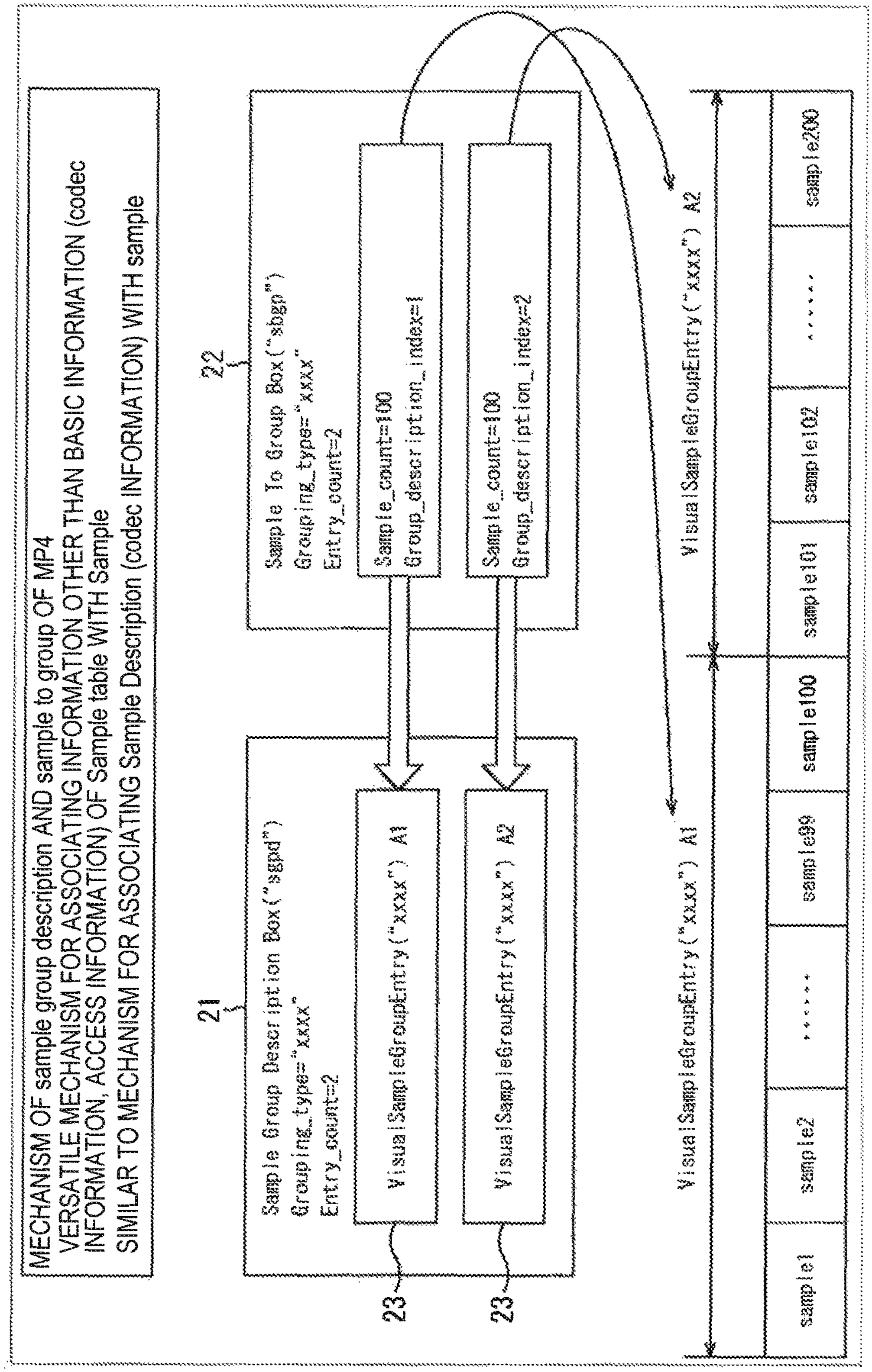
FIG. 15 is a diagram for explaining outline of an MP4 file format.

As illustrated in FIG. 15, in the sample group description box 21, as a visual sample group entry (VisualSampleGroupEntry) 23, information other than basic information of a sample table such as information relating to codec (codec) and access information is stored.

In the sample to group box 22, information associating the visual sample group entry 23 with respective samples is stored.

By this means, it is possible to put information which would be redundant if described for each sample, into one, so that it is possible to reduce an information amount.

Example 4

In Example 4, subsample information including hint information used as a reference for decoding processing of a subsample which is a partial region which can be independently decoded is included in a file using this sample group description box 21 and the sample to group box 22.

Figure 16:
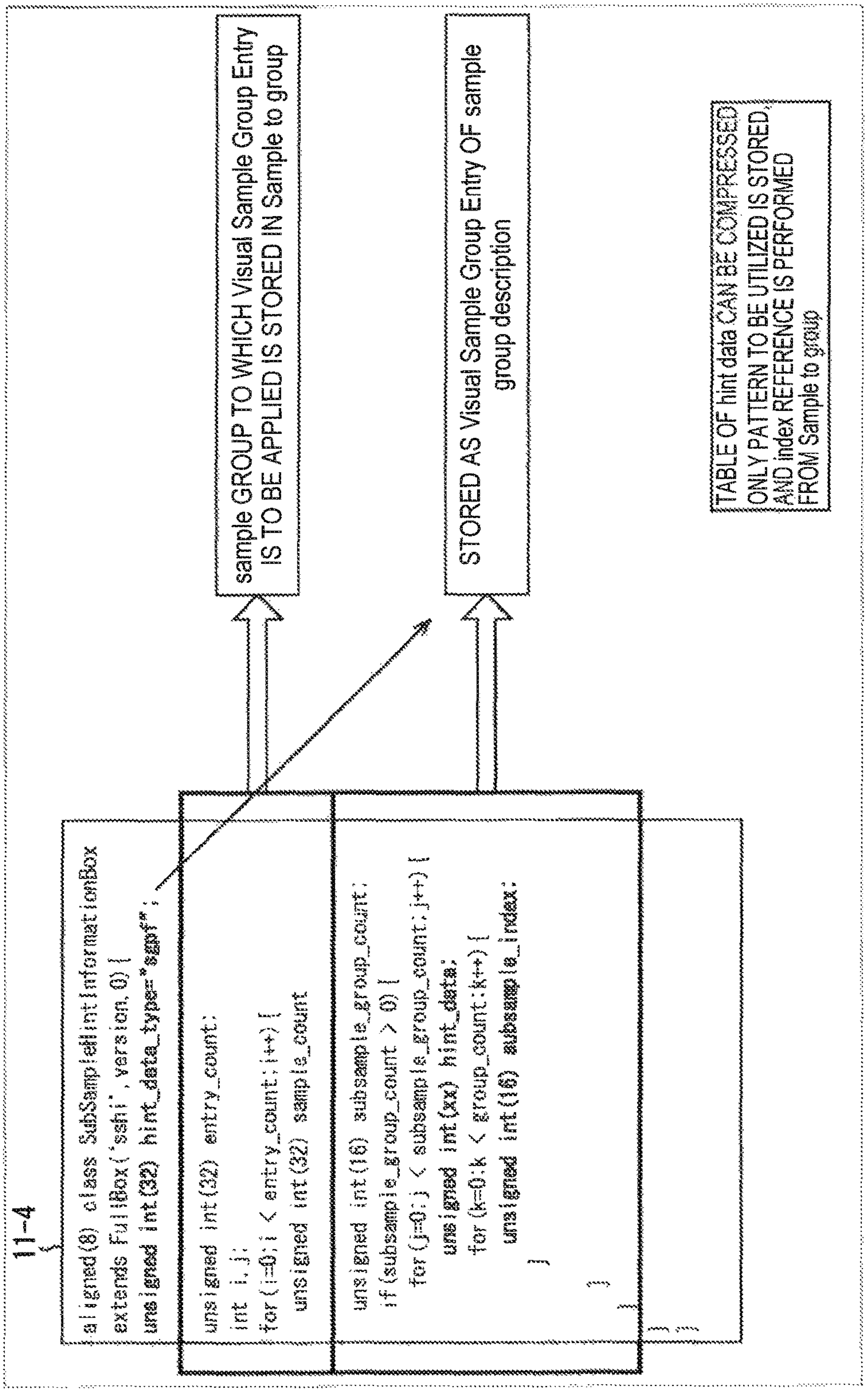
FIG. 16 is a diagram illustrating an extension example of a sample table box.

The example is illustrated in FIG. 16. A subsample hint information box 11-4 illustrated in FIG. 16 is a description example of Example 3. In Example 4, among these description, a hint data type, and information enclosed in a square at a lower side including hint data are stored in the sample group description box 21 as a visual sample group entry 23. Further, among the subsample hint information box 11-4, information enclosed by a square in an upper side including an entry count is stored in the sample to group box 22 as information associating the visual sample group entry 23 with the samples.

That is, in the case of this example, it is possible to perform index reference from the sample to group box 22 by storing only a pattern to be utilized. Further, it is possible to compress a table of hint data, so that it is possible to reduce an information amount.

It should be noted that while, in the above description, a case has been described where the method of Example 4 is applied to information of the subsample hint information box of Example 3, the method of Example 4 can be also applied to information of the subsample hint information box in Example 1 and Example 2. That is, information of the subsample hint information box described in Example 1 and Example 2 can be also stored in the sample group description box 21 and the sample to group box 22 in a similar manner to the case of Example 3 described above.

Entry Example 1

Figure 17:
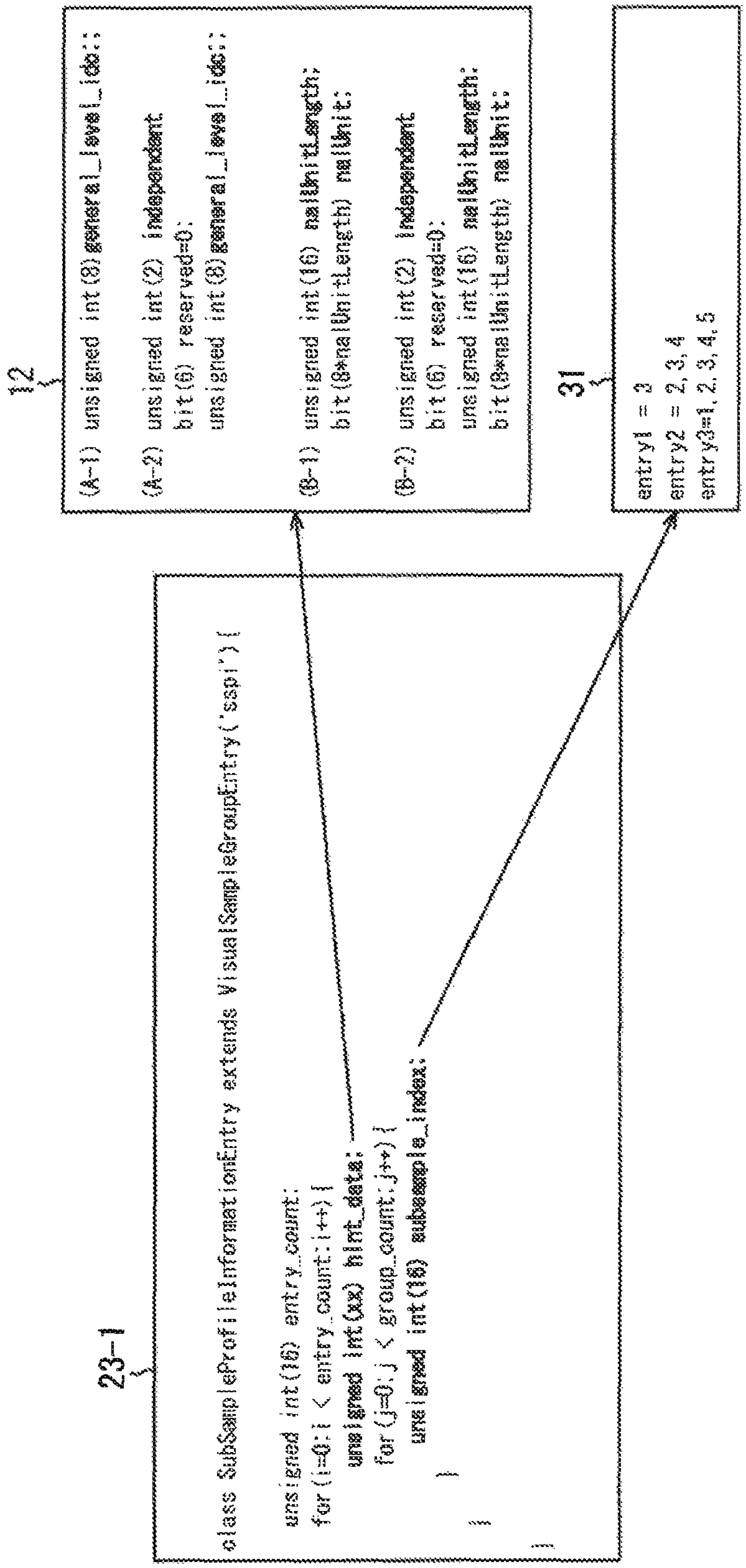
FIG. 17 is a diagram illustrating an extension example of a visual sample group entry.

A visual sample group entry 23-1 of FIG. 17 indicates an example of the visual sample group entry 23 extended to store profile information of the subsample (SubSamleProfileInformation Entry extends VisualSampleGroupEntry ('sspi')) in the case where an entry is constituted in a similar manner to the group in the example of FIG. 10. In this visual sample group entry, hint information (hint_data) and identification information of a group to which the entry corresponds (GroupID) are set for each entry. In this case, as illustrated in FIG. 17, for example, information of any example among examples as illustrated in the square 12 is described as this hint information (hint_data).

Further, in this case, a subsample index which is identification information of a subsample (tile) belonging to each entry is listed as in the example within a square 31.

Entry Example 2

Figure 18:
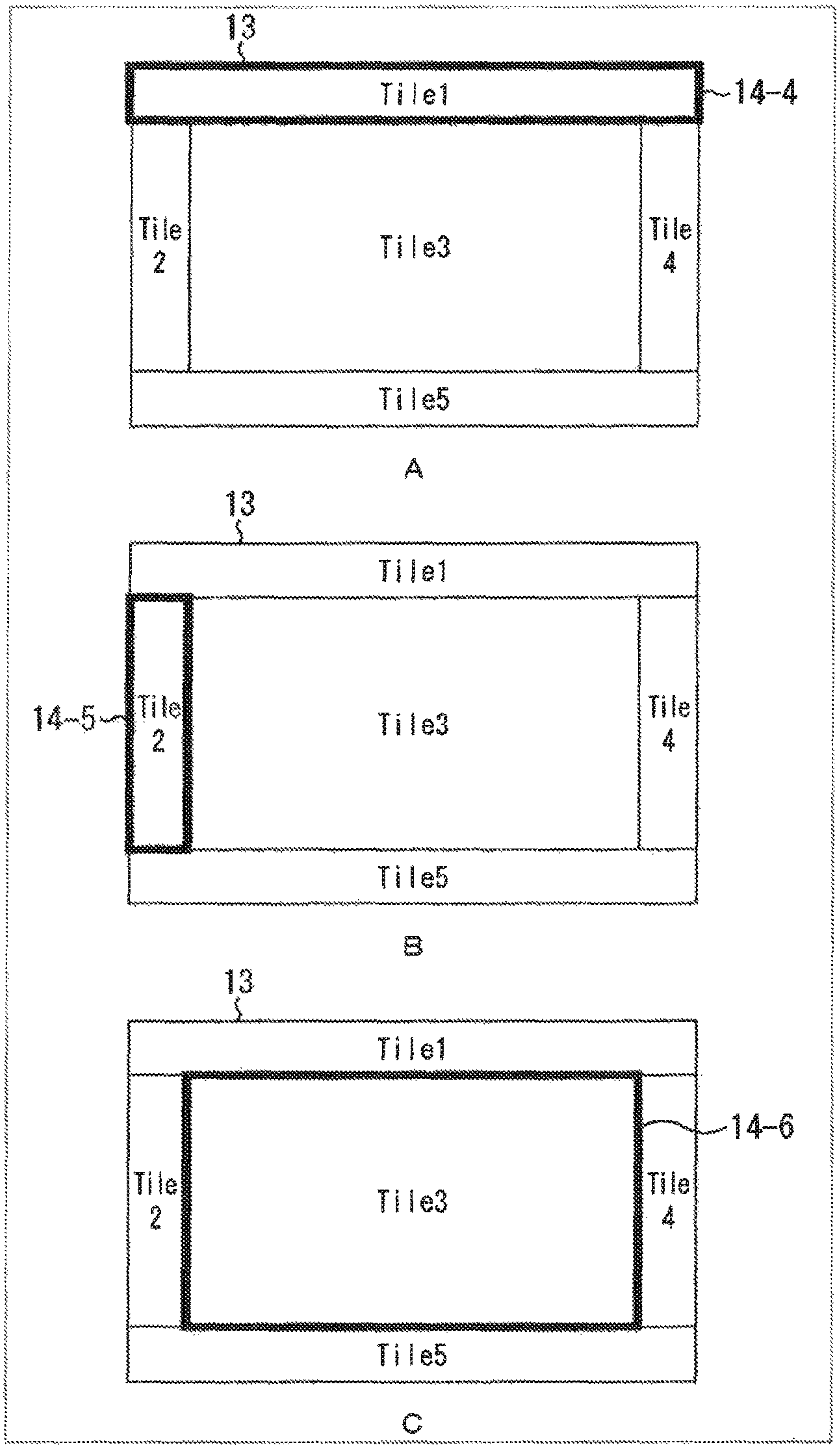
FIG. 18 is a diagram illustrating an example of a subsample index.

An example of entries different from those in FIG. 10 is illustrated in FIG. 18. In the case of the example of FIG. 18, subsamples (tiles) are respectively set as entries (groups). That is, in the case of A in FIG. 18, tile 1 (Tile1) is provided as an entry 14-4, in the case of B in FIG. 18, tile 2 (Tile2) is provided as an entry 14-5, and in the case of C in FIG. 18, tile 3 (Tile3) is provided as an entry 14-6. While not illustrated, in a similar manner, tile 4 (Tile4) and tile 5 (Tile5) are respectively provided as different entries.

Figure 19:
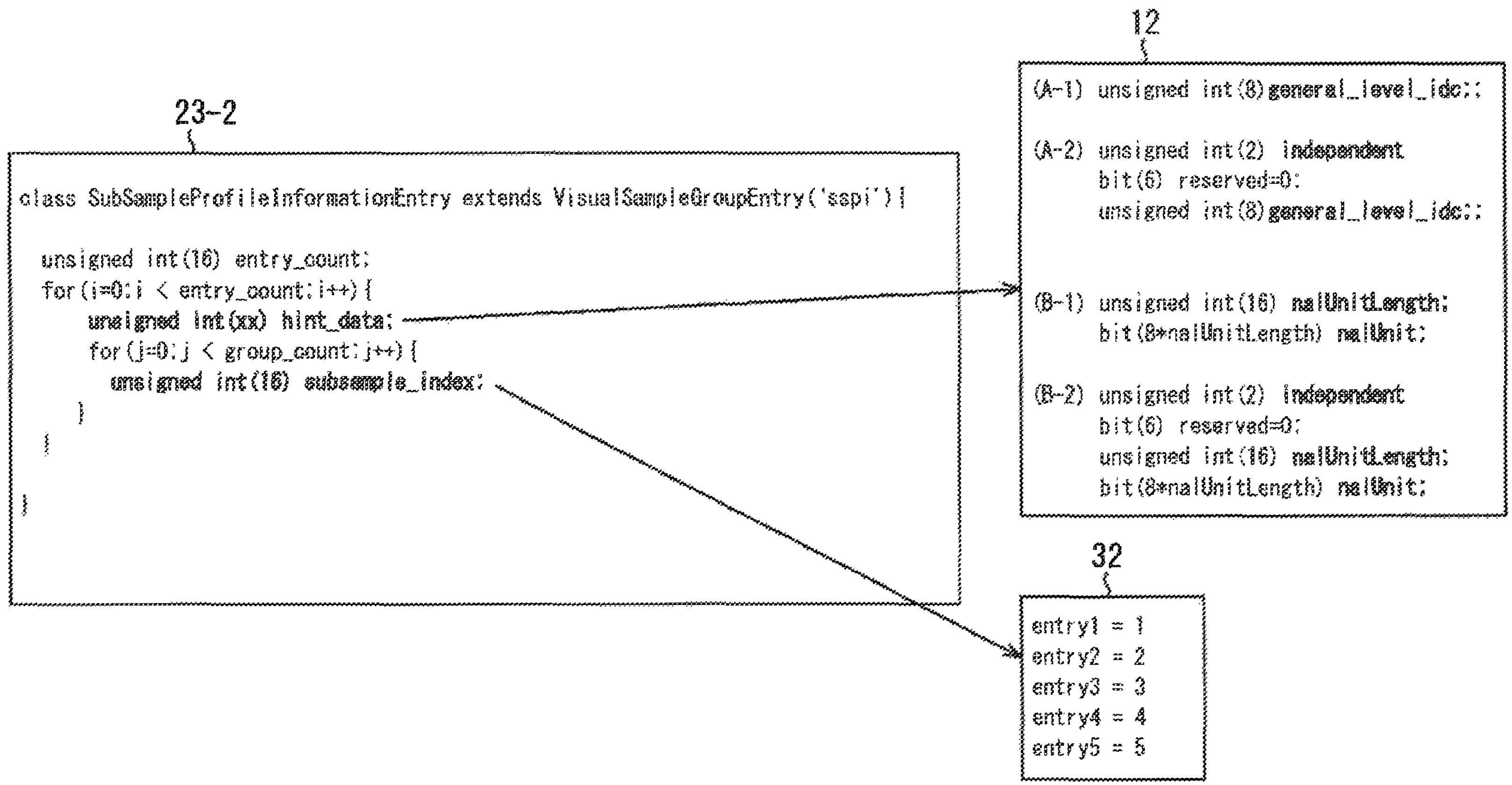
FIG. 19 is a diagram illustrating another extension example of the visual sample group entry.

As in the example of FIG. 18, when a plurality of subsample (tiles) are not formed into a group, in other words, when the subsamples (tiles) are respectively set as entries, a visual sample group entry 23 extended to store profile information of the subsample (SubSampleaProfileInforamtionEntry extends VisualSampleGroupEntry' ('sspi')) is as illustrated in the example of FIG. 19.

In this case, as in the visual sample group entry 23-2 in FIG. 19, for example, information of any example among examples as illustrated in the square 12 is described as hint information (hint_data) for each entry. Further, a subsample index which is identification information of a subsample (tile) belonging to each entry is listed as in the example in a square 32. That is, in this case, one subsample index is assigned to each entry.

<Other Example of Visual Sample Group Entry>

Figure 20:
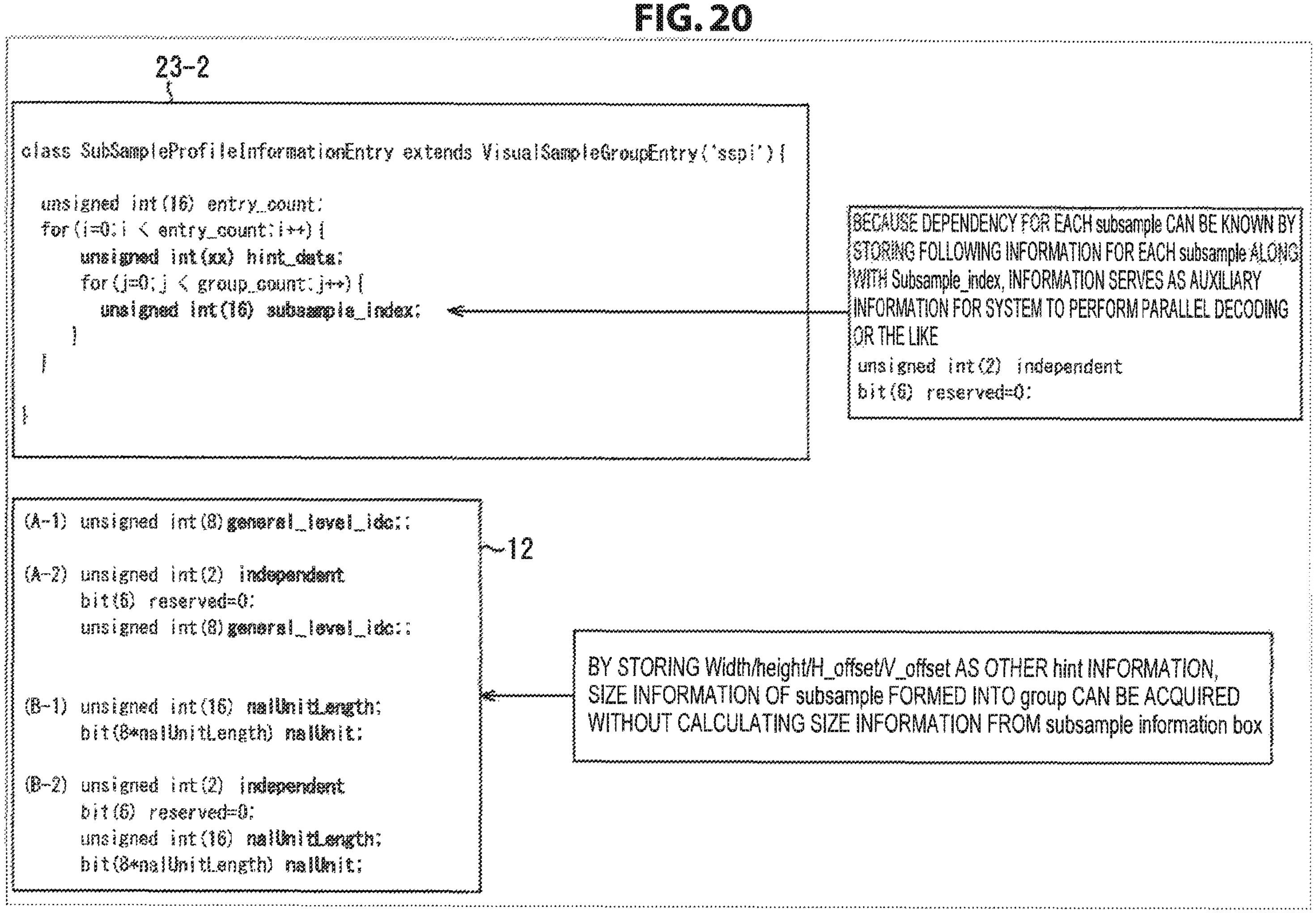
FIG. 20 is a diagram illustrating still another extension example of the visual sample group entry.

While, in the above description, a case has been described where, as in the visual sample group entry 23-2 in FIG. 20, a subsample index (subsample_index) is included in the visual sample group entry, for example, it is also possible to store flag information (independent) indicating that the subsample (tile) can be decoded independently from other subsamples (tiles) or information such as a reserved field (reserved=0) along with the subsample index for each subsample as described below.

unsigned int(2) independent bit(6) reserved=0;

By this means, because it is possible to know dependency for each subsample, the information can be used as auxiliary information for a system to perform parallel decoding, or the like.

Further, while, in the above description, a case has been described where, as in the visual sample group entry 23-2 in FIG. 20, information of any example among examples as illustrated within the square 12 is described as hint information (hint_data), it is also possible to further describe other hint information. For example, it is also possible to store information relating to a size of grouped subsamples (tiles), such as a width (Width) and a height (height), or store information relating to a location of grouped subsamples (tiles), such as offset in a horizontal direction (H_offset) and offset in a vertical direction (V_offset).

By storing such information, a system can easily acquire size information of the grouped subsamples without calculating the information from the subsample information box (subsample information box).

Further, it is also possible to describe mcts_id which is information for identifying a partial region which can be independently decoded in bit streams of HEVC as hint information (hint_data).

Figure 21:
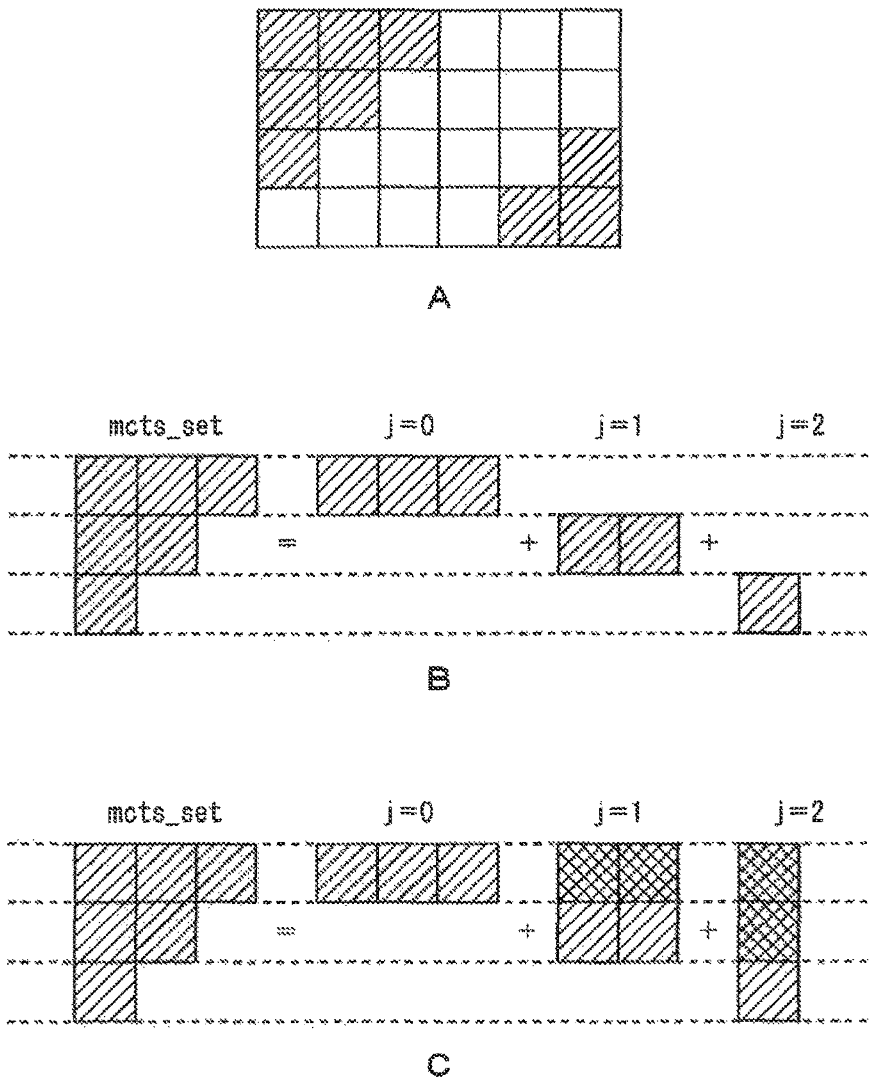
FIG. 21 is a block diagram illustrating an example of mcts.

In MCTS SEI (Motion constrained tile set Supplemental Enhancement Information) of HEVC, a partial region which can be independently decoded is set for each rectangle set. For example, when it is assumed that a shaded area in an upper left part of A in FIG. 21 is a partial region which can be independently decoded, the partial region is set for each set as illustrated in B in FIG. 21 in MCTS SEI. It should be noted that as in the example illustrated in C in FIG. 21, tiles included in the set may overlap with tiles in other sets. The number of pixels in the partial region can be calculated from the number of pixels of each set as illustrated in, for example, the example of D in FIG. 21.

An example of syntax of MCTS SEI is illustrated in FIG. 22. As illustrated in FIG. 22, respective identification information (mcts_id) is assigned to a partial region as illustrated in FIG. 21. By describing this identification information (mcts_id) as hint information (hint_data), it is possible to easily associate the partial region of HEVC with the subsamples in the MP4 file format, so that it is possible to easily update (for example, replace) header information of, for example, the sequence parameter set (SPS) in the system.

Example 5

By the way, in the case of Example 4, a case has been described where the visual sample group entry is extended and a subsample belonging to each entry is described using a subsample index. In this case, information of the subsample information box is utilized as access information to tiles in the sample. That is, in this case, it is necessary to interpret the meaning of the subsample in a layer in which the MP4 file is to be parsed.

In Example 5, a method will be proposed as a method for accessing tiles within the sample, which can be a substitute for such a method. That is, in place of the subsample information box, a configuration of a NAL unit (NAL unit) of bit streams constituting the sample is described in the visual sample group entry (Map Group Entry). For example, the visual sample group entry is extended, and NAL units of bit streams of HEVC are grouped (HEVCNALUUMapGroupEntry).

When the NAL units are grouped in this manner, it is possible to support the grouped NAL units with the same processing flow in a layer in which the MP4 file is to be parsed regardless of meaning of grouping.

Figure 23:
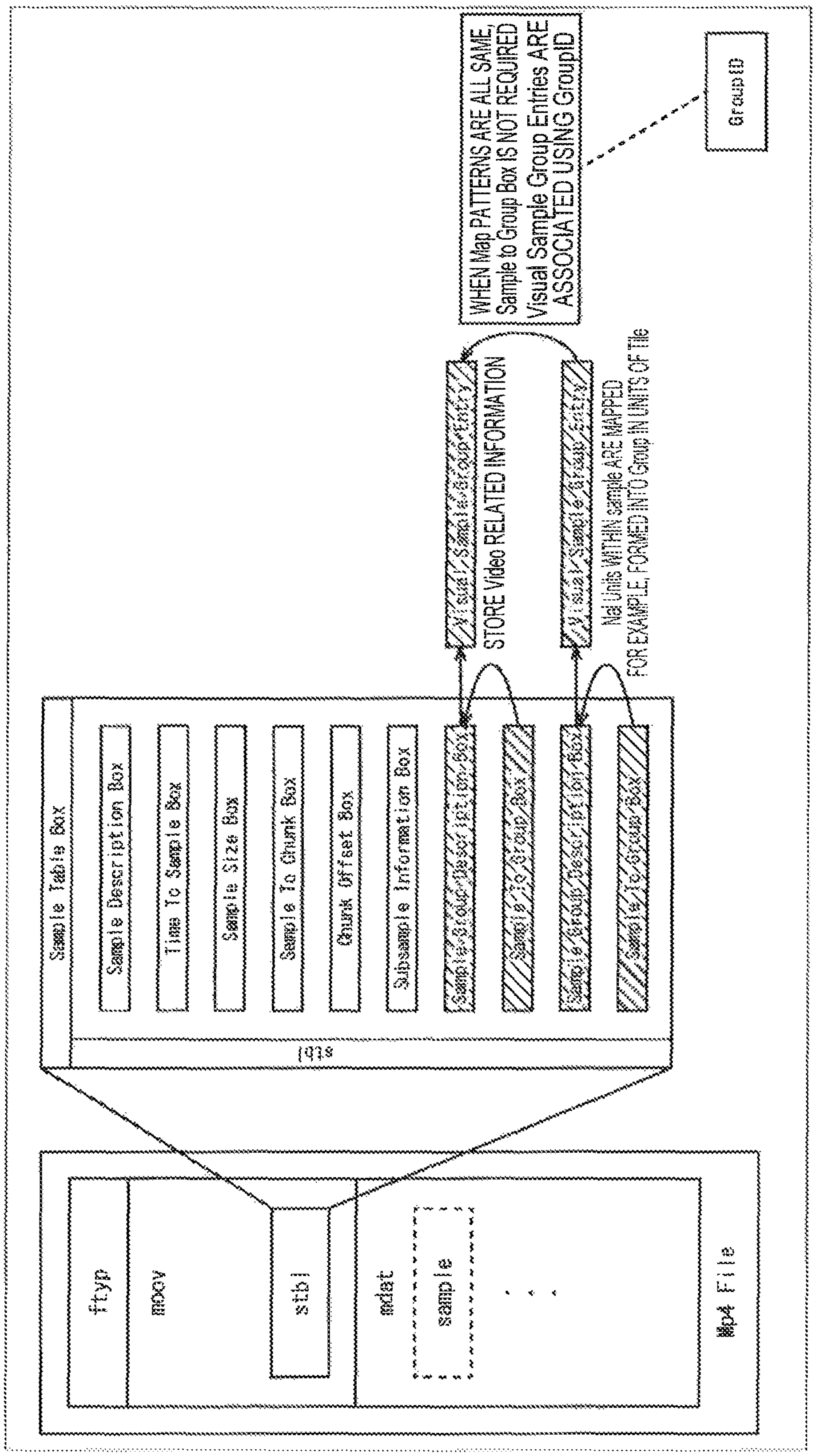
FIG. 23 is a diagram illustrating an extension example of an MP4 file format.

The example is illustrated in FIG. 23. As illustrated in FIG. 23, for example, a visual sample group entry in which NAL units within the sample are to be mapped (for example, grouped for each tile) is prepared, and, for example, in the visual sample group entry in which video related information such as hint information is stored, the visual sample group entry in which the NAL units within the sample are to be mapped is referred to.

Visual sample group entries are associated with each other using identification information of the group (GroupID). It should be noted that when map patterns of the NAL units are all the same, a sample to group box is not required.

Figure 24:
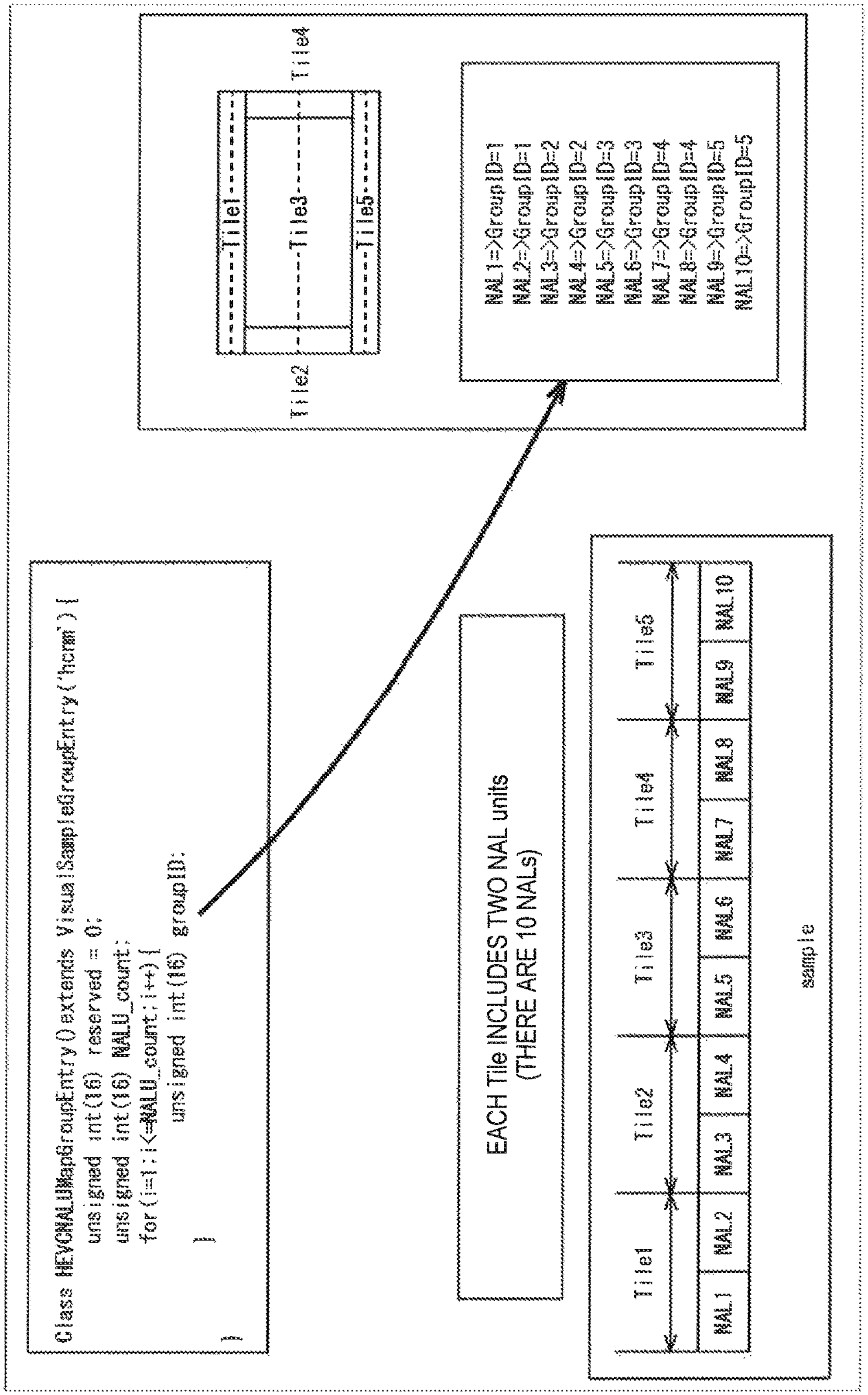
FIG. 24 is a diagram illustrating an extension example of a visual sample group entry.

An example of syntax of the visual sample group entry (HEVCNALUMapGroupEntry( ) extends VisualSampleGroupEntry('hcnm')) in which the NAL units in the sample are mapped is illustrated in an upper left part of FIG. 24. As illustrated in FIG. 24, in this visual sample group entry, identification information of the group (GroupID) to which each NAL unit (NAL unit) belongs is set.

For example, as illustrated in a lower left part of FIG. 24, there are five subsamples (tiles (Tile)) within the sample, and each subsample is constituted with two NAL units. In this case, association between the NAL unit and the GroupID (map pattern of the NAL unit) is as in the example illustrated in a right side of FIG. 24. Therefore, the sample is constituted with 10 NAL units. NALU_count of syntax of the visual sample group entry (HEVCNALUMapGroupEntry( ) extends VisualSampleGroupEntry('hcnm')) illustrated in an upper left part of FIG. 24 indicates the number of NAL_unit. Further, as illustrated in a lower left part of FIG. 24, it is possible to define from which NAL_unit each tile (Tile) starts. In this example, Tile1 starts from NAL1, Tile2 starts from NAL3, Tile3 starts from NAL5, Tile4 starts from NAL7, and Tile5 starts from NAL9. It is also possible to define such information indicating from which NAL_unit each Tile starts as syntax of the visual sample group entry (HEVCNALUMapGroupEntry( ) extends VisualSampleGroupEntry('hcnm')) illustrated in the upper left part of FIG. 24.

Figure 25:
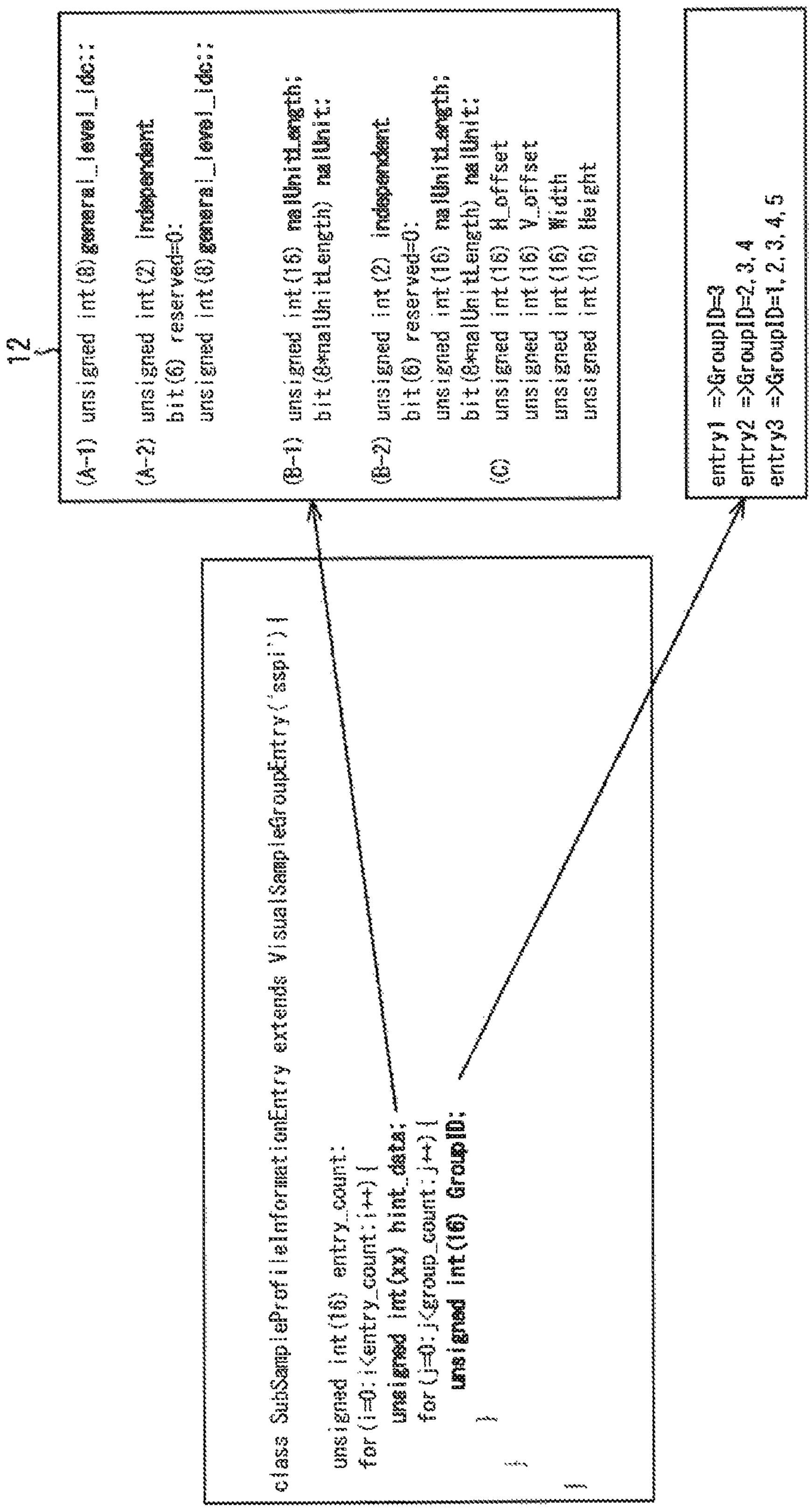
FIG. 25 is a diagram illustrating another extension example of the visual sample group entry.

An example of the visual sample group entry (SubSampleProfileInformationEntry extends VisualSampleGroupEntry('sspi')) described in Example 4, in which profile information of the subsample is stored, is illustrated in FIG. 25. In this visual sample group entry, hint information (hint_data) and identification information of the group (GroupID) corresponding to the entry are set for each entry.

As illustrated in FIG. 25, as this hint information (hint_data), for example, information of any example among examples as illustrated in the square 12 as described in Example 1 to Example 4 is set.

However, in FIG. 25, as illustrated in the square 12, as the hint information, Example (C) is added in addition to Examples (A-1), (A-2), (B-1) and (B-2). Here, information relating to a location of the grouped subsamples (tiles), such as offset in a horizontal direction (H_offset) and offset in a vertical direction (V_offset) is stored. Further, information relating to a size of the grouped subsamples (tiles), such as a width (Width) and a height (height) is stored. These are the same as the hint information described with reference to FIG. 20.

Further, in the identification information of the group (GroupID), any of identification information of the group (GroupID) used for mapping NAL units is set in the visual sample group entry (HEVCNALUMapGroupEntry( ) extends VisualSampleGroupEntry('hcnm')) in which NAL units within the sample are mapped described using the example of FIG. 24. That is, this identification information of the group (GroupID) indicates a group of tiles as in the example of FIG. 10.

Figure 26:
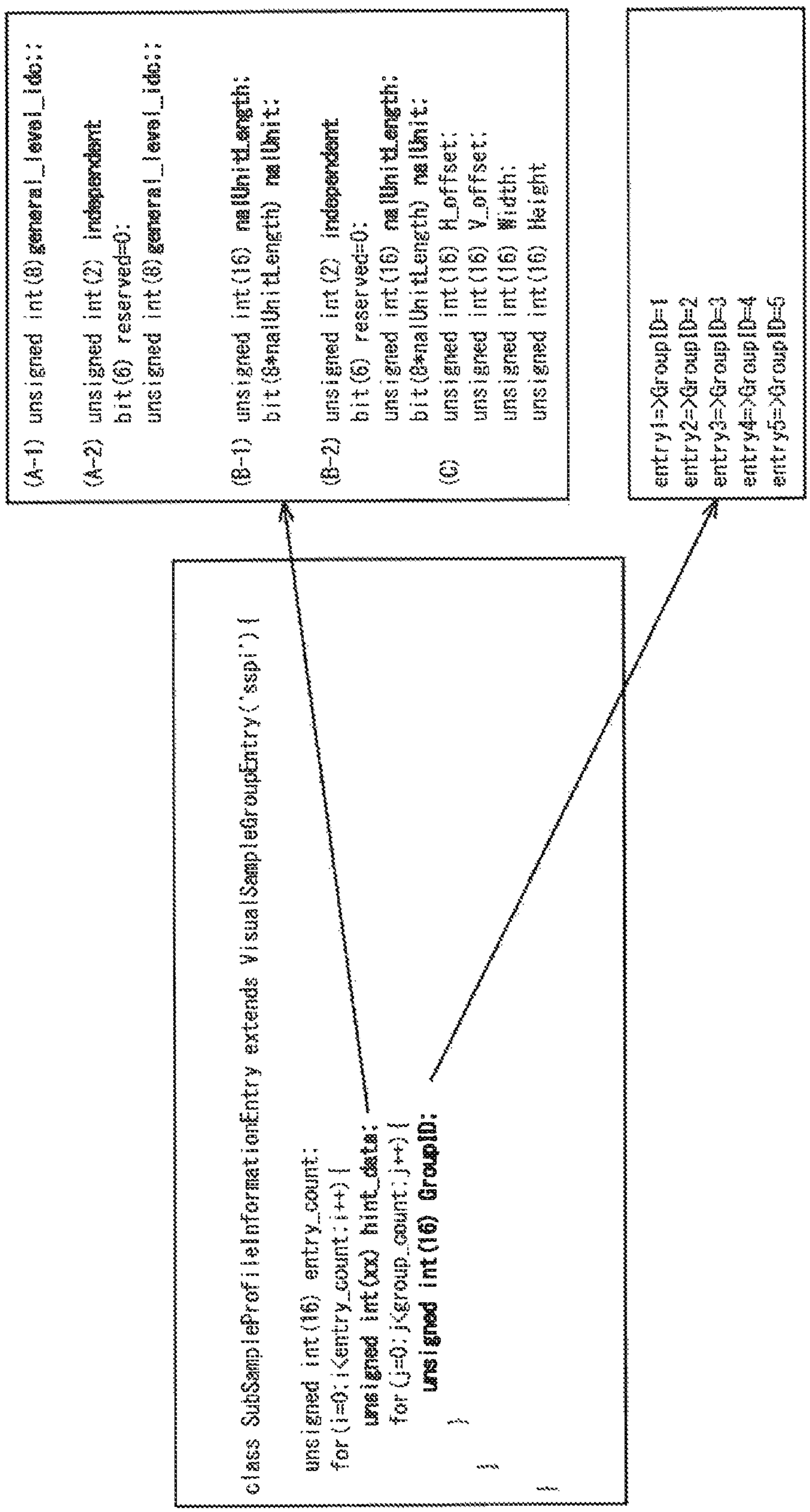
FIG. 26 is a diagram illustrating still another extension example of the visual sample group entry.

It should be noted that, as in the example of FIG. 18, also when a plurality of subsamples (tiles) are not grouped, information similar to that in the example of FIG. 25 is set as in the example illustrated in FIG. 26 in the visual sample group entry in which profile information of the subsample is stored (SubSampleProfileInformationEntry extends VisualSampleGroupEntry('sspi')). In this case, the identification information of the group (GroupID) indicates each tile.

By extending the visual sample group entry as described above and setting a configuration of the NAL unit, when the NAL units are grouped, it is possible to support the grouped NAL units with the same processing flow in a layer in which the MP4 file is parsed regardless of meaning of grouping.

It should be noted that BOX in which GROUP by MAP GROUP is formed into TILE GROUP may be defined as BOX different from SSPI (SubSample Profile Information). That is, identification information of the group (GroupID) by HEVCNALMapEntry corresponding to each entry may be defined in the visual sample group entry extended so as to store a tile group map entry (TileGroupMapEntry extends VisualSampleGroupEntry('tgpm')), which is a different box from the visual sample group entry (SubSampleProfileInformationEntry extends VisualSampleGroupEntry('sspi')) in which profile information of the subsamples defining hint information (hint_data) corresponding to the entry is stored.

In the case of the example of FIG. 25, syntax of TGPM may be, for example, set as follows:

```
Class TileGroupMapEntry extends VisualSampleGroupEntry ('tgpm') {
    unsigned int(16) entry_count;
for (i=0; i < entry_count; i++) {
    unsigned int(16) TileGroupID;
    unsigned int(16) group_count;
    for (j=0; j < group_count; j++) {
    unsigned int(16) GroupID
    }
  }
}
```

With such syntax, in the case of the example of FIG. 25, GroupID is assigned to TileGroupID as follows.

TileGroupID=1=>GroupID=3

TileGroupID=2=>GroupID=2, 3, 4

TileGroupID=3=>GroupID=1, 2, 3, 4, 5

Syntax of SSPI may be, for example, set as follows as a box different from the box.

```
class SubSampleProfileInformationEntry extends VisualSampleGroupEntry
('sspi') {
    unsigned int(16) entry_count;
    for (i=0; i < entry_count; i++) {
      unsigned int(16) TileGroupID;
      unsigned int(xx) hint_data;
    }
}
```

It should be noted that content of the hint information (hint_data) in this case is the same as that in the above-described examples (information of any example among examples as illustrated within the square 12 is set).

In this manner, by grouping GroupID in a box different from a box of sspi defining hint information, or the like, it is possible to reduce dependency of grouping on other information, so that grouping can be performed independently from other information. It is therefore possible to realize more versatile (flexible) grouping, and utilize the group of the GroupID (TileGroupID) in more versatile purpose of use. For example, it is possible to easily realize hierarchized and unhierarchized definition of the groupID without the need of taking into account a configuration of other information such as hint information.

Further, while the example of flag (flag) definition of the subsamples have been described with reference to FIG. 3, in the case of Example 5 described above, continuous NAL units grouped by HEVC NAL Map Group Entry may be further additionally defined. For example, as described below, in flag=5, the continuous NAL units grouped by HEVC NAL Map Group Entry may be additionally defined as sub-sample.

5:0:NAL-unit-based sub-samples. A sub-sample contains one or more contiguous NAL units. A sub-sample is mapped to GroupID, grouping in HEVC NAL Map Group Entry.

By this means, it is possible to realize byte access to an arbitrary Group based on NAL units.

2. Second Embodiment

<MP4 File (1)>

Figure 27:
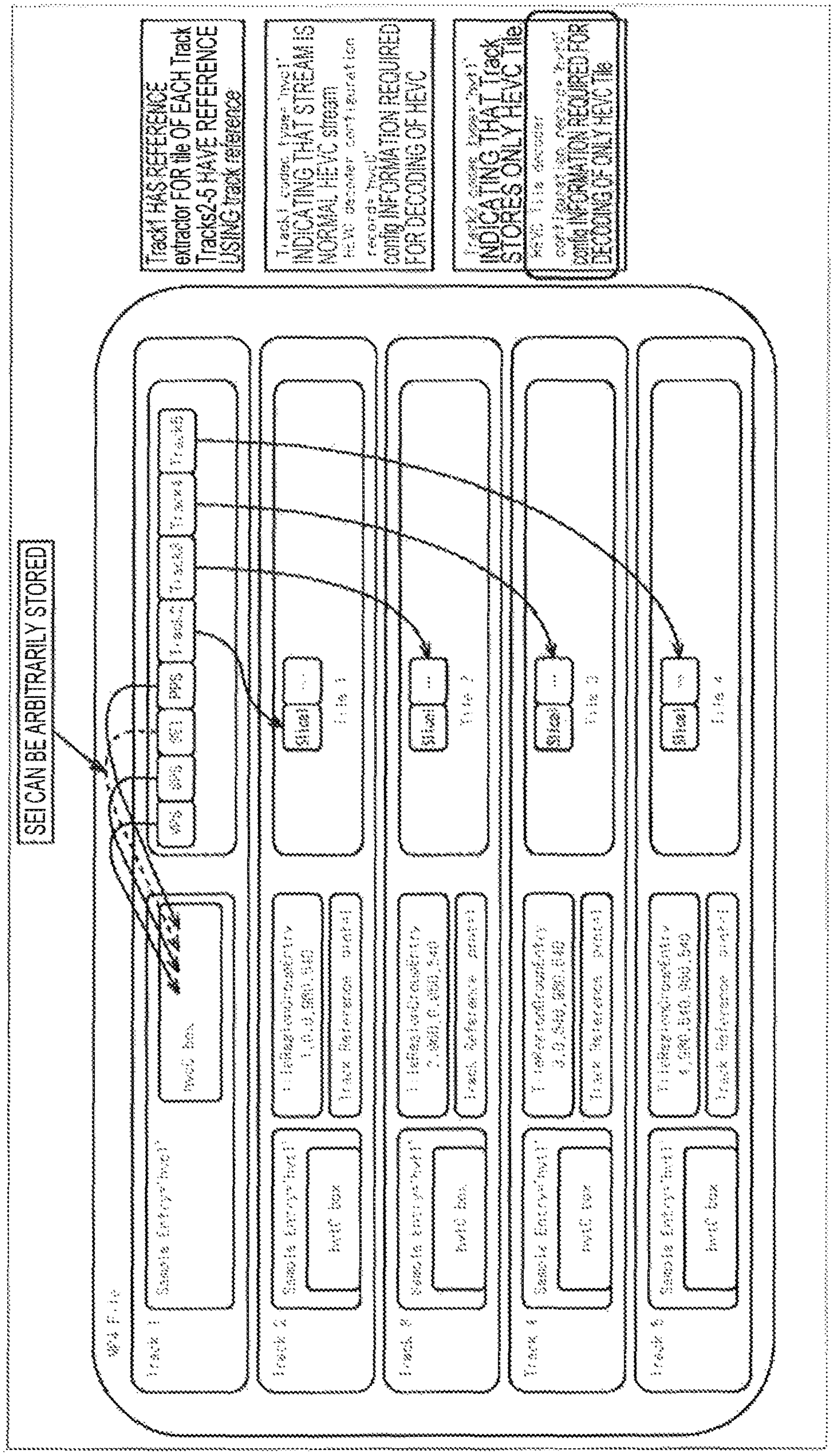
FIG. 27 is a diagram for explaining a configuration example of an MP4 file of a tile image.

An example of the MP4 file will be described next. FIG. 27 is a diagram for explaining a configuration example of the MP4 file of the tile image. This MP4 file is obtained by forming bit streams having a tile (Tile) structure into one file. As illustrated in FIG. 27, this MP4 file has five tracks of Track1 to Track5.

Track1 has an HEVC sample entry (HEVC sample entry) within the sample description box, and its codec type is hvc1 indicating that the bit streams are normal HEVC bit streams. This sample entry (Sample Entry) has an HEVC decoder configuration record (HEVC Decoder Configuration Record) (hvcC box) in which configuration information required for decoding HEVC is stored. Header information such as a video parameter set (Video Parameter Set (VPS)), a sequence parameter set (Sequence Parameter Set (SPS)) and a picture parameter set (Picture Parameter Set (PPS)) is also stored in this hvcC box. SEI may be arbitrarily stored in this hvcC box.

Track1 has extractor (extractor) Track2 to Track5 for referring to a tile (slice) of each track2 to track5. The extractor (extractor) Track2 refers to slice (Tile1) of Track2, and the extractor (extractor) Track3 refers to slice (Tile2) of Track3. In a similar manner, the extractor (extractor) Track4 refers to slice (Tile3) of Track4, and the extractor (extractor) Track5 refers to slice (Tile4) of Track5.

In track2 to track5, slice which is actual data of each Tile1 to Tile4 is stored. Further, while track2 to track5 have sample entries (Sample Entry), because only HEVC Tile is (independently) stored, a codec type is set as hvt1. The sample entries (Sample Entry) of these track2 to track5 have an HEVC decoder configuration record (HEVC Decoder Configuration Record) (hvtC box) required for decoding only the HEVC Tile. It should be noted that it is also possible to store grouped tiles (Tile) in one track.

track2 to track5 also have tile region group entries (TileRegionGroupEntry). In these tile region group entries (TileRegionGroupEntry) of track2 to track5, values of five parameters including GroupID which is identification information for identifying each tile, H_offset indicating a location (offset) in a horizontal direction of the tile, V_offset indicating a location (offset) in a vertical direction of the tile, H_width indicating a size (width) in the horizontal direction of the tile, and V_height indicating a size (height) in the vertical direction of the tile are defined. Further, these may be defined for the grouped tiles (Tile).

For example, in the tile region group entry (TileRegionGroupEntry) of Track2 (tile 1 (Tile1)), GroupID=1, H_offset=0, V_offset=0, H_width-=960 and V_height=540 are defined. Further, for example, in the tile region group entry (TileRegionGroupEntry) of Track3 (tile 2 (Tile2)), GroupID=2, H_offset=960, V_offset=0, H_width=960 and V_height=540 are defined. Further, for example, in the tile region group entry (TileRegionGroupEntry) of Track4 (tile 3 (Tile3)), GroupID=3, H_offset=0, V_offset=540, H_width=960 and V_height=540 are defined. Further, for example, in the tile region group entry (TileRegionGroupEntry) of Track5 (tile 4 (Tile4)), GroupID=4, H_offset=960, V_offset=540, H_width=960 and V_height=540 are defined. In this case, the whole image (1920×1080) includes four tiles (960×540) including two tiles in a vertical direction and two tiles in a horizontal direction.

Further, in track2 to track5, "prnt=1" is defined as track reference (Track Reference). This indicates that these track2 to track5 refer to Track1. That is, when any (any tile) of Track2 to Track5 is reproduced using this track reference, information of Track1 (such as a parameter set) is referred to.

<Syntax of HEVC Tile Decoder Configuration Record>

Basic syntax of an HEVC decoder configuration record (HEVC Decoder Configuration Record) (hvtC box) in which configuration information required for decoding only an HEVC Tile of the sample entry (Sample Entry) in FIG. 27 is stored is set as follows.

```
Class HEVCConfigurationBox extends Box('hvtc'){
  HEVCTileDecoderConfigurationRecord( )HEVCTileConfig;
}
```

<Example 1 of Syntax of HEVCTileDecoderConfigurationRecord>

Figure 28:
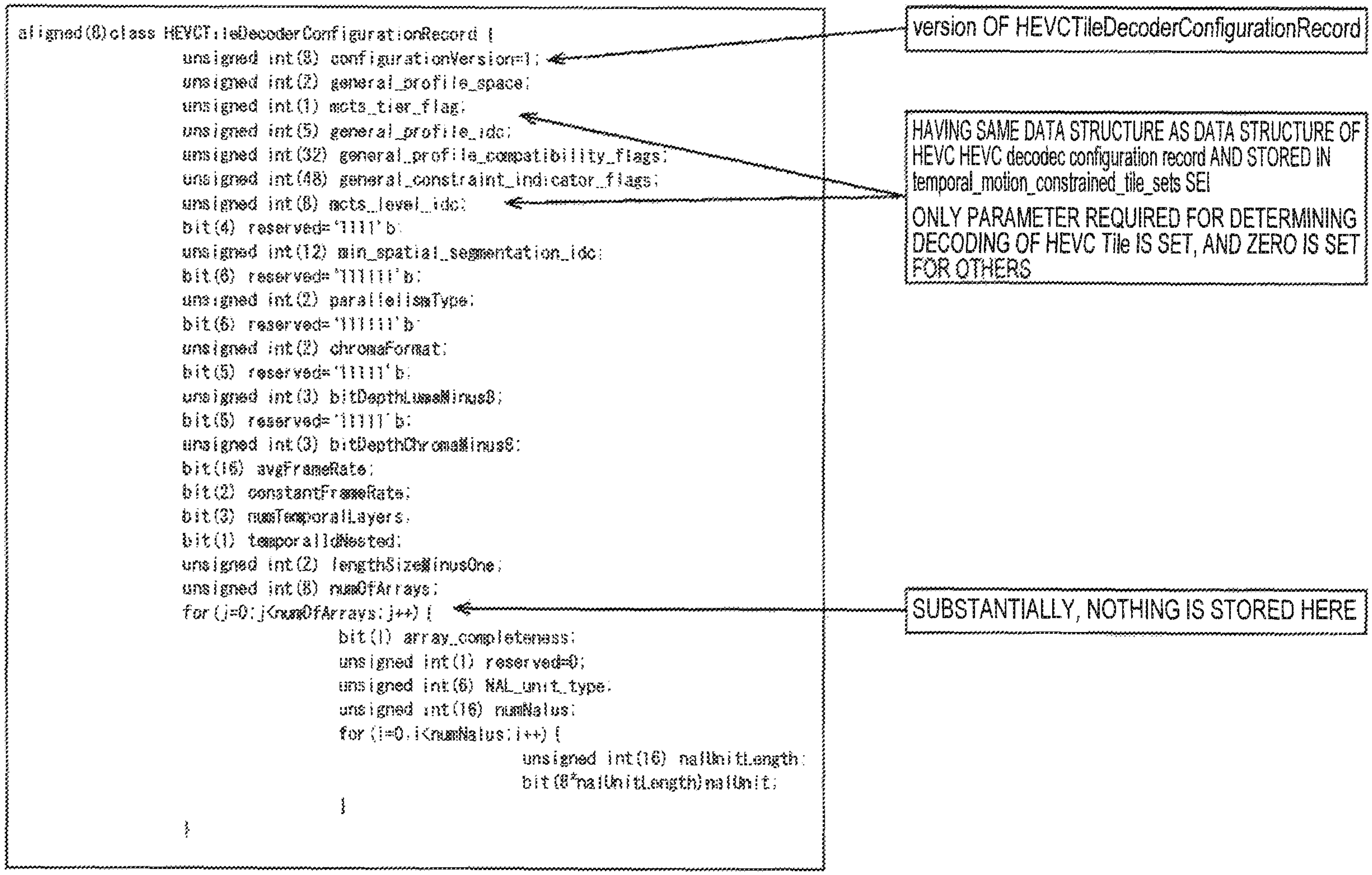
FIG. 28 is a diagram for explaining an HEVC tile decoder configuration record.

A specific example of syntax of the HEVCTileDecoderConfigurationRecord will be described next. FIG. 28 is a diagram for explaining the HEVC tile decoder configuration record. The HEVC tile decoder configuration record in Example 1 is constituted as illustrated in FIG. 28. configuration Version, mcts_tier_flag and mcts_level_idc are extensionally added.

configurationVersion indicates version of the HEVC tile decoder configuration record. In HEVC, two types of profiles of tier having different Bitrate are defined for the same image size. That is, the two types are main tier and high tier. mcts_tier_flag is a flag indicating which of the tier the tier is. mcts_level_idc is a level indicating a degree of load of decoding processing of the partial region as decoding load definition information which defines the degree of load of decoding processing of the partial region which can be independently decoded in temporal MCTS SEI (Temporal Motion constrained tile set Supplemental Enhancement Information).

Here, temporal motion constrained tile set SEI (temporal_motion_constrained_tile_sets SEI) will be described. FIG. 29 is a diagram illustrating an example of syntax of temporal MCTS SEI. In syntax of temporal MCTS SEI illustrated in FIG. 29, various information including mcts_tier_flag, mcts_level_idc, max_mcts_tier_flag and max_mcts_level_id is stored.

It should be noted that temporal MCTS SEI is substantially the same as MCTS SEI except the name. Further, mcts_level_idc in FIG. 28 and FIG. 29 is substantially the same as generals_level_idc illustrated in the square 12 in FIG. 8, FIG. 12, FIG. 13, FIG. 17. FIG. 19, FIG. 20, FIG. 25, FIG. 26, or the like, except the name.

In the example of FIG. 28, among parameters having the same data structure as that of HEVC decodec configuration record and stored in temporal_motion_contrained_tile_sets SEI, only parameters required for determining decoding of HEVC Tile, that is, mcts_tier_flag and mcts_level_idc are set. In HEVCTileDecoderConfigurationRecord in FIG. 28, zero is set for other items because the other items are not required. Alternatively, the same value as that of HEVC decoder configuration record is set.

That is, in this Example 1, nothing is substantially stored in numOfArrays.

<Example 2 of Syntax of HEVCTileDecoderConfigurationRecord>

FIG. 30 is a diagram for explaining an HEVC tile decoder configuration record. The HEVC tile decoder configuration record of Example 2 is constituted as illustrated in FIG. 30.

Example 2 of FIG. 30 has basically the same configuration as that of Example 1 of FIG. 28, except that, while, in Example 1, nothing is substantially stored in numOfArrays, in Example 2, temporal_motion constrained_tile_sets SEI corresponding to HEVC Title is stored in numOfArrays.

<Example 3 of Syntax of HEVCTileDecoderConfigurationRecord>

Figure 31:
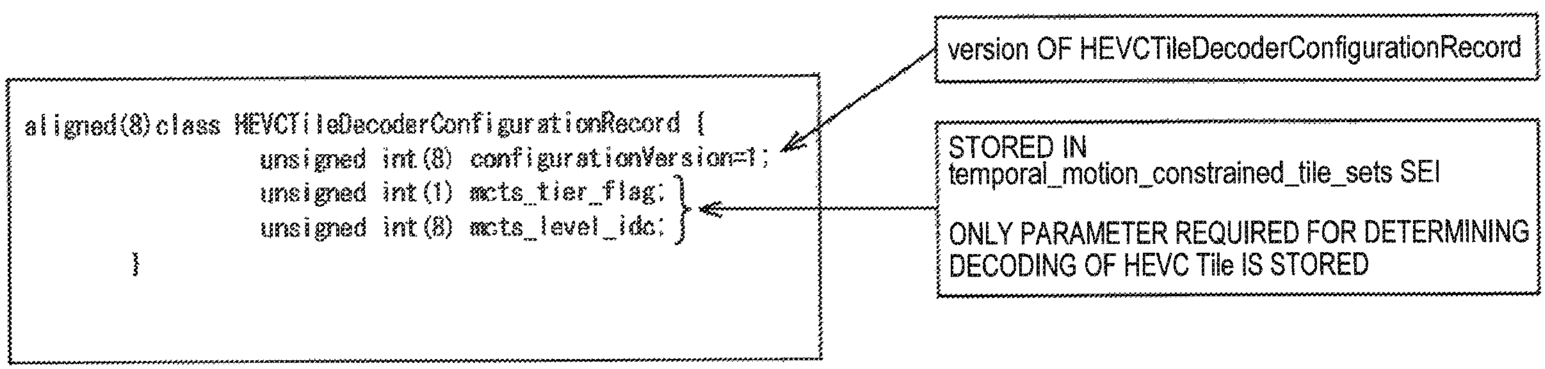
FIG. 31 is a diagram for explaining an HEVC tile decoder configuration record.

FIG. 31 is a diagram for explaining an HEVC tile decoder configuration record. The HEVC tile decoder configuration record of Example 3 is constituted as illustrated in FIG. 31.

As illustrated in FIG. 31, in Example 3, unlike with the examples in FIG. 28 and FIG. 30, instead of the HEVC tile decoder configuration record being extended, the pattern of the HEVC tile decoder configuration record is uniquely specified. That is, in Example 3, in addition to configurationVersion, among parameters stored in temporal_motion_constrained_tile_sets SEI, only mcts_tier_flag and mcts_level_idc which are parameters required for determining decoding of HEVC Tile are stored.

<Example 4 of Syntax of HEVCTileDecoderConfigurationRecord>

Figure 32:
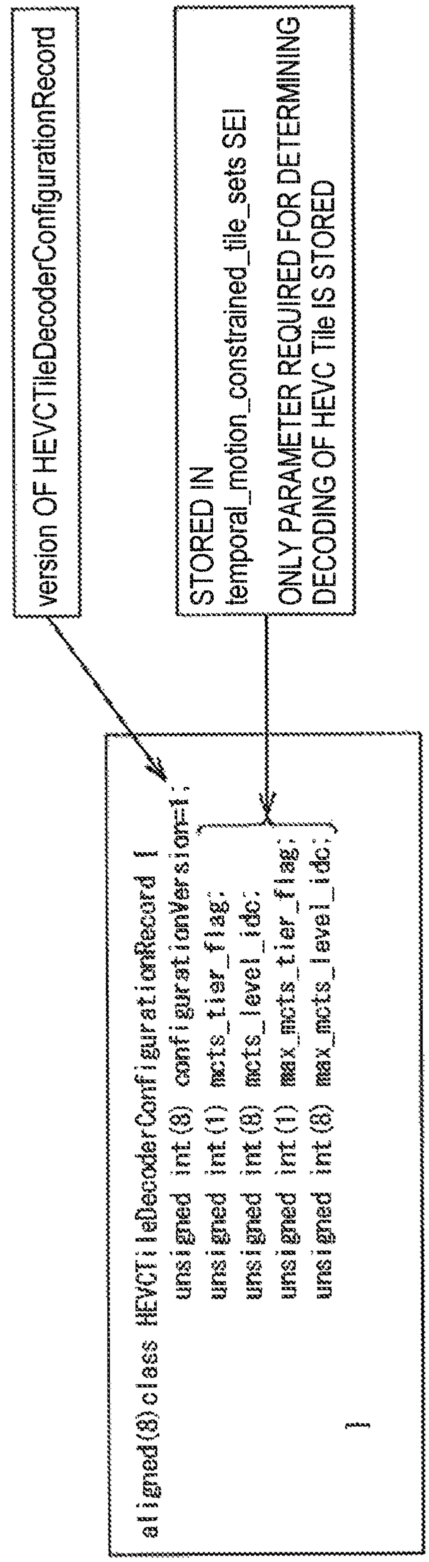
FIG. 32 is a diagram for explaining an HEVC tile decoder configuration record.

FIG. 32 is a diagram for explaining an HEVC tile decoder configuration record. The HEVC tile decoder configuration record of Example 4 is constituted as illustrated in FIG. 32.

As illustrated in FIG. 32, in Example 4, in addition to configurationVersion, only mcts_tier_flag, mcts_level_idc, max_mcts_tier_flag and max_mcts_level_id are stored as parameters required for determining decoding of HEVC Tile stored in temporal_motion_constrained_tile_sets SEI. max_mcts_tier_flag and max_mcts_level_id, which are respectively indicate maximum values of mcts_tier_flag and mcts_level_idc, are profile information required for reproducing other tiles. That is, these are information for maximum Tile in the whole stream. In an example of FIG. 36 which will be described later, this is stored in another box (hvte box).

When a size of Tile is different in the case where there are a plurality of Tile in the same stream, there is a case where mcts_tier_flag and mcts_level_idc required for each Tile are different from each other. In this case, max_mcts_tier_flag and max_mcts_level_idc which are maximum values are stored with mcts_tier_flag and mcts_level_idc for each Tile, and used as hint information of decoding processing.

<Example 5 of Syntax of HEVCTileDecoderConfigurationRecord>

FIG. 33 is a diagram for explaining an HEVC tile decoder configuration record. The HEVC tile decoder configuration record of Example 5 is constituted as illustrated in FIG. 33.

As illustrated in FIG. 33, in Example 5, temporal_motion_constrained_tile_sets SEI corresponding to HEVC Tile required for determining decoding of HEVC Tile is stored in nalUnit. Therefore, in NAL_unit_type, a NALunit type indicating that the type is SEI is stored.

<Example 6 of Syntax of HEVCTileDecoderConfigurationRecord>

Figure 34:
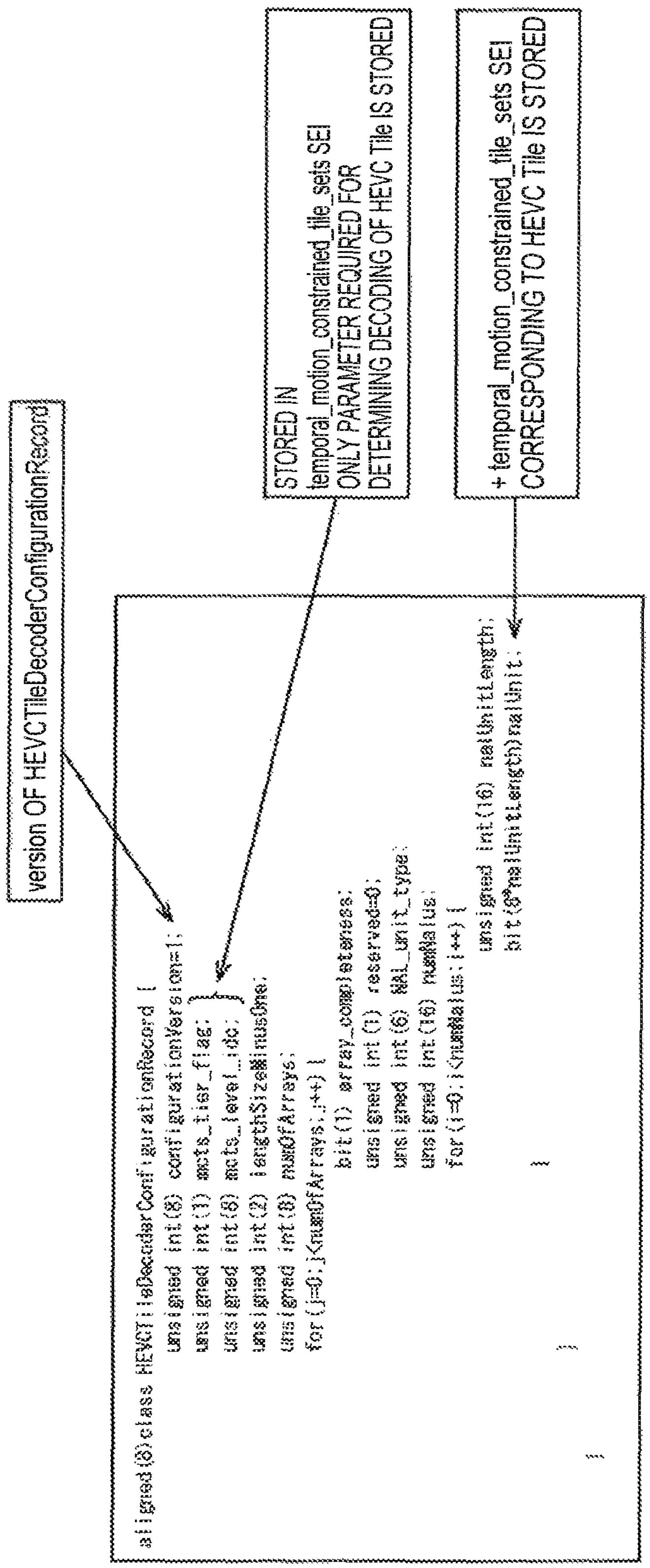
FIG. 34 is a diagram for explaining an HEVC tile decoder configuration record.

FIG. 34 is a diagram for explaining an HEVC tile decoder configuration record. The HEVC tile decoder configuration record of Example 6 is constituted as illustrated in FIG. 34.

As illustrated in FIG. 34, Example 6 has a configuration in which Example 3 in FIG. 31 and Example 5 in FIG. 33 are synthesized. That is, part from a row of configurationVersion to a row of mcts_level_idc in Example 3 and part in a row of lengthSizeMinusOne and thereafter in Example 5 are synthesized. In other words, in addition to configurationVersion, mcts_tier_flag and mcts_level_idc which are parameters required for determining decoding of HEVC Tile stored in temporal_motion_constrained_tile_sets SEI, and temporal_motion_constrained_tile_sets SEI corresponding to HEVC Tile required for determining decoding of HEVC Tile are stored.

<Example 7 of Syntax of HEVCTileDecoderConfigurationRecord>

FIG. 35 is a diagram for explaining an HEVC tile decoder configuration record. The HEVC tile decoder configuration record of Example 7 is constituted as illustrated in FIG. 35.

As illustrated in FIG. 35, Example 7 has a configuration in which Example 4 in FIG. 32 and Example 5 in FIG. 33 are synthesized. That is, part from a row of configurationVersion to a row of max_mcts_level_idc in Example 4 and part in a row of lengthSizeMinusOne and thereafter in Example 5 are synthesized. In other words, in addition to configurationVersion, mcts_tier_flag, mcts_level_idc, max_mcts_tier_flag, and max_mcts_level_id which are parameters required for determining decoding of HEVC Tile stored in temporal_motion_constrained_tile_sets SEI, and temporal_motion_constrained_tile_sets SEI corresponding to HEVC Tile required for determining decoding of HEVC Tile are stored.

<MP4 File (2)>

Figure 36:
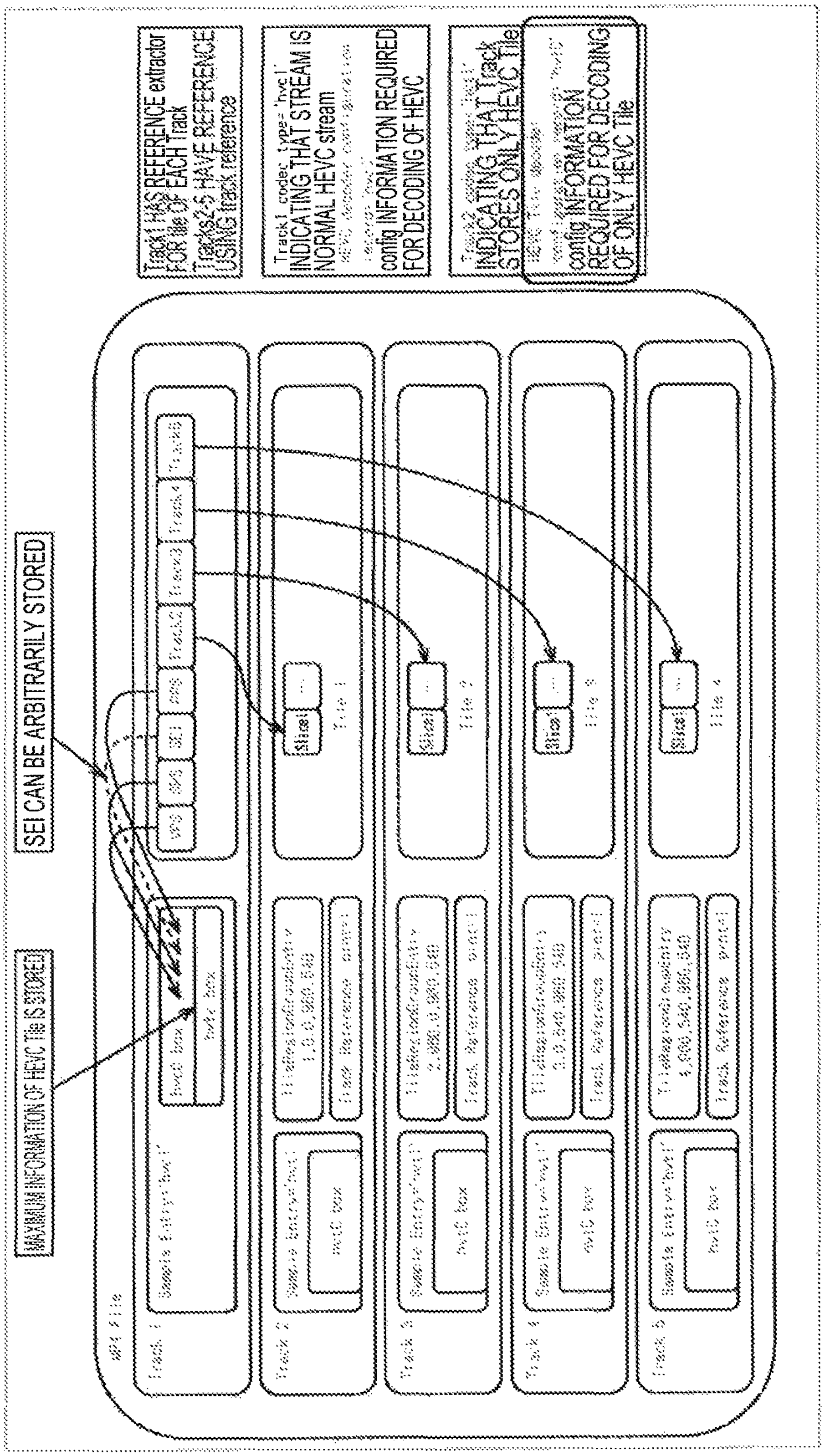
FIG. 36 is a diagram for explaining a configuration example of an MP4 file of a tile image.

FIG. 36 is a diagram for explaining an example of a structure of an MP4 file of a tile image which is different from FIG. 27. The MP4 file in FIG. 36 has basically the same structure as that of MP4 file in FIG. 27, while the MP4 file in FIG. 36 is different from the MP4 file in FIG. 27 in that a sample entry of Track1 has hvte box in addition to hvcCbox.

In the MP4 file in FIG. 36, max_mcts_tier_flag and max_mcts_level_id which are information for maximum Tile in the whole stream described in FIG. 32 are stored in hvte box of Track1 which is a base track.

FIG. 37 is a diagram for explaining an HEVC tile extension box. A in FIG. 37 indicates extension of the visual sample group entry of the sample entry of Track1 in FIG. 36, and in addition to HEVCConfigurationBox (hvcC box), HEVCTileExtensionBox( ) (hvte box) is added. B in FIG. 37 indicates syntax of the HEVCTileExtensionBox( ). As illustrated in B of FIG. 37, max_mcts_tier_flag and max_mcts_level_id are stored.

Because max_mcts_tier_flag and max_mcts_level_id are information for maximum Tile in the whole stream, max_mcts_tier_flag and max_mcts_level_id are not stored in Tile Track (Track2 to Track5) and stored in Track1 which is a base track. By this means, it is possible to easily acquire a maximum value required for independently decoding arbitrary Tile.

<MP4 File (3)>

Figure 38:
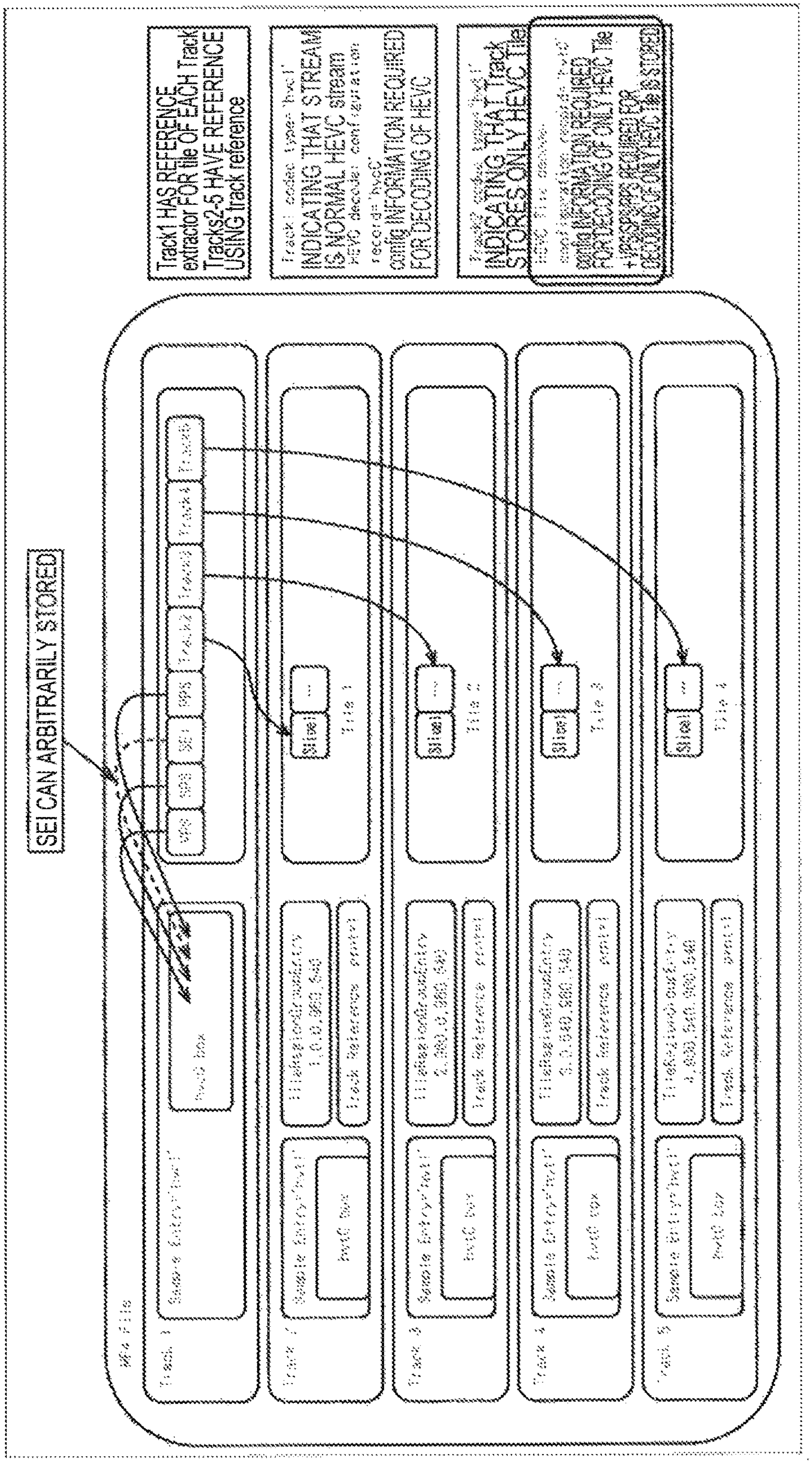
FIG. 38 is a diagram for explaining a configuration example of an MP4 file of a tile image.

FIG. 38 is a diagram for explaining an example of a structure of an MP4 file of a tile image. The MP4 file in FIG. 38 has basically the same structure as that of the MP4 file in FIG. 27, except that, while, in the MP4 file in FIG. 27, configuration information required for decoding only HEVC Tile is stored in hvtCbox of the sample entry of Track2 to Track 5, in the MP4 file in FIG. 38, not only temporal_motion_constrained_tile_sets SEI is stored in hvtCbox, but also VPS, SPS and PPS required for decoding only HEVC Tile are further stored in hvtCbox as in the examples illustrated in FIG. 30, FIG. 33, FIG. 34 and FIG. 35.

By this means, when any of Tile2 to Tile5 is reproduced, it is not necessary to access information of Track1 which is a base track to obtain a parameter set thereof.

3. Third Embodiment

<Image Encoding Apparatus>

Figure 39:
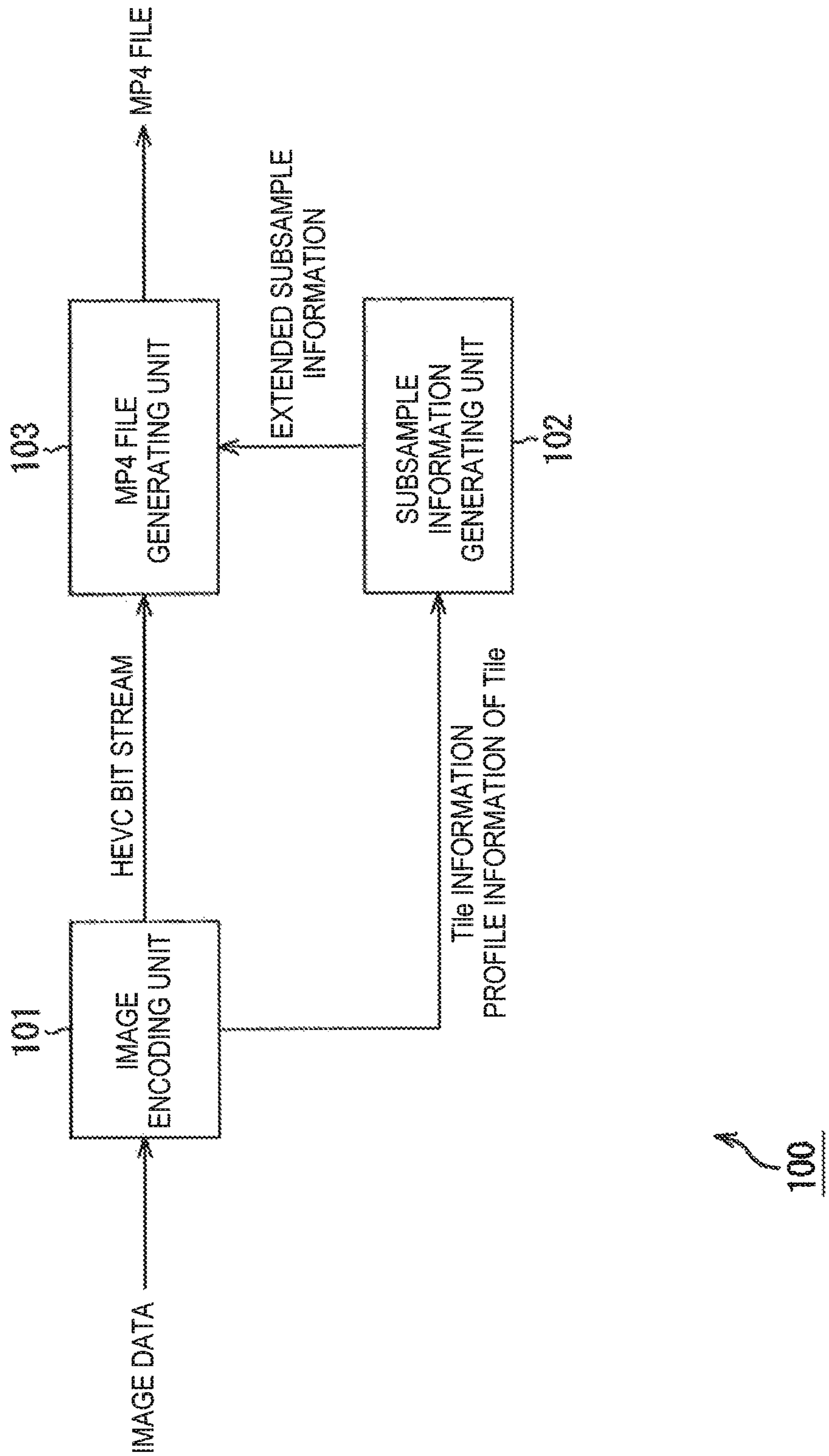
FIG. 39 is a block diagram illustrating an example of main components of an image encoding apparatus.

An apparatus for implementing the present technique as described above and a method thereof will be described next. FIG. 39 is a diagram illustrating an image encoding apparatus which is one aspect of an image processing apparatus to which the present technique is applied. An image encoding apparatus 100 illustrated in FIG. 39 is an apparatus for encoding input image data using an HEVC coding scheme and forming a file using an MP4 file format.

As illustrated in FIG. 39, the image encoding apparatus 100 has an image encoding unit 101, a subsample information generating unit 102 and an MP4 file generating unit 103.

The image encoding unit 101 divides the whole image of the input image data into partial images referred to as tiles (Tile), sets each tile as a tile (Tile) supported by an HEVC coding scheme and encodes the image data of the whole image for each tile. That is, bit streams (HEVC bit streams) in the HEVC coding scheme which can be independently decoded for each tile are generated.

The image encoding unit 101 supplies the obtained HEVC bit streams to the MP4 file generating unit 103. Further, the image encoding unit 101 supplies tile (Tile) information relating to how the whole image is divided and profile information of each tile to the subsample information generating unit 102.

The subsample information generating unit 102 generates subsample information (extended subsample information) using the tile information and the profile information supplied from the image encoding unit 101, the subsample information supporting the MP4 file format, and including the tile information and the profile information, that is, including hint information used as a reference for decoding processing of a subsample which is a partial region which can be independently decoded in the whole image. The subsample information generating unit 102 supplies the generated extended subsample information to the MP4 file generating unit 103.

The MP4 file generating unit 103 forms the HEVC bit streams supplied from the image encoding unit 101 into a file using the MP4 file format, and stores the extended subsample information supplied from the subsample information generating unit 102 in management information for managing the HEVC bit streams, of the file including the HEVC bit streams.

At this time, the MP4 file generating unit 103 arranges the extended subsample information as a subsample hint information box (Subsample Hint Information Box) which is different from a subsample information box (Subsample Information Box) of a sample table box (Sample Table Box) of the above-described management information.

Alternatively, the MP4 file generating unit 103 arranges the extended subsample information in a sample group description box (Sample Group Description Box) of the sample table box (Sample Table Box) of the above-described management information as a visual sample group entry (VisualSampleGroupEntry), and arranges information designating a sample to which the subsample information is to be applied in a sample to group box (Sample To Group Box).

It should be noted that content of the subsample information is the same as any of the examples described in the first embodiment. For example, in the case of Example 5, the extended subsample information generated by the subsample information generating unit 102 includes not only hint information used as a reference for decoding processing of a subsample which is a partial region which can be independently decoded in the whole image, but also map group information (Map Group Entry) for grouping NAL unit.

The MP4 file generating unit 103 then outputs the MP4 file generated as described above and transfers the MP4 file to, for example, a decoding side via a network, a recording medium, or the like, or an information processing apparatus, or the like.

By this means, the image encoding apparatus 100 can recognize performance required for decoding more accurately.

<Flow of Image Encoding Processing>

Figure 40:
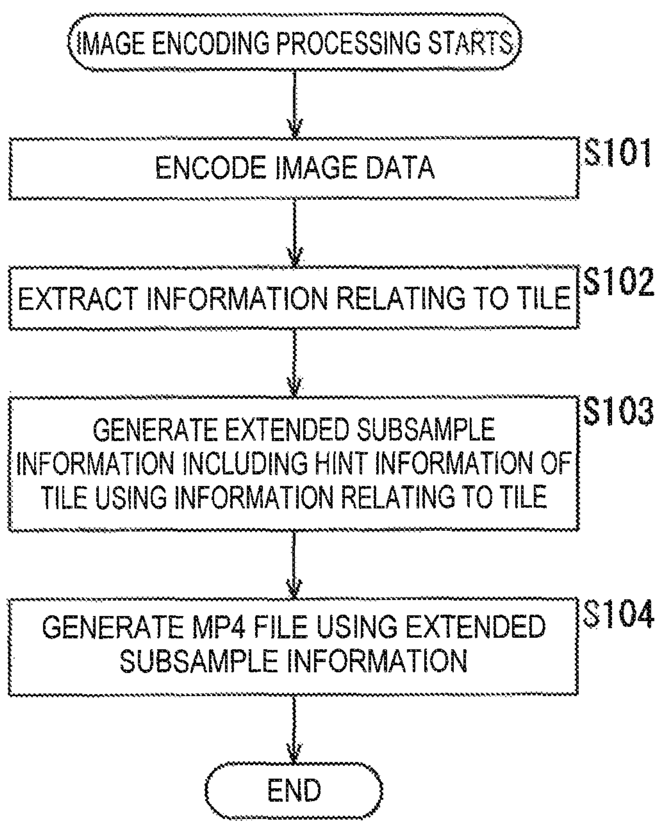
FIG. 40 is a block diagram illustrating an example of main components of an image decoding apparatus.

Flow of each processing executed by the above-described image encoding apparatus 100 will be described next. An example of flow of image encoding processing will be described with reference to a flowchart in FIG. 40.

When the image encoding processing is started, the image encoding unit 101 encodes image data in step S101 so that the image data can be decoded for each subsample (tile).

In step S102, the image encoding unit 101 extracts information relating to the tile, such as, for example, tile information and profile information of each tile.

In step S103, the subsample information generating unit 102 generates extended subsample information including hint information of the tile using the information relating to the tile extracted in step S102.

In step S104, the MP4 file generating unit 103 generates an MP4 file using the extended subsample information so that hint information used as a reference for decoding processing of a subsample which is a partial region which can be independently decoded is included in the sample table box of moov.

When the processing in step S104 ends, the image encoding processing ends.

By executing the image encoding processing as described above, the image encoding apparatus 100 can recognize performance required for decoding more accurately.

Fourth Embodiment

<Image Decoding Apparatus>

Figure 41:
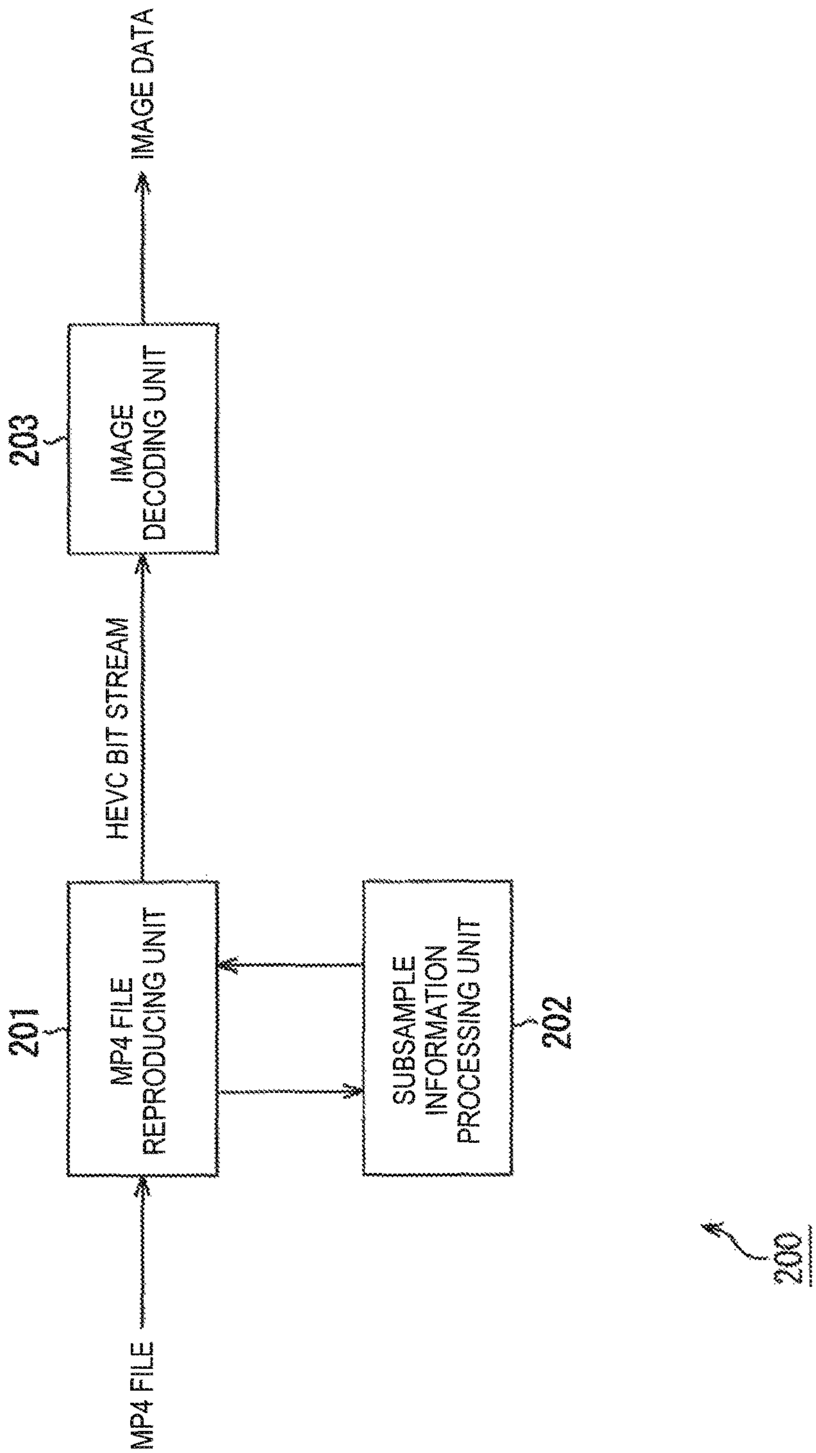
FIG. 41 is a flowchart for explaining an example of flow of image encoding processing.

Decoding of encoded data encoded as described above will be described next. FIG. 41 is a block diagram illustrating main components of an image decoding apparatus corresponding to the image encoding apparatus 100, which is one aspect of the image processing apparatus to which the present technique is applied. An image decoding apparatus 200 illustrated in FIG. 41 decodes the encoded data generated by the image encoding apparatus 100 using a decoding scheme corresponding to the encoding scheme. That is, the image decoding apparatus 200 extracts HEVC bit streams from the MP4 file, decodes the HEVC bit streams, and outputs image data. At this time, the image decoding apparatus 200 can decode a partial image including one or a plurality of tiles (Tile) independently from other parts, for example, by utilizing a tile structure supported by HEVC. At that time, the image decoding apparatus 200 can determine whether or not decoding is possible based on hint information used as a reference for decoding processing of a subsample which is a partial region which can be independently decoded.

As illustrated in FIG. 41, the image decoding apparatus 200 has an MP4 file reproducing unit 201, a subsample information processing unit 202 and an image decoding unit 203.

The MP4 file reproducing unit 201 performs processing of determining whether or not reproduction of the inputted MP4 file is possible, performs processing of reproducing the MP4 file and performs error processing. The MP4 file reproducing unit 201 performs these processing by utilizing the subsample information processing unit 202, generates HEVC bit streams of a partial image (of course, it is possible to use the whole image) including one or a plurality of tiles and supplies the HEVC bit streams to the image decoding unit 203.

The subsample information processing unit 202 performs processing as to the subsample information during the processing of determining whether or not reproduction is possible and reproduction processing. It should be noted that content of the subsample information is the same as any of the examples described in the first embodiment. For example, in the case of Example 5, the extended subsample information generated by the subsample information generating unit 102 includes not only hint information used as a reference for decoding processing of a subsample which is a partial region which can be independently decoded in the whole image, but also map group information (Map Group Entry) for grouping NAL unit.

The image decoding unit 203 decodes the HEVC bit streams generated in the MP4 file reproducing unit 201 and outputs the image data.

By this means, the image decoding apparatus 200 can recognize performance required for decoding more accurately.

<Flow of Image Decoding Processing>

Flow of each processing executed by the image decoding apparatus 200 as described above will be described next.

First, an example of the flow of the image decoding processing will be described with reference to a flowchart in FIG. 42.

When the image decoding processing is started, the MP4 file reproducing unit 201 and the subsample information processing unit 202 of the image decoding apparatus 200 determines whether or not the partial image designated by the user, or the like, can be reproduced for the HEVC bit streams included in the inputted MP4 file in step S201.

In step S202, the MP4 file reproducing unit 201 determines whether or not to perform reproduction based on the processing result in step S201. When it is determined to perform reproduction, the processing proceeds to step S203.

In step S203, the MP4 file reproducing unit 201 and the subsample information processing unit 202 perform reproduction processing.

In step S204, the image decoding unit 203 decodes the encoded data (HEVC bit streams) of the partial image including one or a plurality of tiles, obtained through the processing in step S203 and outputs image data of the partial image including one or a plurality of tiles.

When the processing in step S204 ends, the image decoding processing ends.

Further, in step S202, when it is determined not to perform reproduction, the processing proceeds to step S205.

In step S205, the MP4 file reproducing unit 201 performs error processing which is predetermined processing in the case where decoding cannot be performed normally. This error processing may be any processing. For example, decoding may be forcibly terminated (including interrupted and suspending), or an alarm may be issued to the user using an image, sound, or the like. Further, for example, another encoded stream with a lower level may be acquired to perform decoding again. Still further, for example, the encoded stream may be forcibly decoded while allowing disturbance to be generated in the decoded image.

When the processing in step S205 ends, the image decoding processing ends.

<Flow of Processing of Determining Whether or not Reproduction is Possible>

An example of flow of the processing of determining whether or not reproduction is possible, executed in step S201 in FIG. 42 will be described next with reference to a flowchart in FIG. 43.

When the processing of determining whether or not reproduction is possible is started, in step S221, the MP4 file reproducing unit 201 acquires a sequence parameter set (SPS) of HEVC bit streams included in the MP4 file from an HEVC sample entry of the sample description box in the sample table box of the MP4 file.

In step S222, the MP4 file reproducing unit 201 determines whether or not the profile information included in the sequence parameter set (SPS) is profile information corresponding to the image decoding unit 203. That is, the MP4 file reproducing unit 201 determines whether or not the image decoding unit 203 can decode the HEVC bit streams of the whole image included in the MP4 file based on information included in the sequence parameter set (SPS).

If it is determined that decoding is possible, the processing proceeds to step S223. In step S223, the MP4 file reproducing unit 201 performs control so that reproduction is performed. That is, it is determined to perform reproduction in step S202 in FIG. 42.

Figure 42:
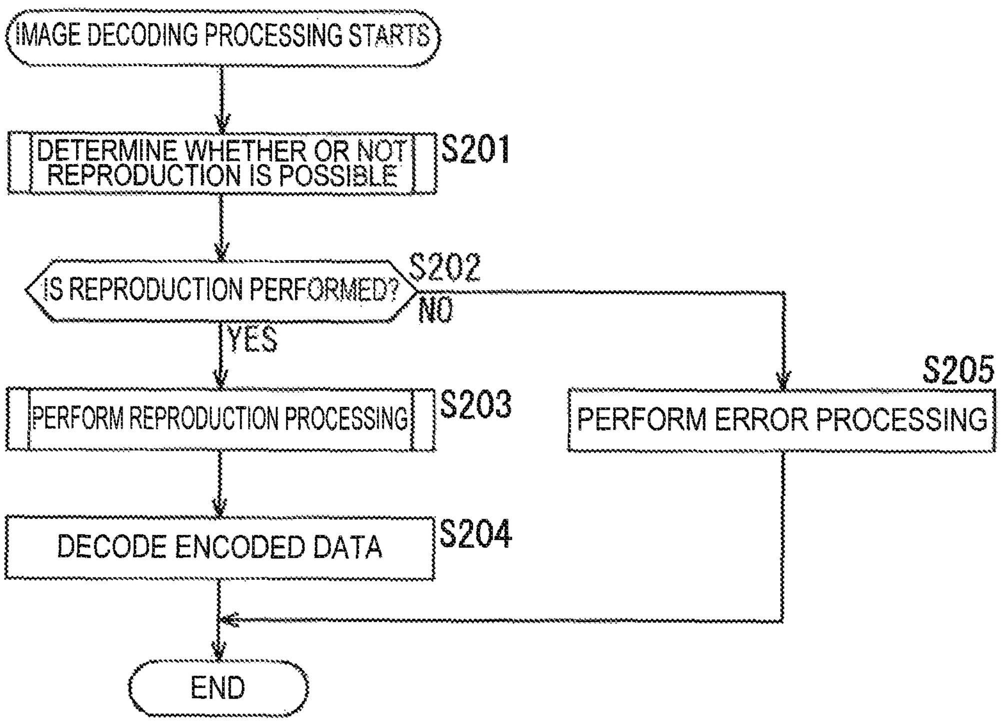
FIG. 42 is a flowchart for explaining an example of flow of image decoding processing.
Figure 43:
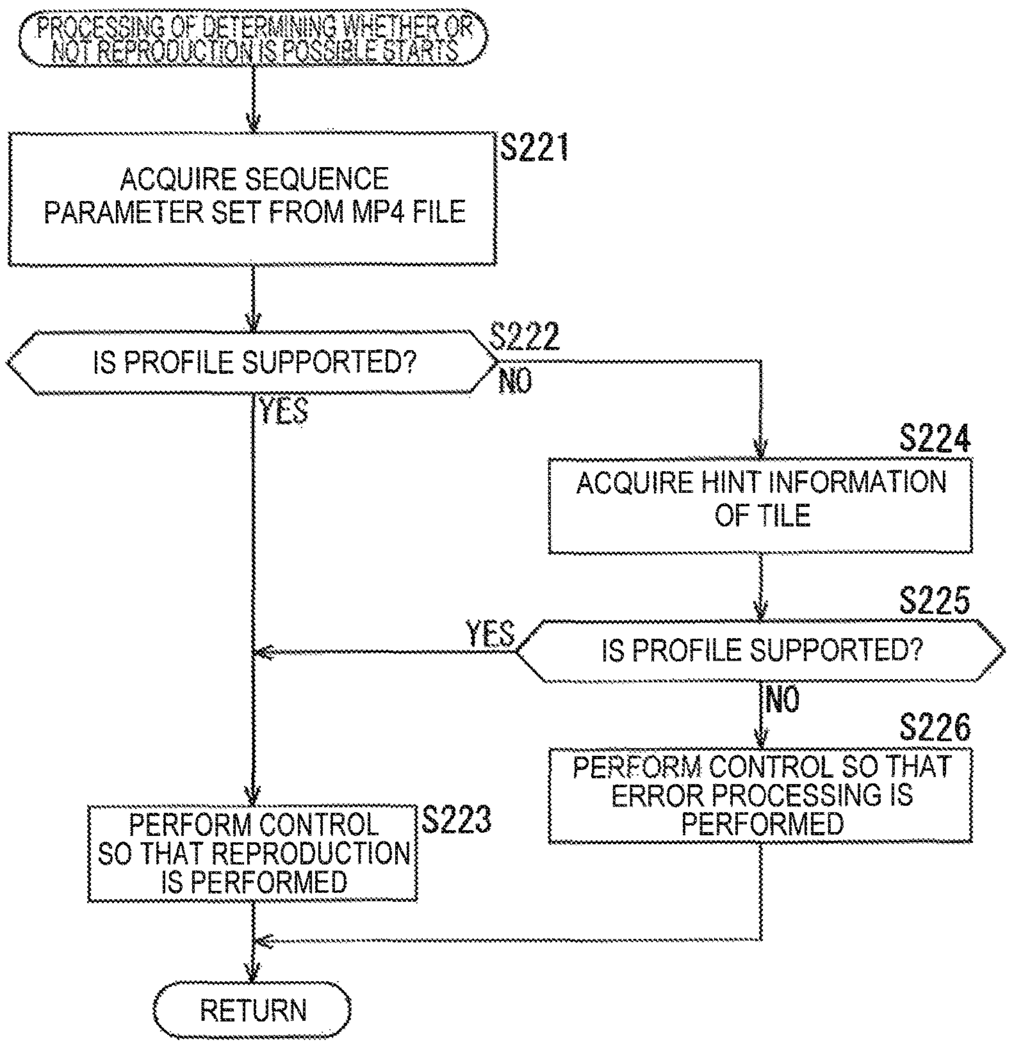
FIG. 43 is a flowchart for explaining an example of flow of processing of determining whether or not reproduction is possible.

When the processing in step S223 ends, the processing of determining whether or not reproduction is possible ends, and the processing returns to FIG. 42.

Further, in step S222, when it is determined that the profile information does not correspond to the image decoding unit 203, that is, when it is determined that the image decoding unit 203 cannot decode the HEVC bit streams of the whole image included in the MP4 file, the processing proceeds to step S224. In step S224, the subsample information processing unit 202 acquires hint information of tiles (subsamples) from the sample table box of the MP4 file.

In step S225, the subsample information processing unit 202 determines whether or not the profile information included in the hint information acquired in step S224 is profile information corresponding to the image decoding unit 203. That is, the subsample information processing unit 202 determines whether or not the image decoding unit 203 can decode the HEVC bit streams of a partial image including one or a plurality of tiles, included in the MP4 file.

If it is determined that decoding is possible, the processing returns to step S223. That is, also in this case, the MP4 file reproducing unit 201 performs control so that reproduction is performed.

Further, in step S225, when it is determined that the profile information does not correspond to the image decoding unit 203, that is, when it is determined that the image decoding unit 203 cannot decode the HEVC bit streams of the partial image included in the MP4 file, the processing proceeds to step S226.

In step S226, the MP4 file reproducing unit 201 performs control so that error processing is performed as described above.

When the processing in step S226 ends, the processing of determining whether or not reproduction is possible ends, and the processing returns to FIG. 42.

<Flow of Reproduction Processing>

Figure 44:
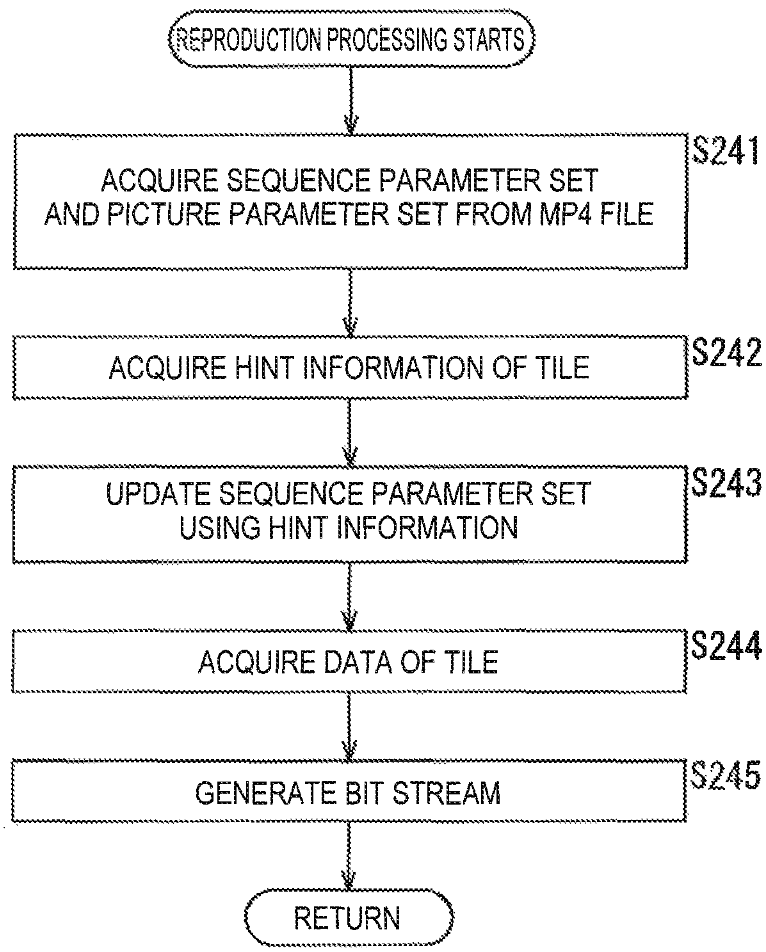
FIG. 44 is a flowchart for explaining an example of flow of reproduction processing.

An example of flow of reproduction processing executed in step S203 in FIG. 42 will be described next with reference to a flowchart in FIG. 44.

When the reproduction processing is started, the MP4 file reproducing unit 201 acquires a sequence parameter set (SPS) and a picture parameter set from the MP4 file in step S241.

In step S242, the subsample information processing unit 202 acquires hint information of tiles to be reproduced from the MP4 file.

In step S243, the MP4 file reproducing unit 201 updates the sequence parameter set (SPS) acquired in step S241 using the hint information of the tiles obtained in step S242. For example, when the hint information is Example (A-1) or (A-2) in the square 12, the MP4 file reproducing unit 201 rewrites information of the sequence parameter set (SPS) using information (such as a profile level) included in the hint information. Further, for example, when the hint information is Example (B-1) or (B-2) in the square 12, the MP4 file reproducing unit 201 replaces the information included in the hint information with the sequence parameter set (SPS).

In step S244, the subsample information processing unit 202 acquires data of tiles to be reproduced from the MP4 file. At this time, in the case of Example 1 to Example 4, the subsample information processing unit 202 accesses data of NAL unit constituting the subsamples (tiles) with reference to the subsample information box and acquires the data as in the example in FIG. 6. Further, in the case of Example 5, the subsample information processing unit 202 accesses data of NAL unit constituting the subsamples (tiles) with reference to association between NAL unit and GroupID (map pattern of NAL unit) (Map Group Entry), set in the visual sample group entry (HEVCNALUMapGroupEntry( ) extends VisualSmapleGroupEntry ('hcnm')) in which NAL units are mapped in the sample and acquires the data as in the example in FIG. 24.

In step S245, the MP4 file reproducing unit 201 generates bit streams of tiles (partial image) to be reproduced using the data of the tiles obtained in step S244, the sequence parameter set updated in step S243, or the like.

When the processing in step S245 ends, the processing returns to FIG. 42. That is, the generated bit streams of the partial image are decoded.

By executing each processing as described above, the image decoding apparatus 200 can recognize performance required for decoding more accurately.

<Flow of Reproduction Processing>

Figure 45:
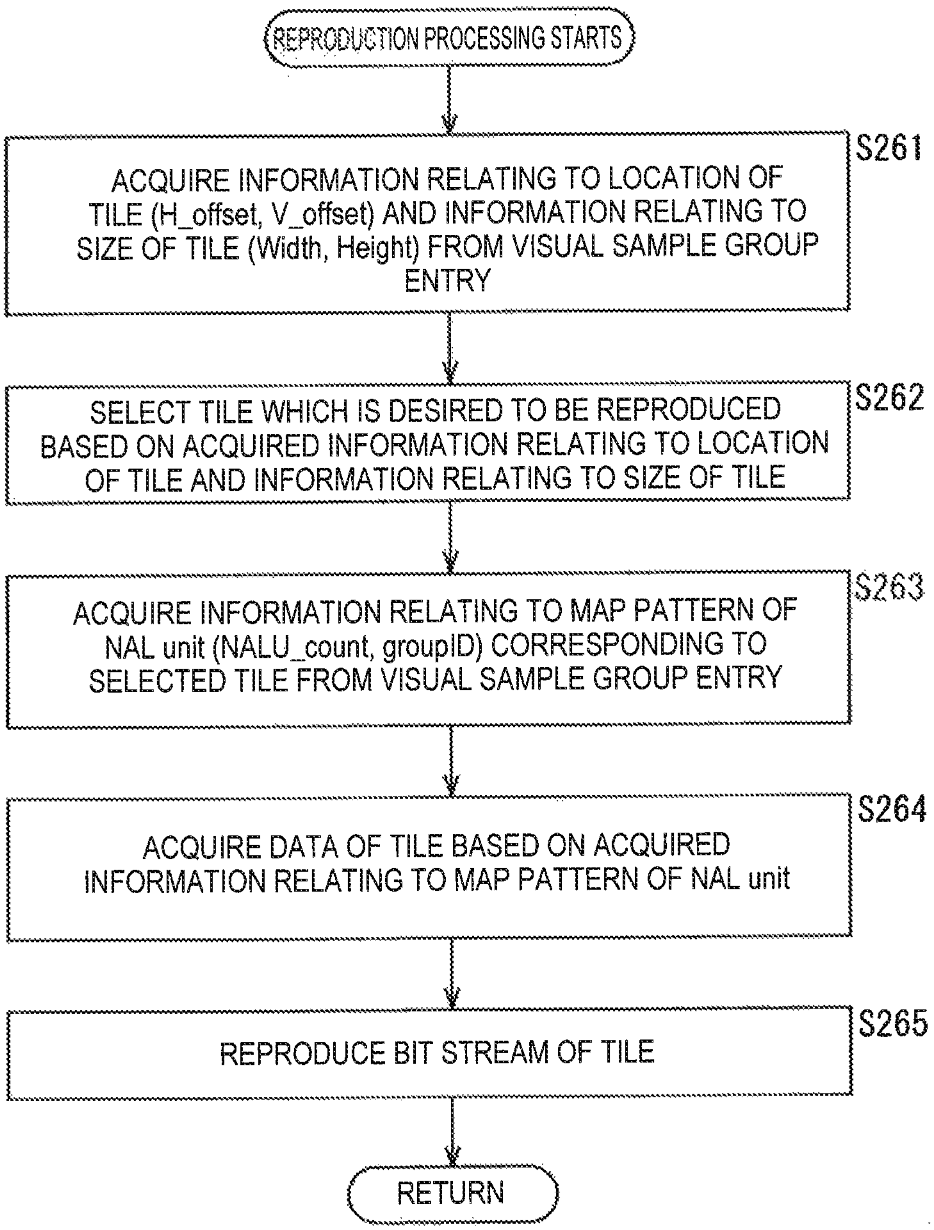
FIG. 45 is a flowchart for explaining another example of the flow of the reproduction processing.

Another example of flow of reproduction processing executed in step S203 in FIG. 42 will be described next with reference to a flowchart in FIG. 45.

When the reproduction processing is started, the MP4 file reproducing unit 201 acquires information relating to a location of the tile (H_offset, V_offset) and information relating to a size of the tile (Width, Height) from the visual sample group entry in step S261.

In step S262, the MP4 file reproducing unit 201 selects a tile which is desired to be reproduced based on the acquired information relating to the location of the tile and information relating to the size of the tile.

In step S263, the subsample information processing unit 202 acquires information relating to the map pattern of NAL unit corresponding to the selected tile (NALU_count, groupID) from the visual sample group entry.

In step S264, the subsample information processing unit 202 acquires data of the tile based on the information relating to the map pattern of NAL unit acquired in step S263.

In step S265, the MP4 file reproducing unit 201 reproduces bit streams of the tile acquired in step S264.

When the processing in step S265 ends, the processing returns to FIG. 42. That is, bit streams of the reproduced partial image are decoded.

By executing each processing as described above, the image decoding apparatus 200 can recognize performance required for decoding more accurately.

<Flow of Reproduction Processing>

Figure 46:
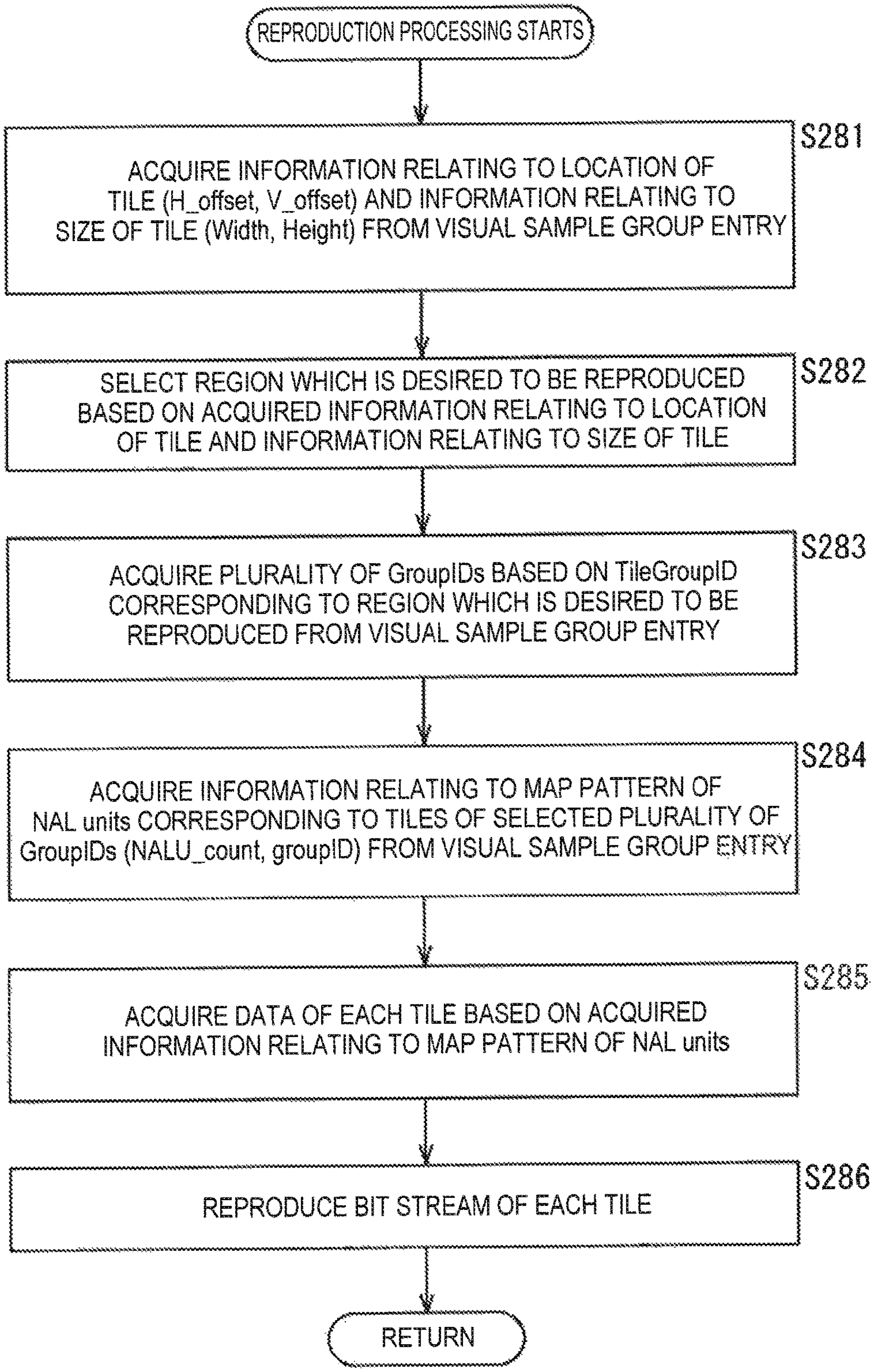
FIG. 46 is a flowchart for explaining another example of the flow of the reproduction processing.

Another example of flow of reproduction processing executed in step S203 in FIG. 42 will be described next with reference to a flowchart in FIG. 46.

When the reproduction processing is started, the MP4 file reproducing unit 201 acquires information relating to a location of the tile (H_offset, V_offset) and information relating to a size of the tile (Width, Height) from the visual sample group entry in step S281.

In step S282, the MP4 file reproducing unit 201 selects a region which is desired to be reproduced based on the acquired information relating to the location of the tile and information relating to the size of the tile.

In step S283, the subsample information processing unit 202 acquires a plurality of GroupIDs based on TileGroupID corresponding to the region which is desired to be reproduced from the visual group entry.

In step S284, the subsample information processing unit 202 acquires information relating to the map pattern of NAL unit corresponding to tiles of the selected plurality of GroupIDs (NALU_count, groupID) from the visual sample group entry.

In step S285, the subsample information processing unit 202 acquires data of each tile based on the information relating to the map pattern of NAL unit acquired in step S284.

In step S286, the MP4 file reproducing unit 201 reproduces bit streams of each tile acquired in step S285.

When the processing in step S286 ends, the processing returns to FIG. 42. That is, bit streams of the reproduced partial image are decoded.

By executing each processing as described above, the image decoding apparatus 200 can recognize performance required for decoding more accurately.

<Flow of Reproduction Processing>

Figure 47:
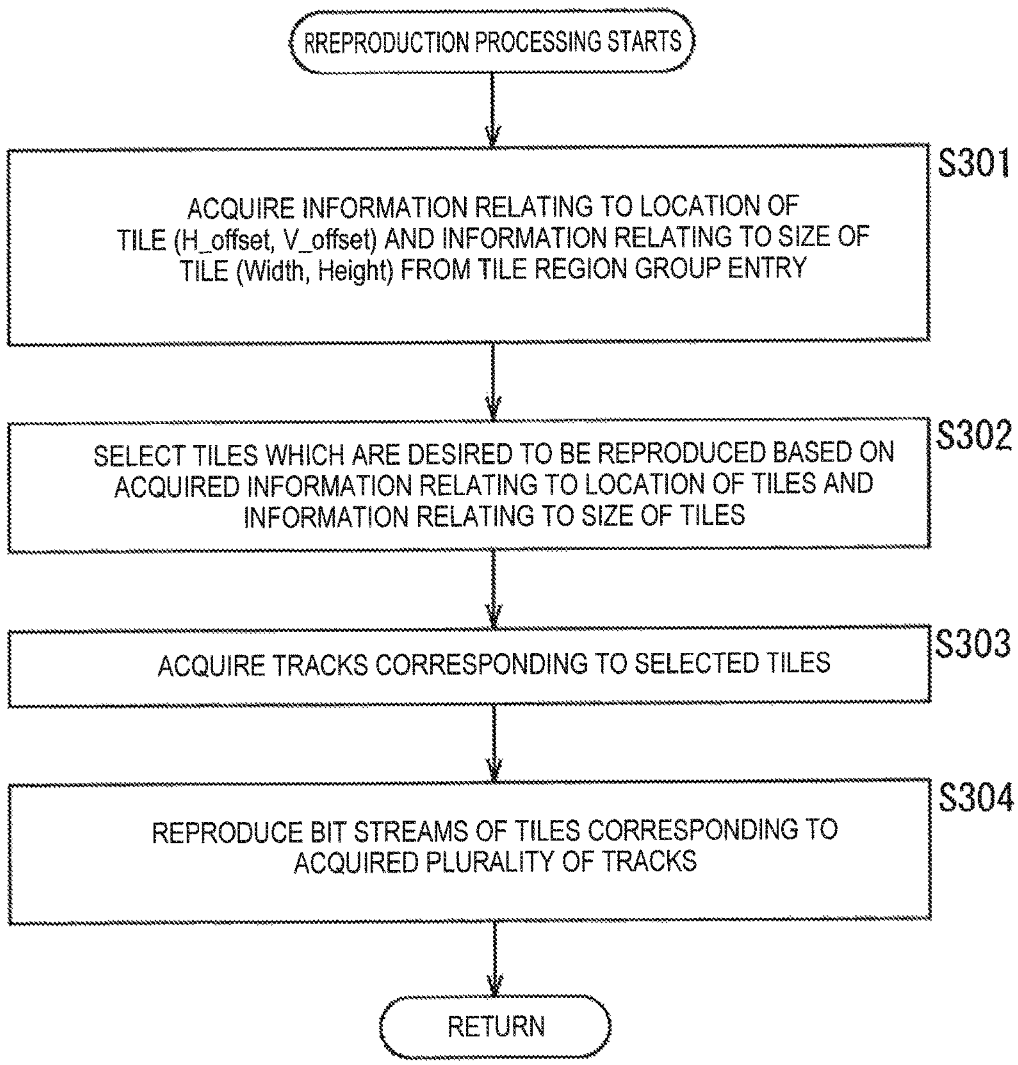
FIG. 47 is a flowchart for explaining another example of the flow of the reproduction processing.

Another example of flow of reproduction processing executed in step S203 in FIG. 42 will be described next with reference to a flowchart in FIG. 47.

When the reproduction processing is started, the MP4 file reproducing unit 201 acquires information relating to a location of the tile (H_offset, V_offset) and information relating to a size of the tile (Width, Height) from the tile region group entry in step S301.

In step S302, the MP4 file reproducing unit 201 selects a tile which is desired to be reproduced based on the acquired information relating to the location of the tile and information relating to the size of the tile.

In step S303, the subsample information processing unit 202 acquires tracks corresponding to the tile selected in step S302.

In step S304, the MP4 file reproducing unit 201 reproduces bit streams of the tiles corresponding to a plurality of tracks acquired in step S303.

When the processing in step S304 ends, the processing returns to FIG. 42. That is, bit streams of the reproduced partial image are decoded.

By executing each processing as described above, the image decoding apparatus 200 can recognize performance required for decoding more accurately.

<Flow of Reproduction Processing>

Figure 48:
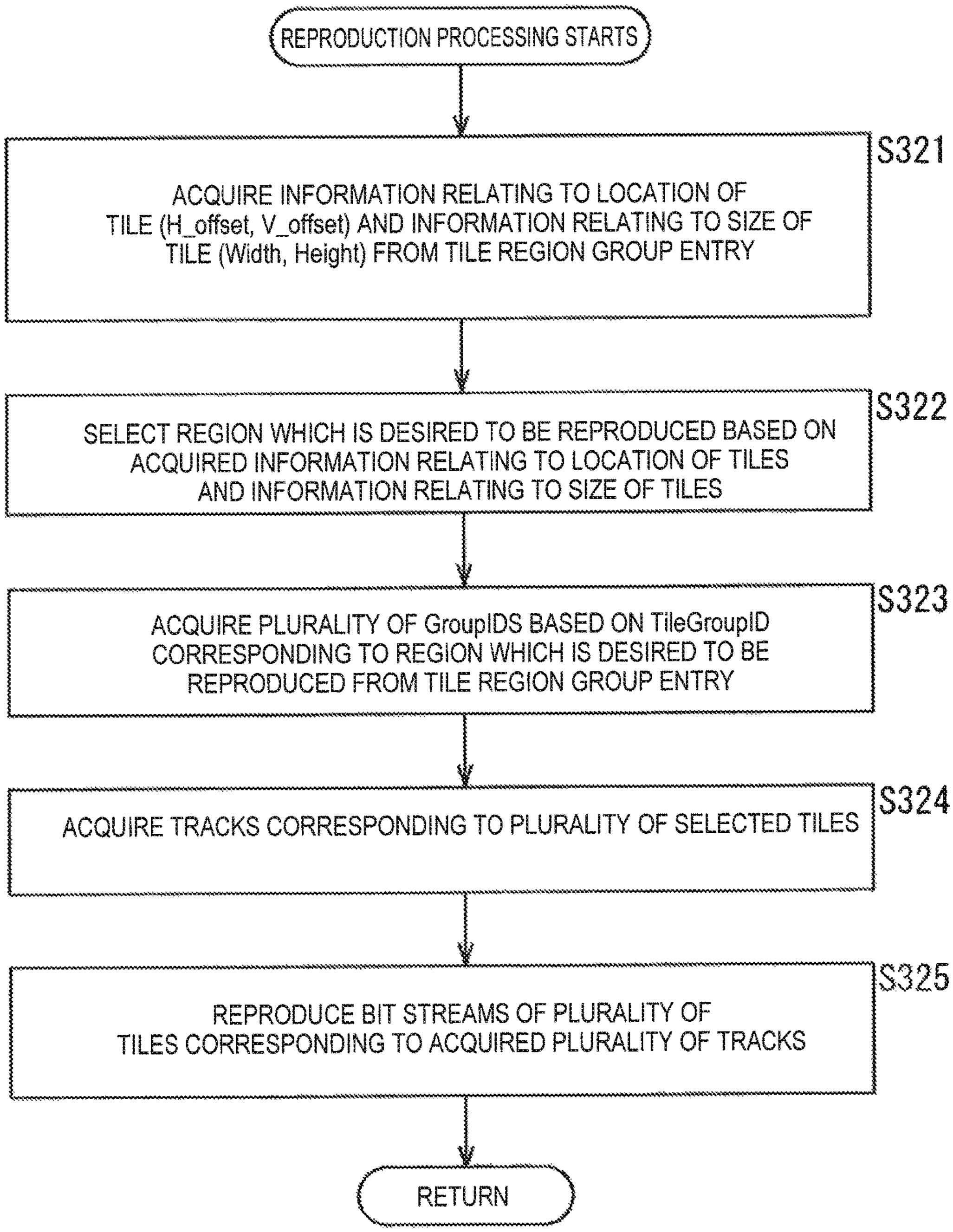
FIG. 48 is a flowchart for explaining another example of the flow of the reproduction processing.

Another example of flow of reproduction processing executed in step S203 in FIG. 42 will be described next with reference to a flowchart in FIG. 48.

When the reproduction processing is started, the MP4 file reproducing unit 201 acquires information relating to a location of the tile (H_offset, V_offset) and information relating to a size of the tile (Width, Height) from the tile region group entry in step S321.

In step S322, the MP4 file reproducing unit 201 selects a region which is desired to be reproduced based on the acquired information relating to the location of the tile and information relating to the size of the tile.

In step S323, the subsample information processing unit 202 acquires a plurality of GroupIDs from the tile region group entry based on TileGroupID corresponding to the region which is desired to be reproduced.

In step S324, the subsample information processing unit 202 acquires tracks corresponding to the plurality of tiles selected in step S323.

In step S325, the MP4 file reproducing unit 201 reproduces bit streams of the plurality of tiles corresponding to a plurality of tracks acquired in step S324.

When the processing in step S324 ends, the processing returns to FIG. 42. That is, bit streams of the reproduced partial image are decoded.

By executing each processing as described above, the image decoding apparatus 200 can recognize performance required for decoding more accurately.

The present technique can be applied to any image encoding apparatus and image decoding apparatus which can encode or decode a partial image.

Further, the present technique can be applied to an image encoding apparatus and an image decoding apparatus used when image information (bit streams) compressed through orthogonal transform such as discrete cosine transform and motion compensation, for example, in MPEG H.26x, or the like, is received via a network medium such as satellite broadcasting, cable television, Internet and a mobile telephone. Further, the present technique can be applied to an image encoding apparatus and an image decoding apparatus used when processing is performed on a storage medium such as an optical disc, a magnetic disc and a flash memory.

5. Fifth Embodiment

<Computer>

The above-described series of processes can also be performed by hardware and can also be performed by software. When the series of processes is performed by software, a program of the software is installed in a computer. Here, the computer includes a computer embedded in dedicated hardware and, for example, a general personal computer capable of various functions through installation of various programs.

Figure 49:
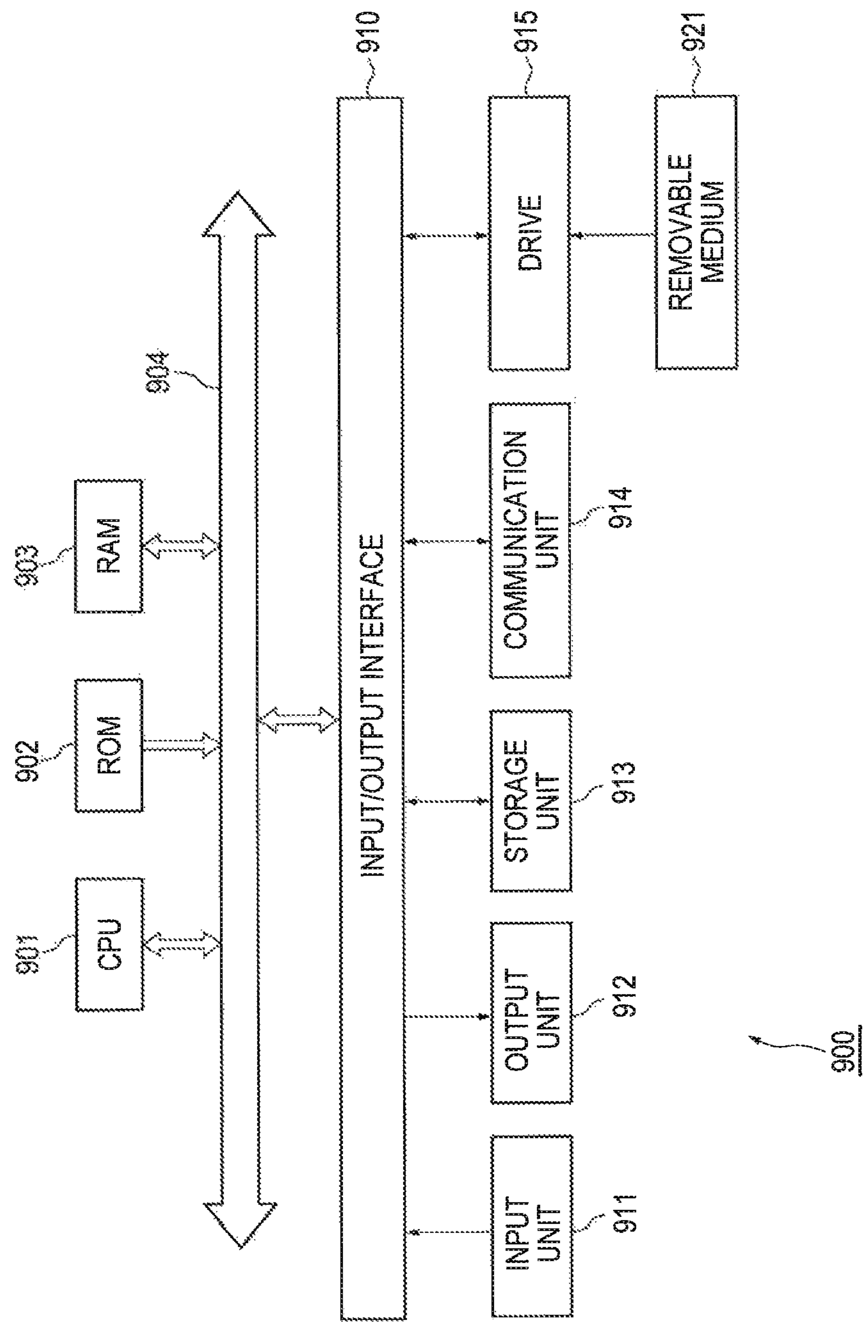
FIG. 49 is a block diagram illustrating an example of main components of a computer.

FIG. 49 is a block diagram illustrating an example of a hardware configuration of the computer performing the above-described series of processes according to a program.

In a computer 900 illustrated in FIG. 49, a central processing unit (CPU) 901, a read-only memory (ROM) 902, and a random access memory (RAM) 903 are connected mutually via a bus 904.

An input and output interface 910 is also connected to the bus 904. An input unit 911, an output unit 912, a storage unit 913, a communication unit 914, and a drive 915 are connected to the input and output interface 910.

The input unit 911 is formed by, for example, a keyboard, a mouse, a microphone, a touch panel, or an input terminal. The output unit 912 is formed by, for example, a display, a speaker, or an output terminal. The storage unit 913 is formed by, for example, a hard disk, a RAM disk, or a non-volatile memory. The communication unit 914 is formed by, for example, a network interface. The drive 915 drives a removable medium 921 such as a magnetic disk, an optical disc, a magneto-optical disc, or a semiconductor memory.

In the computer having the above-described configuration, for example, the CPU 901 performs the above-described processes by loading a program stored in the storage unit 913 to the RAM 903 via the input and output interface 910 and the bus 904 and executing the program. The RAM 903 also appropriately stores data necessary for the CPU 901 to perform various processes.

For example, a program executed by the computer (the CPU 901) can be recorded in the removable medium 921 such as a package medium to be applied. In this case, by mounting the removable medium 921 on the drive 915, the program can be installed in the storage unit 913 via the input and output interface 910.

The program can also be supplied via a wired or wireless transmission medium such as a local area network, the Internet, or digital satellite broadcast. In this case, the program can be received by the communication unit 914 to be installed in the storage unit 913.

Further, the program can also be installed in advance in the ROM 902 or the storage unit 913.

Programs executed by the computer may be programs which are processed chronologically in the order described in the present specification or may be programs which are processed at necessary timings, for example, in parallel or when called.

In the present specification, steps describing a program recorded in a recording medium include not only processes which are performed chronologically in the described order but also processes which are performed in parallel or individually but not chronologically.

In the present specification, a system means a set of a plurality of constituent elements (devices, modules (components), and the like) and all of the constituent elements may be included or may not be included in the same casing. Accordingly, a plurality of devices accommodated in separate casings and connected via networks and a single device in which a plurality of modules are accommodated in a single casing are all systems.

A configuration described above as a single device (or processing unit) may be divided and configured as a plurality of devices (or processing units). In contrast, a configuration described above as a plurality of devices (or processing units) may be collected and configured as a single device (or processing unit). Configurations other than the above-described configurations may, of course, be added to the configurations of the devices (or the processing units). Further, as long as configurations or operations are substantially the same in the entire system, parts of the configurations of certain devices (or processing units) may be included in the configurations of the other devices (or other processing units).

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the present technology, it is possible to realize a cloud computing configuration in which a single function is shared and processed jointly by a plurality of devices via networks.

Each step described in the above-described flowcharts can be performed by a single device and can also be shared and performed by a plurality of devices.

When a plurality of processes are included in a single step, the plurality of processes included in the single step can be performed by a single device and can also be shared and performed by a plurality of devices.

The image encoding apparatus and image decoding apparatus according to the above-described embodiments can be applied to various electronic devices such as a transmitter or a receiver in delivery of satellite broadcast, a wired broadcast such as a cable TV, or the Internet and delivery to a terminal by cellular communication, a recording device recording an image in a medium such as an optical disc, a magnetic disk, or a flash memory, or a reproduction device reproducing an image from the storage medium.

The present technology is not limited thereto, and can be implemented as any configuration mounted in the devices or devices constituting the systems, for example, processors in the form of system large scale integration (LSI), modules that use a plurality of processors, units that use a plurality of modules, sets obtained by further adding other functions to the units (i.e., a partial configuration of the devices), and the like.

In the present specification, the examples in which the various kinds of information are multiplexed in the encoded stream and are transmitted from the encoding side to the decoding side have been described. However, the methods of transmitting the information are not limited to the examples. For example, the information may be transmitted or recorded as separate pieces of data associated with the encoded bit stream without being multiplexed in the encoded bit stream. Here, the term "associated" means that an image (which may be a part of an image, such as a slice or a block) included in a bit stream and information corresponding to the image can be linked at the time of decoding. That is, the information may be transmitted along a different transmission path from the image (or bit stream). The information may be recorded in a different recording medium (or a different recording area of the same recording medium) from the image (or bit stream). Further, the information and the image (or bit stream) may be mutually associated, for example, in any unit such as a plurality of frames, a single frame, or a part of a frame.

Additionally, the present technology may also be configured as below.

(1)

An image encoding apparatus including:

an encoding unit configured to encode image data;

a subsample information generating unit configured to generate subsample information of an image of the image data, the subsample information including hint information used as a reference for decoding processing of a subsample, which is a partial region which can be independently decoded; and a file generating unit configured to generate a file including encoded data of the image data generated by the encoding unit and management information of the encoded data, and arrange the subsample information generated by the subsample information generating unit in the management information.

(2)

The image encoding apparatus according to any of (1) and (3) to (15), wherein the subsample information generating unit generates subsample information including a hint data type indicating a type of hint information included in the subsample information, a sample count indicating the number of continuous samples associated with the subsample information, and the hint information.

(3)

The image encoding apparatus according to any of (1), (2), and (4) to (15), wherein the hint information includes a level indicating a degree of load of decoding processing of the subsample.

(4)

The image encoding apparatus according to any of (1) to (3) and (5) to (15), wherein the hint information includes header information of the encoded data of the subsample.

(5)

The image encoding apparatus according to any of (1) to (4) and (6) to (15), wherein the subsample information generating unit generates subsample information including a hint data type indicating a type of hint information included in the subsample information, a sample count indicating the number of continuous samples associated with the subsample information, and identification information of a group to which the subsample belongs.

(6)

The image encoding apparatus according to any of (1) to (5) and (7) to (15), wherein the subsample information generating unit further generates subsample information including a hint data type indicating a type of hint information included in the subsample information, a sample count indicating the number of continuous samples associated with the subsample information, and hint information including a level indicating a degree of load of decoding processing of a group of a subsample.

(7)

The image encoding apparatus according to any of (1) to (6) and (8) to (15), wherein the subsample information generating unit further generates subsample information including a hint data type indicating a type of hint information included in the subsample information, a sample count indicating the number of continuous samples associated with the subsample information, and hint information including header information of encoded data of a group of a subsample.

(8)

The image encoding apparatus according to any of ( ) to (7) and (9) to (15), wherein the subsample information generating unit generates subsample information including a hint data type indicating a type of hint information included in the subsample information, a sample count indicating the number of continuous samples associated with the subsample information, identification information of a subsample belonging to a group, and hint information of the group.

(9)

The image encoding apparatus according to any of (1) to (8) and (10) to (15), wherein the hint information includes a level indicating a degree of load of decoding processing of the group.

(10)

The image encoding apparatus according to any of (1) to (9) and (11) to (15), wherein the hint information includes header information of encoded data of the group.

(11)

The image encoding apparatus according to any of (1) to (10) and (12) to (15), wherein the subsample information generating unit generates subsample information including information indicating a size and a location of a subsample.

(12)

The image encoding apparatus according to any of (1) to (11) and (13) to (15), wherein the subsample information generating unit generates subsample information including information indicating that a subsample can be independently decoded.

(13)

The image encoding apparatus according to any of (1) to (12), (14), and (15), wherein the subsample information generating unit generates subsample information including information for grouping NAL units constituting a sample.

(14)

The image encoding apparatus according to any of (1) to (13) and (15), wherein the file generating unit arranges the subsample information as a subsample hint information box (SubsampleHint Information Box) different from a subsample information box (Subsample Information Box) of a sample table box (Sample Table Box) of the management information.

(15)

The image encoding apparatus according to any of (1) to (14), wherein the file generating unit arranges the subsample information in a sample group description box (Sample Group Description Box) of a sample table box (Sample Table Box) of the management information as a visual sample group entry (VisualSampleGroupEntry), and arranges information designating a sample to which the subsample information is applied in a sample to group box (Sample To Group Box).

(16)

The image encoding apparatus according to any of (1) to (15), wherein the file generating unit arranges the subsample information required for decoding only the partial image in a sample entry (Sample Entry) of the sample group description box (Sample Group Description Box) of the sample table box (Sample Table Box) of the management information of a track having the partial image.

(17)

The image encoding apparatus according to any of (1) to (16), wherein the subsample information is a parameter required for determining decoding of HEVC Tile stored in a temporal motion constrained tile set SEI (temporal_motion_constrained_tile_sets SEI) in the same data structure as a data structure of an HEVC decodec configuration record.

(18)

The image encoding apparatus according to any of (1) to (17), wherein the parameter includes mcts tear flag (mcts_tear flag) and mcts level idc (mcts_level_idc).

(19)

The image encoding apparatus according to any of (1) to (18), wherein the partial image information further includes temporal motion constrained tile set SEI (temporal_motion_constrained_tile_sets SEI) corresponding to HEVC Tile.

(20)

The image encoding apparatus according to any of (1) to (19), wherein the subsample information further includes max mcts tear flag (max_mcts_tear_flag) and max mcts level idc(max_mcts_levvel_idc).

(21)

The image encoding apparatus according to any of (1) to (20), further including temporal motion constrained tile set SEI (temporal_motion_constrained_tile_sets SEI) corresponding to HEVC Tile required for determining decoding of HEVC Tile.

(22)

The image encoding apparatus according to any of (1) to (21), wherein the max mcts tear flag (max_mcts_tear_flag) and the max mcts level idc (max_mcts_level_idc) are arranged in a base track.

(23)

An image encoding method including:

encoding image data;

generating subsample information including hint information used as a reference for decoding processing of a subsample which is a partial region which can be independently decoded, of an image of the image data; and generating a file including generated encoded data of the image data and management information of the encoded data and arranging the generated subsample information in the management information.

(24)

An image decoding apparatus including:

an acquiring unit configured to acquire a file including encoded data of image data and management information of the encoded data in which subsample information of an image of the image data is arranged, the subsample information including hint information used as a reference for decoding processing of a subsample which is a partial region which can be independently decoded;

a subsample information analyzing unit configured to analyze the subsample information included in the file acquired by the acquiring unit;

a control unit configured to control decoding of the encoded data based on an analysis result of the subsample information by the subsample information analyzing unit;

a encoded data generating unit configured to generate encoded data of the subsample from the encoded data included in the file acquired by the acquiring unit according to control by the control unit; and a decoding unit configured to decode the encoded data of the subsample generated by the encoded data generating unit according to control by the control unit.

(25)

The image decoding apparatus according to (24), wherein the control unit determines whether the decoding unit can decode the encoded data of the subsample based on the hint information of the subsample information and performs control to decode the encoded data of the subsample when the encoded data can be decoded.

(26)

The image decoding apparatus according to (24) or (25), wherein the encoded data generating unit updates header information of the encoded data of the subsample based on the subsample information.

(27)

An image decoding method including:

acquiring a file including encoded data of image data and management information of the encoded data in which subsample information of an image of the image data is arranged, the subsample information including hint information used as a reference for decoding processing of a subsample which is a partial region which can be independently decoded;

analyzing the subsample information included in the acquired file;

controlling decoding of the encoded data based on an analysis result of the subsample information;

generating encoded data of the subsample from the encoded data included in the acquired file according to the control; and decoding the generated encoded data of the subsample according to the control.

(31)

An information processing apparatus including:

a file generating unit configured to generate a file of an MP4 file format, in which information indicating a location of a partial image in a whole image is stored in moov, the partial image being able to be independently decoded in the whole image, and the encoded partial image is stored in mdat; and a storage unit configured to store the file generated by the file generating unit.

(32)

The information processing apparatus according to (31), wherein the information indicating the location of the partial image in the whole image includes information indicating offset in a horizontal direction and information indicating offset in a vertical direction of the partial image.

(33)

The information processing apparatus according to (31) and (32), wherein the information indicating the location of the partial image in the whole image is defined using VisualSampleGroupEntry in the moov.

(34)

The information processing apparatus according to any of (31) to (33), wherein, in the file generated by the file generating unit, information indicating a size of the partial image is further stored in the moov.

(35)

The information processing apparatus according to (34), wherein the information indicating the size of the partial image includes information indicating a height of the partial image and information indicating a width of the partial image.

(36)

The information processing apparatus according to any of (31) to (35), wherein the partial image is Tile in high efficiency video coding (HEVC).

(37)

The information processing apparatus according to (36), wherein the partial image includes a plurality of NAL units.

(38)

The information processing apparatus according to (37), wherein, in the file generated by the file generating unit, related information indicating the plurality of NAL units constituting the partial image is further stored in the moov.

(39)

The information processing apparatus according to (38), wherein the related information includes group information indicating a related group for each of the NAL units.

(40)

The information processing apparatus according to (38) or (39), wherein the related information includes information indicating the number of the plurality of NAL units.

(41)

The information processing apparatus according to any of (38) to (40), wherein the related information includes information specifying a first NAL unit in the partial image.

(42)

The information processing apparatus according to any of (31) to (41), wherein the partial image is stored in a first track in the file, and another partial image which can be independently decoded in the whole image is stored in a track other than the first track.

(43)

The information processing apparatus according to any of (31) to (42), further including:

a transmitting unit configured to transmit the file stored by the storage unit to another apparatus.

(44)

An information processing method including:

generating a file of an MP4 file format, in which information indicating a location of a partial image in a whole image is stored in moov, the partial image being able to be independently decoded in the whole image, and the encoded partial image is stored in mdat; and storing the generated file.

(45)

An information processing apparatus including:

a file reproducing unit configured to reproduce a file of an MP4 file format, in which information indicating a location of a partial image in a whole image is stored in moov, the partial image being able to be independently decoded in the whole image, and the encoded partial image is stored in mdat.

(46)

The information processing apparatus according to (45), wherein the information indicating the location of the partial image in the whole image includes information indicating offset in a horizontal direction and information indicating offset in a vertical direction of the partial image.

(47)

The information processing apparatus according to (45) or (46), wherein the information indicating the location of the partial image in the whole image is defined using VisualSampleGroupEntry in the moov.

(48)

The information processing apparatus according to any of (45) to (47), wherein, in the file, information indicating a size of the partial image is further stored in the moov.

(49)

The information processing apparatus according to (48), wherein the information indicating the size of the partial image includes information indicating a height of the partial image and information indicating a width of the partial image.

(50)

The information processing apparatus according to any of (45) to (49), wherein the partial image is Tile in high efficiency video coding (HEVC).

(51)

The information processing apparatus according to (50), wherein the partial image includes a plurality of NAL units.

(52)

The information processing apparatus according to (51), wherein, in the file, related information indicating the plurality of NAL units constituting the partial image is further stored in the moov.

(53)

The information processing apparatus according to (52), wherein the related information includes group information indicating a related group for each of the NAL units.

(54)

The information processing apparatus according to (52) or (53), wherein the related information includes information indicating the number of the plurality of NAL units.

(55)

The information processing apparatus according to any of (52) to (54), wherein the related information includes information specifying a first NAL unit in the partial image.

(56)

The information processing apparatus according to any of (45) to (55), wherein the partial image is stored in a first track in the file, and another partial image which can be independently decoded in the whole image is stored in a track other than the first track.

(57)

The information processing apparatus according to any of (45) to (56), further including:

a receiving unit configured to receive the file, wherein the file reproducing unit reproduces the file received by the receiving unit.

(58)

The information processing apparatus according to any of (45) to (57), wherein, in the file, information indicating a location of the partial image in the whole image, information indicating a size of the partial image and related information indicating the plurality of NAL units constituting the partial image are stored in VisualSampleGroupEntry, and wherein the file reproducing unit selects a partial image which is desired to be reproduced based on the information indicating the location of the partial image in the whole image and the information indicating the size of the partial image, and acquires data of the partial image which is desired to be reproduced based on the related information and generates a bit stream.

(59)

The information processing apparatus according to any of (45) to (58), wherein, in the file, information indicating a location of the partial image in the whole image, information indicating a size of the partial image and related information indicating the plurality of NAL units constituting the partial image are stored in VisualSampleGroupEntry, and wherein the file reproducing unit selects a region which is desired to be reproduced based on the information indicating the location of the partial image in the whole image and the information indicating the size of the partial image, and acquires data of a partial image corresponding to the region which is desired to be reproduced based on the related information and generates a bit stream.

(60)

The information processing apparatus according to any of (45) to (59), wherein, in the file, information indicating a location of the partial image in the whole image and information indicating a size of the partial image are stored in TileRegionGroupEntry, and wherein the file reproducing unit selects a tile which is desired to be reproduced based on the information indicating the location of the partial image in the whole image and the information indicating the size of the partial image, acquires a track corresponding to the selected tile which is desired to be reproduced, and generates a bit stream of a partial image corresponding to the acquired track.

(61)

The information processing apparatus according to any of (45) to (60), wherein, in the file, information indicating a location of the partial image in the whole image and information indicating a size of the partial image are stored in TileRegionGroupEntry, and wherein the file reproducing unit selects a region which is desired to be reproduced based on the information indicating the location of the partial image in the whole image and the information indicating the size of the partial image, acquires a plurality of tracks corresponding to the selected region which is desired to be reproduced, and generates a bit stream of a partial image corresponding to the acquired plurality of tracks.

(62)

The information processing apparatus according to any of (45) to (61), further including:

a decoding unit configured to decode a bit stream of the partial image reproduced and generated by the file reproducing unit.

(63)

An information processing method including:

reproducing a file of an MP4 file format, in which information indicating a location of a partial image in a whole image is stored in moov, the partial image being able to be independently decoded in the whole image, and the encoded partial image is stored in mdat.

REFERENCE SIGNS LIST

100 image encoding apparatus
101 image encoding unit
102 subsample information generating unit
103 MP4 file generating unit
200 image decoding apparatus
201 MP4 file reproducing unit
202 subsample information processing unit
203 image decoding unit

The invention claimed is:

1. An image encoding apparatus comprising:

an encoding unit configured to encode image data of a plurality of partial regions of an image for inclusion in a file based on a plurality of levels indicating corresponding degrees of load of decoding processing of respective ones of the plurality of partial regions of the image;

a subsample information generating unit configured to generate subsample information of the image of the image data, the subsample information including hint information used as a reference for decoding processing of a subsample, which is a partial region of a plurality of partial regions that is capable of being independently decoded; and a file generating unit configured to generate the file to include the encoded image data of the image data generated by the encoding unit, the information defining metadata for the encoded image data in which the levels are set, and management information of the encoded image data, and arrange the subsample information generated by the subsample information generating unit in the management information, wherein the file includes the encoded image data of the image and information defining metadata for the encoded image data in which the plurality of levels are set, wherein the subsample information includes a hint data type indicating a type of hint information included in the subsample information, a sample count indicating the number of continuous samples associated with the subsample information, and the hint information, wherein the hint information includes the level corresponding to the load of decoding processing of the subsample, wherein the subsample information is stored in an hvtC box as configuration information used for HEVC decoding in a sample entry, and wherein the subsample information generating unit, the file generating unit, and the encoding unit are each implemented via at least one processor.

2. The image encoding apparatus according to claim 1, wherein the hint information includes header information of the encoded image data of the subsample.

3. The image encoding apparatus according to claim 1, wherein the subsample information further includes identification information of a group to which the subsample belongs.

4. The image encoding apparatus according to claim 3, wherein the hint information includes the level corresponding to the load of decoding processing of the group to which the subsample belongs.

5. The image encoding apparatus according to claim 3, wherein the hint information includes header information of encoded image data of the group to which the subsample belongs.

6. The image encoding apparatus according to claim 1, wherein the subsample information further includes identification information of a subsample belonging to a group, and hint information of the group.

7. The image encoding apparatus according to claim 6, wherein the hint information includes a level corresponding to the load of decoding processing of the group.

8. The image encoding apparatus according to claim 6, wherein the hint information includes header information of encoded image data of the group.

9. The image encoding apparatus according to claim 1, wherein the subsample information includes information indicating a size and a location of the subsample.

10. The image encoding apparatus according to claim 1, wherein the subsample information includes information indicating that the subsample can be independently decoded.

11. The image encoding apparatus according to claim 1, wherein the subsample information includes information for grouping NAL units constituting a sample.

12. The image encoding apparatus according to claim 1, wherein the subsample information is arranged as a subsample hint information box (SubsampleHint Information Box) separate from a subsample information box (Subsample Information Box), each of the subsample hint information box (SubsampleHint Information Box) and the subsample information box (Subsample Information Box) being included in a sample table box (Sample Table Box) of the management information.

13. The image encoding apparatus according to claim 1, wherein the subsample information is arranged in a sample group description box (Sample Group Description Box) of a sample table box (Sample Table Box) of the management information as a visual sample group entry (VisualSampleGroupEntry), and information designating a sample to which the subsample information is arranged in a sample to group box (Sample To Group Box).

14. The image encoding apparatus according to claim 1, wherein the subsample is a tile (Tile) in high efficiency video coding (HEVC).

15. An image encoding method comprising:

encoding image data of a plurality of partial regions of an image for inclusion in a file based on a plurality of levels indicating corresponding degrees of load of decoding processing of respective ones of the plurality of partial regions of the image;

generating subsample information of the image of the image data, the subsample information including hint information used as a reference for decoding processing of a subsample, which is the partial region that is capable of being independently decoded;

generating the file to include the encoded image data of the image data, the information defining metadata for the encoded image data in which the level is set, and management information of the encoded image data; and arranging the generated subsample information in the management information, wherein the file includes the encoded image data of the image and information defining metadata for the encoded image data in which the plurality of levels are set, wherein the subsample information includes a hint data type indicating a type of hint information included in the subsample information, a sample count indicating the number of continuous samples associated with the subsample information, and the hint information, wherein the hint information includes the level corresponding to the load of decoding processing of the subsample, and wherein the subsample information is stored in an hvtC box as configuration information used for HEVC decoding in a sample entry.

16. A non-transitory computer-readable medium having embodied thereon a program, which when executed by a computer causes the computer to execute a method, the method comprising:

encoding image data of a plurality of partial regions of an image for inclusion in a file based on a plurality of levels indicating corresponding degrees of load of decoding processing of respective ones of the plurality of partial regions of the image;

generating subsample information of the image of the image data, the subsample information including hint information used as a reference for decoding processing of a subsample, which is the partial region which can be independently decoded;

generating the file to include the encoded image data of the image data, the information defining metadata for the encoded image data in which the level is set, and management information of the encoded image data; and arranging the generated subsample information in the management information, wherein the file includes the encoded image data of the image and information defining metadata for the encoded image data in which the plurality of levels are set, wherein the subsample information includes a hint data type indicating a type of hint information included in the subsample information, a sample count indicating the number of continuous samples associated with the subsample information, and the hint information, wherein the hint information includes the level corresponding to the load of decoding processing of the subsample, and wherein the subsample information is stored in an hvtC box as configuration information used for HEVC decoding in a sample entry.

17. The image encoding apparatus according to claim 1, wherein the plurality of levels are different from each other.

18. The image encoding apparatus according to claim 12, wherein the subsample information box (Subsample Information Box) includes information for reproducing the image as a whole and the subsample hint information box (SubsampleHint Information Box) includes the hint information.

19. The image encoding apparatus according to claim 1, wherein the file is in an MP4 file format, wherein the management information comprises moov, and wherein the subsample information is stored in the moov.

* * * * *